(12) United States Patent
Shalev et al.

(10) Patent No.: US 10,219,305 B2
(45) Date of Patent: Feb. 26, 2019

(54) COMMUNICATION APPARATUS

(71) Applicant: Doron Shaul Shalev, Alfei-Menashe (IL)

(72) Inventors: Doron Shaul Shalev, Alfei-Menashe (IL); Jacob Fastovsky, Holon (IL); Aliza Breuer, Jordan Valley (IL)

(73) Assignee: Bao Tran, Saratoga, CA (US)

( * ) Notice: Subject to any disclaimer, the term of this patent is extended or adjusted under 35 U.S.C. 154(b) by 0 days.

(21) Appl. No.: 14/765,333

(22) PCT Filed: Feb. 4, 2014

(86) PCT No.: PCT/IL2014/050117
§ 371 (c)(1),
(2) Date: Aug. 1, 2015

(87) PCT Pub. No.: WO2014/128690
PCT Pub. Date: Aug. 28, 2014

(65) Prior Publication Data
US 2016/0007389 A1    Jan. 7, 2016

Related U.S. Application Data

(60) Provisional application No. 61/906,929, filed on Nov. 21, 2013.

(51) Int. Cl.
*H04W 72/04* (2009.01)
*H04L 29/06* (2006.01)
(Continued)

(52) U.S. Cl.
CPC ....... *H04W 76/10* (2018.02); *H04W 36/0022* (2013.01); *H04W 84/04* (2013.01); *H04W 88/08* (2013.01); *H04W 88/16* (2013.01)

(58) Field of Classification Search
CPC ..... H04W 40/00; H04W 24/08; H04W 72/04; H04W 28/06; H04W 48/16; H04W 24/02;
(Continued)

(56) References Cited

U.S. PATENT DOCUMENTS

2007/0155388 A1* 7/2007 Petrovic ............... H04W 36/30
455/442
2007/0217349 A1* 9/2007 Fodor ................. H04L 12/5692
370/310.2
(Continued)

FOREIGN PATENT DOCUMENTS

CN    101 938 736 A    1/2011
JP    2011 166432 A    8/2011

OTHER PUBLICATIONS

ETSI, Technical Specifications, Universal Mobile Telecommunications System (UMTS); UTRAN architecture for 3G Home Node B (HNB); Stage 2 (3GPP TS 25.467 version 11.1.0 Release 11), Jan. 1, 2013. (See PCTIL2014050117-ISR Sep. 8, 2014).

*Primary Examiner* — Edan Orgad
*Assistant Examiner* — Vanneilian Lalchinthang
(74) *Attorney, Agent, or Firm* — Tran & Associates

(57) ABSTRACT

A communication system includes a 3rd Generation Partnership Project (3GPP) Core Network (CN); a 3GPP Home Node-B GateWay (HNB-GW); a Communication Apparatus (CA) coupled to the CN and embedded in a Communication Device (CD), wherein said CA transforms a 3GPP Home Node-B (HNB) into a mobile or location independent portable entity, wherein said CA interconnects to the CN by interconnecting to the HNB-GW over a 3GPP Iuh Interface, wherein said CA includes multi-layered protocol stacks for implementing 3GPP control plane functionality, user plane functionality and management functionality.

19 Claims, 28 Drawing Sheets

(51) Int. Cl.
  *H04W 24/02* (2009.01)
  *G06F 15/16* (2006.01)
  *H04W 76/10* (2018.01)
  *H04W 36/00* (2009.01)
  *H04W 84/04* (2009.01)
  *H04W 88/08* (2009.01)
  *H04W 88/16* (2009.01)

(58) Field of Classification Search
  CPC ..... H04W 84/12; H04W 48/20; H04W 16/14; H04L 69/04; H04L 5/0048; H04L 41/12; H04L 41/0813; H04L 43/045; G06F 15/16
  USPC .......................................................... 370/338
  See application file for complete search history.

(56) References Cited

U.S. PATENT DOCUMENTS

| | | | | |
|---|---|---|---|---|
| 2008/0009290 A1* | 1/2008 | Yoon | ................ | H04W 36/0033 455/436 |
| 2009/0265543 A1* | 10/2009 | Khetawat | ............... | H04W 12/08 713/151 |
| 2011/0045819 A1* | 2/2011 | Lee | ....................... | H04W 24/04 455/423 |
| 2011/0149848 A1* | 6/2011 | Ho | ........................ | H04W 28/06 370/328 |
| 2012/0039243 A1* | 2/2012 | Park | ..................... | H04B 7/2606 370/315 |
| 2012/0044836 A1* | 2/2012 | Sivavakeesar | ........ | H04W 24/02 370/255 |
| 2012/0120831 A1* | 5/2012 | Gonsa | ................. | H04W 76/025 370/252 |
| 2012/0173661 A1* | 7/2012 | Mahaffey | ................ | H04L 67/14 709/217 |
| 2013/0272285 A1* | 10/2013 | Goldsmith | ............ | H04W 24/02 370/338 |
| 2014/0075502 A1* | 3/2014 | Aissi | ....................... | G06F 21/60 726/1 |
| 2015/0063139 A1* | 3/2015 | Zhang | .................... | H04W 24/08 370/252 |

* cited by examiner

Table 1

| Primitive name | Request | Indication | Confirmation |
|---|---|---|---|
| RLC-AM-DATA | Data, CNF, MUI, UE-ID | Data | MUI |
| RLC-UM-DATA | Data, MUI, UE-ID | Data | Not Defined |
| RLC-TM-DATA | Data, MUI, UE-ID | Data | Not Defined |
| CRLC-CONFIG | E/R, Mode | Not Defined | Not Defined |
| CRLC-SUSPEND (UM/AM only) | w/o Parameters | Not Defined | w/o Parameters |
| CRLC-RESUME (UM/AM only) | w/o Parameters | Not Defined | Not Defined |

FIG. 10B

| Current state \ Next state | OFF_ST | NO_LINE_ST | NO_SECURED_CONNECTION_ST | SECURED_CONNECTION_ST | EMERGENCY_ST |
|---|---|---|---|---|---|
| OFF_ST | CD_Plugged_In_EV OP01 Secure_Boot_Failure_EV OP21 | Secure_Boot_Success_EV OP05 | | | |
| NO_LINE_ST | CD_Unplugged_EV OP19 User_Init_Shutdown_EV OP21 | | HNB_GW_Con_Available_EV OP05 | HNB_GW_Con_Unavailable_EV OP05 | |
| NO_SECURED_CONNECTION_ST | CD_Unplugged_EV OP19 User_Init_Shutdown_EV OP21 | Broken_Line_EV OP05 | OP04 User_Init_Secured_Con_EV OP05 NT_TE_USIM_Not_Pres_EV OP04 USIM_Present_EV OP06 Iuh_Failure_EV OP15 User_Init_Secured_Con_EV OP04 | Iuh_Success_EV OP15 | |
| SECURED_CONNECTION_ST | CD_Unplugged_EV OP19 User_Init_Shutdown_EV OP21 | Broken_Line_EV OP05 Signal_Enters_Red_EV OP10 | NT_TE_USIM_Not_Pres_EV OP10 CN_Init_Disconnect_EV OP10 User_Init_Disconnect_EV OP10 | | TE_USIM_Not_Pres_EV OP14 Signal_Enters_Yellow_EV OP15 |
| EMERGENCY_ST | CD_Unplugged_EV OP19 User_Init_Shutdown_EV OP21 | Signal_Enters_Red_EV OP10 Broken_Line_EV OP05 | User_Init_Disconnect_EV OP10 CN_Init_Disconnect_EV OP10 | NT_TE_USIM_Pres_EV OP08 | Signal_Enters_Yellow_EV OP15 |

FIG. 20

Communication Interface Legend

| Type | Physical | | Logical | |
|---|---|---|---|---|
| 2399A | | | 2399B | |
| Via Wireless | 2399C | | 2399E | |
| Via Wire | 2399D | | 2399F | |
| Via Inter-Layer 3GPP protocol | N/A | | 2399G | |
| Via Inter Process Communication | N/A | | 2399H | |

FIG. 23

Table of Abbreviations and Terms

| | | | |
|---|---|---|---|
| 3GPP | 3rd Generation Partnership Project | DSL | Digital Subscriber Line |
| A-IWF | Access-termination-to-network-termination IWF | DTCH-SAP | Dedicated Traffic CHannel SAP |
| A-LC | Access-termination LC layer/entity | E/R | Establishment/Release |
| A-LCH-SAP | Access-termination LCH SAP | EV/OP | EVent/OPeration pair |
| A-MAC-Void | Access-termination MAC Void layer/entity | FSM | Finite State Machine |
| AMD | Acknowledged Mode Data | H-IWF | HNB IWF |
| A-Phy-Void | Access-termination Phy Void layer/entity | H-MAC | HNB MAC layer/entity |
| A-RC | Access-termination RC layer/entity | HMS | HNB Management System |
| AT | Access Termination protocol stack | HNB | Home Node-B |
| AT/NT | AT and NT protocol stacks | HNB-AN | HNB Access Network |
| A-TrL | Access-termination TrL layer/entity | HNBAP | HNB Application Part |
| BCCH-SAP | Broadcast Control CHannel SAP | HNB-GW | HNB Gateway |
| CA | Communication Apparatus | H-Phy | HNB Phy layer/entity |
| CA-AN | CA Access Network | H-RLC | HNB RLC layer/entity |
| CCCH-SAP | Common Control CHannel SAP | H-RRC | HNB RRC layer/entity |
| CD | Communication Device | HW RoT | HardWare Root of Trust |
| CD-A | Type-A CD | I/F | InterFace |
| CD-B | Type-B CD | IEEE | International Electrical and Electronics Engineers |
| CD-C | Type-C CD | I-Mode | Iuh Mode of operation |
| CD-D | Type-D CD | IMSI | International Mobile Subscriber Identity |
| CNF | Confirmation Request | IP AP | Internet Protocol Access Point |
| C-Plane | Control Plane | IP Network | Internet Protocol Network |
| CTCH-SAP | Common Traffic Channel SAP | IPC | Inter Process Communication |
| DCCH-SAP | Dedicated Control CHannel SAP | IPsec ESP | Internet Protocol security Encapsulating Security Payload |
| | | ISP | Internet Service Provider |

FIG. 24A

Table of Abbreviations and Terms - Continued

| | | | |
|---|---|---|---|
| I-TA | I-Mode Trusted Application | TE-AT | TE and AT |
| Iu | Interface between RNC and CN | TEE | Trusted Execution Environment |
| Iub | Interface between Node-B and RNC | TICP | Transport Interface Common Point |
| Iuh | Interface between HNB and HNB-GW | T-LC | Terminal-equipment LC layer/entity |
| IWF | Inter-Working Function | T-LCH-SAP | Terminal-equipment LCH SAP |
| LC | Link Control layer/entity | T-MAC-Void | Terminal-equipment MAC Void layer/entity |
| LC-AM | Link Control Acknowledged Mode entity | TMD | Transparent Mode Data |
| LCH | Logical CHannel | TOS | Trusted OS |
| LC-TM | Link Control Transparent Mode entity | T-Phy-Void | Terminal-equipment Phy Void layer/entity |
| LC-UM | Link Control Unacknowledged Mode entity | T-RC | Terminal-equipment RC layer/entity |
| LL | Logical Link | TrL | Transport Layer |
| MNO | Mobile Network Operator | T-TrL | Terminal-equipment TrL layer/entity |
| MSC | Message Sequence Chart | UE | User Equipment |
| NT | Network Termination protocol stack | UICC | Universal Intergrated Circuit Card |
| OMTP | Open Mobile Terminal Platform | U-MAC | UE MAC layer/entity |
| PCCH-SAP | Paging Control CHannel SAP | UMD | Unacknowledged Mode Data |
| RAs | Rich Applications | U-Mode | Uu Mode of operation |
| RC | Resource Control layer/entity | U-Phy | UE Phy layer/entity |
| REE | Rich Execution Environment | U-RLC | UE RLC layer/entity |
| ROS | Rich Operating System | U-RRC | UE RRC layer/entity |
| RUA | RANAP User Adaptation | U-TA | U-Mode Trusted Application |
| SCTP | Stream Control Transmission Protocol layer/entity | U-TA | U-Mode Trusted Application |
| SeGW | Security GateWay | WAN | Wide Area Network |
| SoC | System on Chip | WLAN | Wireless Local Area Network |
| TE | Terminal Equipment protocol stack | (W)LAN | (W)LAN is either LAN or WLAN |

FIG. 24B

COMMUNICATION APPARATUS

This application claims priority to U.S. Provisional Application 61/768,239 filed Feb. 22, 2013, the content of which is incorporated by reference.

BACKGROUND

The present invention pertains to a Communication Apparatus (CA) with integrated functionalities of a User Equipment (UE) and a Home Node-B (HNB).

In order to avoid over complicating the description, the meaning and/or definition of each term or abbreviation is given only for the 1st encounter in the background and summary sections of the present patent application. As a convenience to the reader, a glossary table of the non-standard abbreviations and terms is provided in FIG. 24A and FIG. 24B and the reader can usefully refer to this glossary.

In recent years, there is a dramatic rise in data traffic experienced in mobile networks due to the proliferation of Smartphones, Tablets and other UEs, which are capable of video streaming, file downloading and other data intensive applications. Another contribution to the increased mobile data traffic is the increased deployment of Machine to Machine (M2M) devices and Smart Home devices. It has been reported that Global mobile data traffic doubles each year, i.e. forecast to increase 1,000-fold between 2010 and 2020.

From the customer's perspective, it is only natural that he/she expects to receive the same services, at the same quality, from their Mobile Network Operator (MNO) as he/she used to have from their Network Service Provider (NSP). This is even exacerbated by the growing trend of customers wishing a "one stop shop" for all their communications needs. As a result there is a trend for consolidation in the industry, in which NSPs, either Land line or Cable operators, are merging with MNOs to provide "Quad Play" plans which include Land line phone, Internet, TeleVision (TV) & Mobile phone services.

From a technical perspective, as the generations for cellular technology are progressing, from 2nd Generation (2G) to 3rd Generation (3G) to 4th Generation (4G), the frequency band allocations are generally getting higher. Therefore it is getting more difficult to achieve coverage and capacity, especially in urban and dense urban areas, due to wave propagation limitations. This is even exacerbated by the proportional increase of indoor usage. It has been reported that mobile traffic indoors is more than 60% of all mobile traffic as of 2012, with a trend to reach more than 80% in coming years.

From the MNOs' perspective, they are facing a big challenge. As networks reach full capacity, it is more likely to result in an increase of data traffic jams, and hence a degradation in the Quality of Service (QoS) for mobile users, especially indoors, which will result in increased dissatisfaction and churn by their customers. Therefore the MNOs need urgently to increase coverage and capacity. However doing so in the conventional way, i.e. increasing network resources is both very expensive and time consuming, mainly due to technical complexities and local regulations regarding building of cellular towers. Analysts show that data volumes are likely to rise faster than the revenue used to build and maintain the networks. This cost vs. revenue gap is exacerbated by a business model used by some MNOs which offer a flat rate for unlimited data usage. It is therefore apparent that mobile broadband is at a crossroads as networks and business models are strained by bandwidth demand that is unmatched by revenue generation.

Another challenge MNOs face is the trend for increased usage of Over the Top (OTT) services like Skype & Viber for replacing cellular voice calls, WhatsApp for replacing Short Message Service (SMS) and Netflix, Hulu & Tango for replacing TV & video services. This is even exacerbated where flat rate data plans exist. This trend, will eventually transform the MNOs into a "dumb pipe" providers. These services, especially the TV & video, require large amount of data traffic, whereas growing proportion of the revenues go to the value added providers which are the OTT operators. MNOs cannot block these services, in most places, due to Network Neutrality regulations. The OTT challenge is even exacerbated when the MNO's subscribers are offloading themselves from the MNO's network into another network, e.g. Wi-Fi/Internet, while using the OTT service, causing the MNO to entirely lose control of what they are doing.

Another issue currently pending an appropriate solution is the roaming tariffs, especially the Data roaming tariffs for customers who are traveling abroad.

The roaming tariffs for leisure and business travelers can be very high for data calls, relative to the local tariffs. This depends on the home country, the visiting country and the specific MNOs involved. There have been reports on "bill shock" experienced by customers who were using their UE abroad in the same fashion they used to at home, not being aware of the roaming tariffs. In some regions, like the European Union (EU), the regulator is trying to deal with the issue by posing strict regulations on roaming tariffs. In other regions this is left to market forces.

MNOs cannot offer HNBs to their roaming customers, as the cellular spectrum in each country is licensed to its local MNOs.

There is therefore a need to overcome or improve at least one of the problems of the prior art. In particular there is a need to address the capacity & coverage needs of the MNOs and the roaming needs of the traveling customers, in improving the provision of mobile voice and broadband data services, either at home or abroad.

SUMMARY

In accordance with the purposes of the present invention, as embodied and broadly described herein, the present invention includes a Communication Apparatus hereinafter referred as the CA, embedded in a Communication Device (CD), with integrated functionalities of: (1) A 3rd Generation Partnership Project (3GPP) User Equipment (UE); and (2) a Home Node-B (HNB) according to the 3GPP Technical Specification (TS) TS 25.467. The CA interconnects to a 3GPP Core Network (CN) through successive steps. In a first step, the CA interconnects to a 3GPP HNB GateWay (HNB-GW) over an Internet Protocol Network (IP Network), also known as The Internet, over an Iuh Interface according to the 3GPP TS 25.468 & TS 25.469. In a second step, the HNB-GW interconnects to the CN over an Iu Interface according to the 3GPP TS 25.410. It should be apparent to any person skilled in the art that the IP Network is also known as the Broadband IP Network and these terms are being used interchangeably.

The CA as described comprises three multi-layered protocol stacks for implementing control plane functionality, user plane functionality, management functionality and User-to-user (Uu) Air Interface functionality. A Terminal Equipment protocol stacks (TE) provide UE functionality. An Access Termination protocol stacks (AT) provide HNB radio functionality. A Network Termination protocol stacks (NT) provide HNB network functionality. A Ui interface provides Uu Air interface functionality comprised of a Transport Layer (TrL) between the TE and AT (TE-AT). It should be apparent to any person skilled in the art that the TrL comprise the prior art Medium Access Control (MAC) and Physical Layer (Phy) functionalities. The CA as described also comprises an Inter-Working Function (IWF) layer, for providing the relay and translation functionalities between the AT and the NT. In another embodiment the TE and the AT functionalities are integrated into a TE-AT emulator application, which connects directly to the NT.

It should be apparent to any person skilled in the art that the CA as described is operating according to the 3GPP Universal Mobile Telecommunications System (UMTS) network standards, also known as 3rd Generation (3G) network standards. However with the appropriate changes as described in the 3GPP Technical Report (TR) TR 23.830 and the TS 36.300, the CA can operate according to the 3GPP Long Term Evolution (LTE) network standards, also known as 4th Generation (4G) network standards.

The CA as described operates in a single mode supporting one cellular standard, either the 3G standard or the 4G standard, however in another embodiment it can operate in a multi-mode, supporting both standards.

In the preferred embodiments, the TrL is implemented by various Inter-Process Communication (IPC) methods.

The described interconnection to a CN, over an IP Network, enables the CA to offload traffic from a Radio Access Network (RAN), thus enabling better Quality of Service (QoS) in the RAN service area. Integration of UE functionality and HNB functionality into one CA, enables preservation of UE mobility, as well as using the HNB functionality for interconnection to the CN, in places where an access to a traditional RAN is not possible.

The use of the term CD in the present invention embodiments is broadly describing devices which are capable to connect to an IP Network, either by wire or by wireless. These devices comprise an embedded CA and can comprise an embedded UE. These devices include, but not limited to, a Mobile Internet Device (MID), Ultra Mobile Personal Computer (UMPC), Notebook, Netbook, Camera, e-Reader, e-Camera, Desktop Personal Computer (PC), Smartphones, Tablets, Gaming Consoles and Machine to Machine (M2M) devices.

Some embodiments describe a CA, which has an embedded Wireless Local Area Network (WLAN) radio, which interconnects to a CN through successive steps. In a first step, the CA interconnects to an Internet Protocol (IP) Access Point (AP), via the WLAN radio. In a second step, the IP AP interconnects to a HNB-GW over an IP Network. In a third step, the HNB-GW interconnects to the CN. Described WLAN radio can belong to one, or a combination thereof, but not limited to any short range wireless standards, e.g. a WiFi radio according to the International Electrical and Electronics Engineers (IEEE) 802.11 family of standards, or a Bluetooth radio according to the Bluetooth standard.

Some embodiments describe a CA, which has an embedded Local Area Network (LAN) adapter, which interconnects to a CN through successive steps. In a first step, the CA interconnects to an IP AP via the LAN cable. In a second step, the IP AP interconnects to a HNB-GW over an IP Network. In a third step, the HNB-GW interconnects to the CN. Described LAN adapter can belong to one, or a combination thereof, but not limited to any wired standards, e.g. an Ethernet type according to the IEEE 802.3 family of standards, or a FireWire type according to the IEEE 1394 standard, or a Universal Serial Bus (USB) type according to the USB 2.0/3.0 standards.

Some embodiments describe an interconnection between a CA and an IP Network using an IP AP, which has an embedded LAN module and an embedded Wide Area Network (WAN) adapter. A LAN module can be a Wireless-LAN radio, or can be a Wired-LAN adapter, or a combination thereof. A WAN adapter can belong to one, or a combination thereof, but not limited to any long range backhaul standards, e.g. a Coaxial Cable type according to the Data Over Cable Service Interface Specifications (DOCSIS) standard, or a Twisted-Wire Pair type, according to the Digital Subscriber Line (DSL) family of standards, or a Optic Fiber type according to the Fiber To The x (FTTx) family of standards, or a Line Of Sight (LOS) radio link, or a Non Line Of Sight (NLOS) radio link.

Some embodiments describe a CD comprising both the CA and an embedded UE, which interconnects to a CN via two alternate routes through successive steps. In one route at a first step, the UE interconnects to a Node-B. At a second step, the Node-B interconnects to a Radio Network Controller (RNC). At a third step, the RNC interconnects to the CN. In another route at a first step, the UE interconnects to an external HNB. At a second step the external HNB interconnects to an IP AP. At a third step, the IP AP interconnects to a HNB-GW over an IP Network. At a forth step, the HNB-GW interconnects to the CN. Described UE can be operating according to the 3G or to the 4G standards, or according to a combination thereof.

Some embodiments describe a LAN connection between the CA and an IP AP, wherein interface radios and/or adapters on the CA and the IP AP operate in accordance with different standards.

BRIEF DESCRIPTION OF THE DRAWINGS

FIG. 10B illustrates the table of primitives between the LC Layer and the Upper Layers (UPLRs).

FIG. 20 is a Finite State Machine (FSM) table for the CD T e-B in some embodiments.

FIG. 23 illustrates the communication interface legend used in the present patent application.

FIG. 24A shows a table of abbreviations and terms used in the present patent application.

FIG. 24B is the continuation of FIG. 24A.

DETAILED DESCRIPTION

Figure 1:
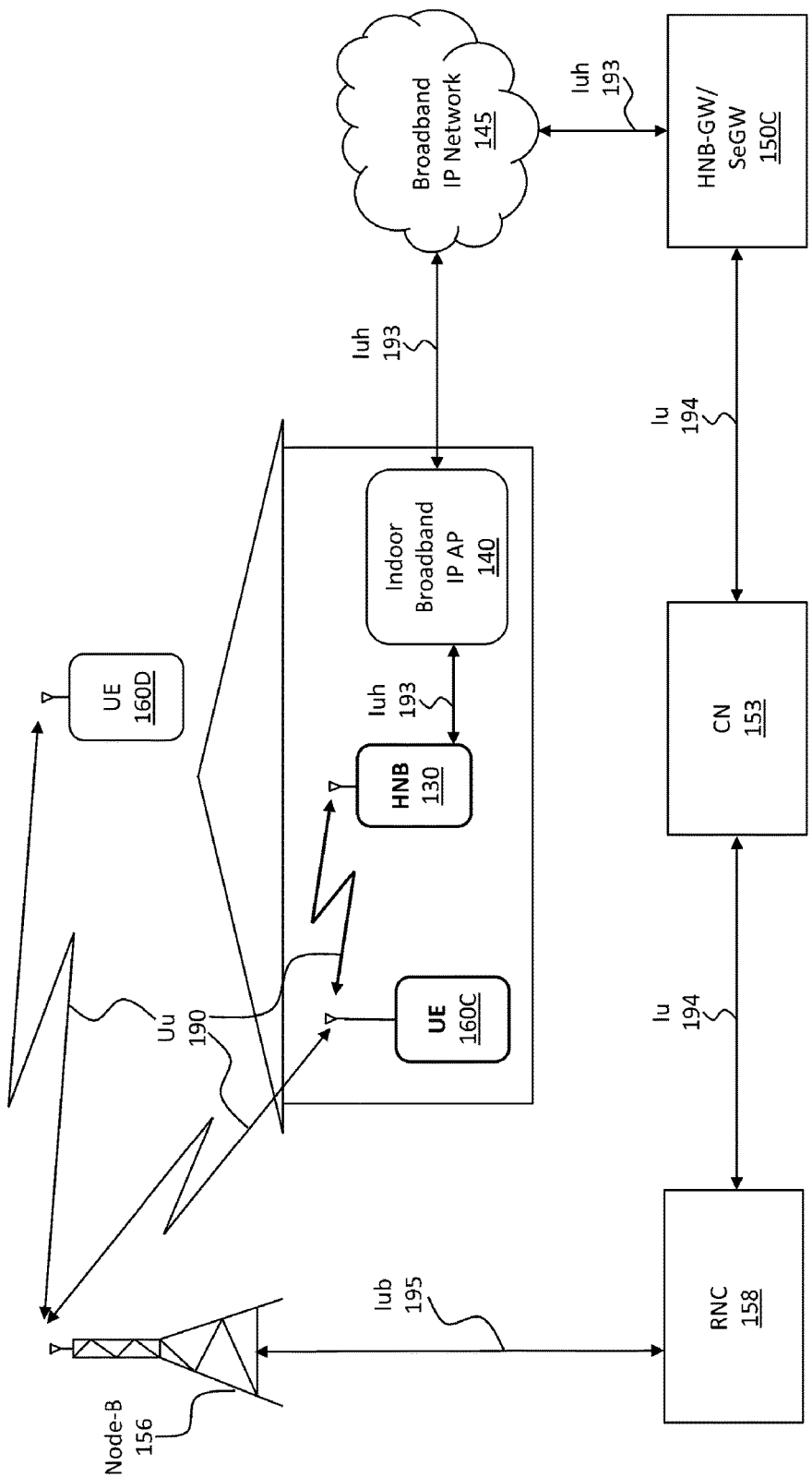
FIG. 1 illustrates a conventional 3G Universal Mobile Telecommunications System (UMTS) network, according to the prior art.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

This invention now will be described more fully hereinafter with reference to the accompanying drawings, in which exemplary embodiments are shown. Various embodiments are now described with reference to the drawings, wherein such as reference numerals are used to refer to such as elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the such as represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

FIG. 1 illustrates a conventional 3G Universal Mobile Telecommunications System (UMTS) network, according to the prior art.

In order to avoid over complicating the description, the meaning and/or definition of each term or abbreviation is given only for the 1st encounter in the detailed description section of the present patent application. As a convenience to the reader, a glossary table of the non-standard abbreviations and terms is provided in FIG. 24A and FIG. 24B and the reader can usefully refer to this glossary.

The present patent application refers to several 3rd Generation Partnership Project (3GPP) Specifications. Unless otherwise specified all references refer to 3GPP Release 9 (Rel-9) Specifications.

The figure includes the following 3GPP entities: (1) The Node-B 156; (2) a Radio Network Controller (RNC), the RNC 158; (3) a Core Network (CN), the CN 153; (4) a Home Node-B (HNB), the HNB 130; (5) a HNB GateWay/Security GateWay (HNB-GW/SeGW), the HNB-GW/SeGW 150C; (6) a User Equipment (UE), the Outdoor UE 160D; and (7) the Indoor UE 160C.

The figure also includes interfaces as described in the 3GPP Specifications: (1) The Uu Air Interface 190, also known as the Radio Interface, between the Node-B 156 and plurality of Outdoor UEs 160D and/or Indoor UEs 160C; (2) the Uu Air Interface 190 between the HNB 130 and plurality of Indoor UEs 160C; (3) the Iub Interface 195 between RNC 158 and plurality of the Node-Bs 156; (4) the Iu Interface 194 between the CN 153 and plurality of RNCs 158; (5) the Iu Interface 194 between the CN 153 and plurality of HNB-GW/SeGWs 150C; and (6) the Iuh Interface 193 between the HNB-GW/SeGW 150C and plurality of HNBs 130.

The figure also includes: (1) An Internet Protocol (IP) Access Point (AP), the Indoor Broadband IP AP 140; and (2) the Broadband IP Network 145.

It should be apparent to any person skilled in the art that in order to simplify this figure and its description, each entity having plurality of members is represented by one member.

The telecommunication system, as described in this patent application, is specified by the 3GPP comprising of a CN 153 and a Radio Access Network (RAN) that can be either the Universal Mobile Telecommunications System (UMTS) Terrestrial Radio Access Network (UTRAN) or the Evolved UTRAN (E-UTRAN), or both. The UTRAN comprises: (1) Plurality of the Node-Bs 156 and plurality of the RNCs 158;

and (2) plurality of the HNBs 130 and plurality of the HNB-GW/SeGWs 150C. On one side, the UTRAN is connected to the CN 153 over the Iu Interface 194. On the other side, the UTRAN is connected to the Outdoor UE 160D or Indoor UE 160C over the Uu Air Interface 190.

It should be apparent to any person skilled in the art that the telecommunication system, as described in this patent application, is operating according to the 3GPP UMTS Network Specifications, also known as the 3rd Generation (3G) network standards, comprising an UTRAN and a 3G CN. However with the appropriate changes as described in the 3GPP Technical Report (TR) TR 23.830 and further described in the 3GPP Technical Specification (TS) TS 36.300, the telecommunication system operates according to the 3GPP Long Term Evolution (LTE) Network Specifications, also known as the 4th Generation (4G) network standards, comprising an E-UTRAN and a 4G CN.

In the outdoor environment, the UTRAN is created by the Node-B 156 and controlled by the RNC 158. In the indoor environment, the UTRAN, also known as the HNB Access Network (HNB-AN), is created by the HNB 130, in collaboration with the HNB-GW/SeGW 150C, wherein the HNB 130 and the HNB-GW/SeGW 150C terminate the Iuh Interface 193 at both sides, as described with reference to the HNB-AN 450 in FIG. 4.

A: UE

The Outdoor UE 160D or Indoor UE 160C is a 3GPP device communicating with the UTRAN by means of licensed spectrum of a Mobile Network Operator (MNO). The Outdoor UE 160D, located in the outdoor environment, is used to access services of the MNO via the Node-B 156 of the UTRAN. The Indoor UE 160C, located in the indoor environment, is used to access services of the MNO via the HNB 130 of the UTRAN, or via the Node-B 156 of the UTRAN. The handover of the Outdoor UE 160D from the Node-B 156 to another one, and vice versa, is done by the RNC 158 in accordance with the 3GPP Specifications. The handover of the Indoor UE 160C from the Node-B 156 to the HNB 130 and vice versa is done by the RNC 158 in collaboration with the HNB-GW/SeGW 150C, in accordance with the 3GPP Specifications. The Indoor UE 160C connects to the HNB 130 or to the Node-B 156 using the same Uu Air Interface 190 as the Outdoor UE 160D does with the Node-B 156. The UE as described operates in a single mode supporting one cellular standard, either the 3G standard or the 4G standard, however in another embodiment it operates in a multi-mode, supporting both standards. It should be apparent to any person skilled in the art that the Indoor UE 160C and the Outdoor UE 160D have the same functionalities and can exchange their places. Depending on the current geographical location of the Outdoor UE 160D or the Indoor UE 160C, the connection can be established to either a Home Public Land Mobile Network (HPLMN) or to a Visited Public Land Mobile Network (VPLMN) during roaming. The HPLMN and VPLMN are further detailed, in the case of the HNB-AN, with reference to FIG. 4.

B: Node-B

The Node-B 156 is an UTRAN Access Point (AP) providing the Uu Air Interface 190 long range connectivity for plurality of Outdoor UEs 160D and Indoor UEs 160C. The Node-B 156 is managed and operated by the MNO and is communicating with the Outdoor UE 160D or Indoor UE 160C. The Node-B 156 has to provide service to a large number of UEs and must do so without losing connectivity over large service coverage regions. Accordingly, the MNO deploys the Node-Bs 156, with overlapping service coverage regions, in order to create an uninterrupted service coverage region, wherein the overlapping service coverage regions are used to trigger the handover of the Outdoor UE 160D. The functions of the Node-B 156 comprise: (1) Air Interface transmission/reception; (2) modulation/demodulation; (3) physical channel coding; (4) micro diversity; (5) error handing; (6) closed loop power control. In general a detailed description of the Node-B 156 is outside the scope of this patent application, however specific details are given where applicable.

C: RNC

The RNC 158 is a controlling element in the UTRAN and is responsible for controlling plurality of the Node-Bs 156 that are connected to the RNC 158 over the Iub Interface 195. The RNC 158 carries out radio resource management; some of the mobility management functions and is the point where ciphering/deciphering is done before user data is sent to/from the Outdoor UE 160D or the Indoor UE 160C. The RNC 158 is connected to the CN 153 over the Iu Interface 194 as described in the 3GPP Specifications, which comprises two sub-interfaces: (1) An Iu-CS Interface (not shown) connecting the RNC 158 to the Circuit Switched (CS) domain of the CN 153 via the Media Gateway (MGW); and (2) an Iu-PS Interface (not shown) connecting the RNC 158 to the Packet Switched (PS) domain of the CN 153 via the Serving GPRS Support Node (SGSN). The functions of RNC 158 comprise: (1) Radio Resource Control management; (2) admission control; (3) channel allocation; (4) power control settings; (5) handover control; (6) macro diversity; (7) ciphering; (8) segmentation or reassembly; (9) broadcast signaling; and (10) open loop power control. In general a detailed description of the RNC 158 is outside the scope of this patent application, however specific details are given where applicable.

D: CN

As described in the 3GPP TR 21.905, the CN 153 is an architectural term relating to the part of 3GPP System which is independent of the access technology of the UE. The functions of the CN 153 comprise: (1) Aggregation of calls; (2) authentication of UEs 160D and 160C; (3) call control and switching; (4) charging; (5) service invocation; (6) gateways to other service providers; (7) Operation and Maintenance (O&M); and (8) subscriber database. In general a detailed description of the CN 153 is outside the scope of this patent application, however specific details are given where applicable.

E: HNB

HNB 130 is an UTRAN AP providing the Uu Air Interface 190 short range connectivity for plurality of Indoor UEs 160C. The HNB 130 is managed and operated by the MNO and is communicating with the Indoor UE 160C. The HNB 130 differs from the Node-B 156 in the following aspects: (1) the HNB 130 is a low power short range device, servicing few UEs in a small service coverage region, as opposed to the Node-B 156 which is a high power long range device, servicing many UEs in a large service coverage region; (2) the service coverage region established by the HNB 130 does not need to be adjacent to any other HNB 130 service coverage region, as opposed to the requirements for the Node-Bs 156; (3) the HNB 130 can be deployed on an ad hoc basis based on user's needs, wherein the operating parameters are configured automatically by a Self-Organized Network (SON) system, as opposed to the deployment of the Node-Bs 156 which requires pre-planning and manual configuration by the MNO; (4) the HNB 130 is using the Broadband IP Network 145 as the backhaul means towards the CN 153, as opposed to the Node-B 156 which is using a dedicated backhaul means towards the CN 153; and (5) the HNB 130 functions comprise the Node-B 156 functions and part of the RNC 158 functions. In some embodiments, the HNB 130 is equipped with a Universal Subscriber Identity Module (USIM) hosted by a Universal Integrated Circuit Card (UICC), which is used for hosting party authentication as described in reference to FIG. 14.

F: Broadband IP Network

The Broadband IP Network 145 represents all the elements that collectively provide backhaul means for the HNB 130 and support IP connectivity between the HNB 130 and the HNB-GW/SeGW 150C. The HNB 130 communicatively couples the Indoor UEs 160C to the HNB-GW/SeGW 150C over the Broadband IP Network 145 over the Iuh Interface 193. In some embodiments the Broadband IP Network 145 utilizes the customer's internet connection. The Broadband IP Network 145 is assumed to be an untrusted public IP network. The Broadband IP Network 145 comprises: (1) Wireless Internet Service Provider (WISP) IP network systems, e.g. Cellular, Carrier-grade WiFi; or (2) Wireline service providers IP network systems, e.g. Cable, Digital Subscriber Line (DSL), Fiber; (3) Internet Service Provider (ISP) IP network systems; and (4) Network Address Translation (NAT) functions, either standalone or integrated into one or more of the above systems. It should be apparent to any person skilled in the art that in some embodiments the Indoor Broadband IP AP 140 is a separate entity as shown in this figure, however in other embodiments it is part of the Broadband IP Network 145.

G: Indoor Broadband IP AP

Figure 3:
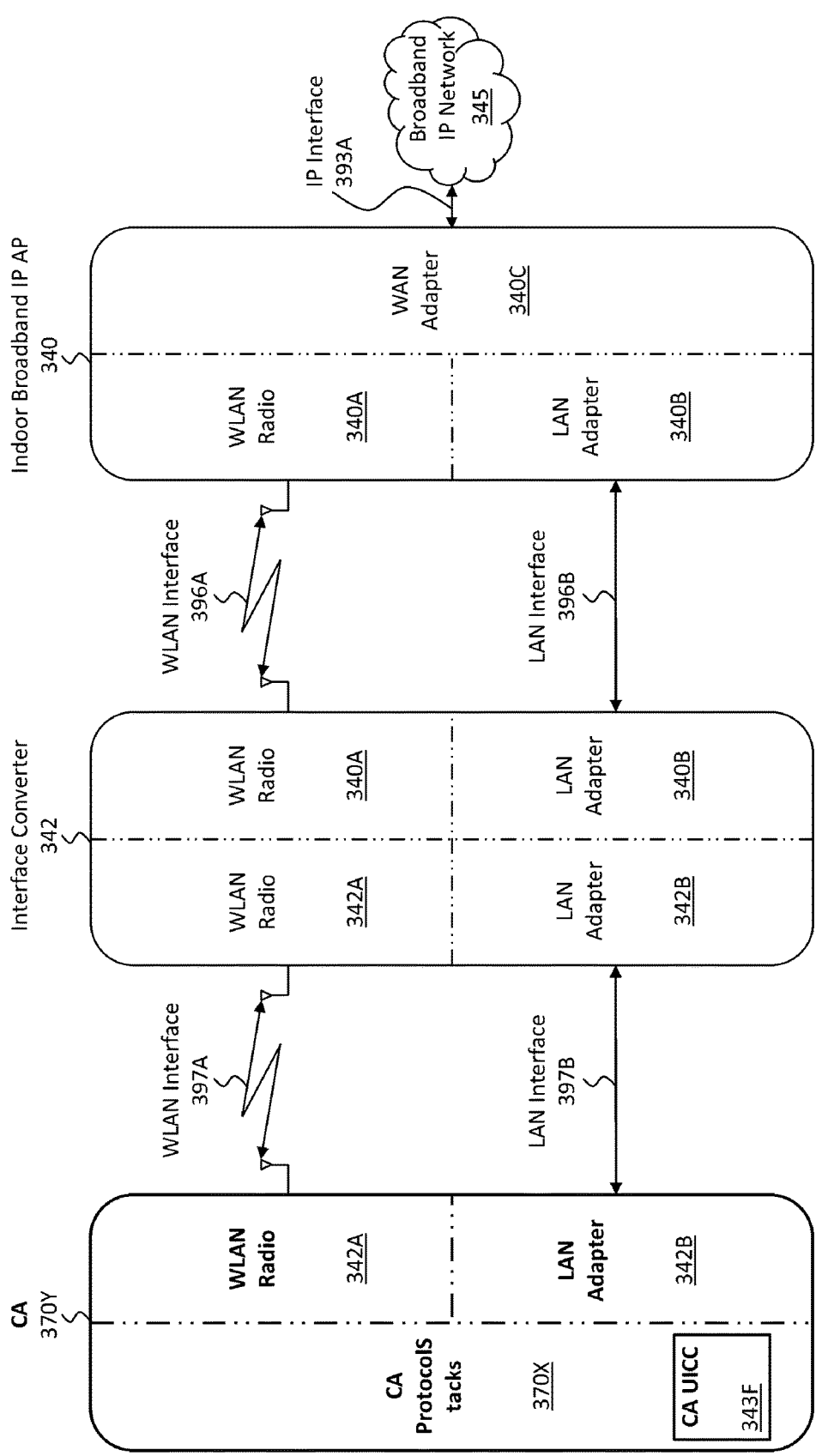
FIG. 3 illustrates the CA Wide Area Network (WAN) connectivity in some embodiments.

The Indoor Broadband IP AP 140, as described with reference to 340 in FIG. 3, is the device connecting the HNB 130 to the Broadband IP Network 145 over the Iuh Interface 193.

H: HNB-GW/SeGW

The HNB-GW and the SeGW are two logical entities of the MNO's network. It should be apparent to any person skilled in the art that these entities can be implemented and deployed as one physical device as the HNB-GW/SeGW 150C described in this figure, or as separate physical devices 450A and 450B as described with reference to FIG. 4. The functions of the HNB-GW/SeGW 150C comprise: (1) Establishing secured communication channels with the HNBs 130; (2) protecting CN 153 entities against threats coming from the untrusted Broadband IP Network 145; (3) supporting the HNB 130 registration and the Indoor UE 160C registration; and (4) aggregation of HNBs 130 and error handling. It should be apparent to any person skilled in the art that the HNB-GW/SeGW 150C functions also comprise part of the RNC 158 functions. The HNB-GW/SeGW 150C and the CN 153 are communicating over the Iu Interface 194. The HNB-GW and the SeGW entities are further described with reference to FIG. 4.

Figure 2:
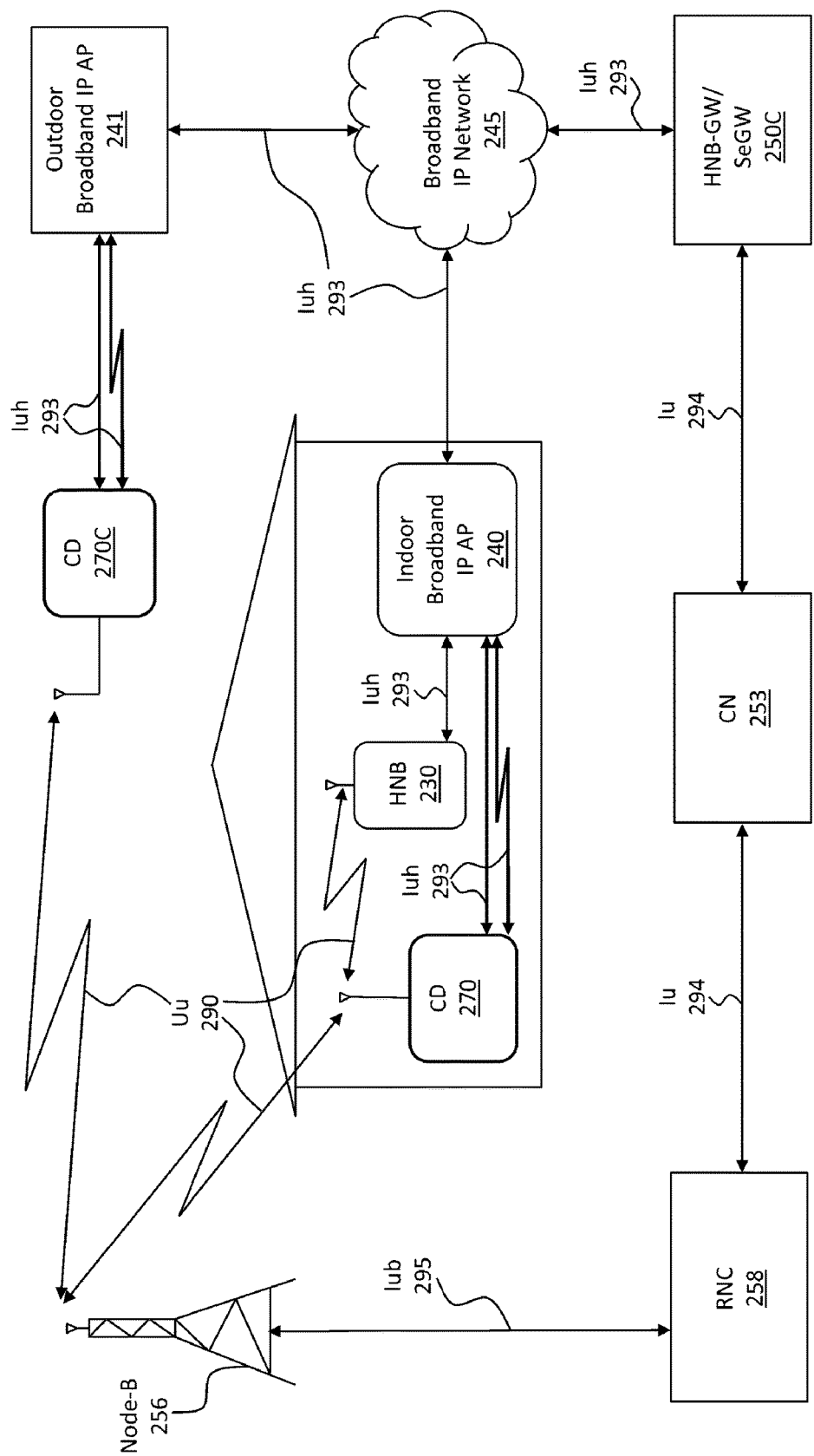
FIG. 2 illustrates a 3G UMTS network for Communication Device (CD) deployments in some embodiments.

FIG. 2 illustrates a 3G UMTS network for Communication Device (CD) deployments in some embodiments.

The figure includes: (1) the 3GPP Node-B 256; (2) the 3GPP RNC 258; (3) the 3GPP CN 253; (4) the 3GPP HNB 230; (5) the 3GPP HNB-GW/SeGW 250C; (6) a Communication Device (CD), the Outdoor CD 270C; (7) the Indoor CD 270; (8) the Broadband IP Network 245; (9) the Indoor Broadband IP AP 240; and (10) the Outdoor Broadband IP AP 241. It should be apparent to any person skilled in the art that the Indoor Broadband IP AP 240 and the Outdoor Broadband IP AP 241 can be identical Software-wise and Hardware-wise, and can be different Mechanical-wise due to different environmental hardening requirements.

The figure also includes interfaces as described in the 3GPP Specifications: (1) the Uu Air Interface 290 between the Node-B 256 and plurality of Outdoor CDs 270C and/or Indoor CDs 270; (2) the Uu Air Interface 290 between the HNB 230 and plurality of Indoor CDs 270; (3) the Iub Interface 295 between RNC 258 and plurality of Node-Bs 256; (4) the Iu Interface 294 between the CN 253 and plurality of RNCs 258; (5) the Iu Interface 294 between the CN 253 and plurality of HNB-GW/SeGWs 250C; (6) the Iuh Interface 293 between the HNB-GW/SeGW 250C and plurality of HNBs 230; and (7) the Iuh Interface 293 between the HNB-GW/SeGW 250C and plurality of Outdoor CDs 270C and/or Indoor CDs 270.

It should be apparent to any person skilled in the art that in order to simplify this figure and its description, each entity having plurality of members is represented by one member.

It should be apparent to any person skilled in the art, that either the Indoor CD 270 or the Outdoor CD 270C, can be one of a Type-A CD (CD-A), the CD-A 1670A, a Type-B CD (CD-B), the CD-B 1770B, a Type-C CD (CD-C), the CD-C 1870C or a Type-D CD (CD-D), the CD-D 1970D as shown in FIG. 16, FIG. 17, FIG. 18 and FIG. 19 respectively.

The Indoor CD 270 or the Outdoor CD 270C, communicates with CN 253 in two different modes of operation: (1) The prior art Uu Mode of operation (U-Mode) wherein the Indoor CD 270 or the Outdoor CD 270C, comprising both CA and UE (not shown), using the UE section for getting services from the MNO over the Uu Air Interface 290, as described with reference to FIG. 1; and (2) the present invention Iuh Mode of operation (I-Mode) wherein the Indoor CD 270 or the Outdoor CD 270C getting services from a Cellular Service Provider (CSP) over the Iuh Interface 293, wherein the CSP can be either a MNO or a Mobile Virtual Network Operator (MVNO). It should be apparent to any person skilled in the art, that MVNOs are operating according to different business models, however for the purpose of this patent application, the MVNO definition include only operators which do not have RAN.

The choice whether to operate in the U-Mode or the I-Mode is dependent on several factors such as CD type i.e. having an embedded UE or not and the availability of Node-B/HNB/(W)LAN connection, wherein the (W)LAN is either Local Area Network (LAN) or Wireless Local Area Network (WLAN), as further described with reference to FIG. 3.

In the U-Mode of operation, the Outdoor CD 270C communicates with the CN 253 only via the Node-B 256. On the other hand the Indoor CD 270 can communicate with the CN 253 either via the Node-B 256 or the HNB 230. The handover of the Indoor CD 270 from the Node-B 256 to the HNB 230 and vice versa is done by the RNC 258 in collaboration with the HNB-GW/SeGW 250C, in accordance with the 3GPP Specifications.

In the I-Mode of operation, the Indoor CD 270 or the Outdoor CD 270C communicates with the HNB-GW/SeGW 250C over the Broadband IP Network 245 without any RAN intermediation. Such communication is based on a wired or a wireless connection created by the Indoor Broadband IP AP 240, or the Outdoor Broadband IP AP 241 respectively.

The Indoor CD 270 or the Outdoor CD 270C has an option to operate in the I-Mode whenever connection is available via the Indoor Broadband IP AP 240 or the Outdoor Broadband IP AP 241 respectively.

It should be apparent to any person skilled in the art that in some embodiments, the Indoor CD 270 or the Outdoor CD 270C can get simultaneous services established in different modes of operation, e.g. a CS call established in the U-Mode and a PS call established in the I-Mode.

FIG. 3 illustrates the CA Wide Area Network (WAN) connectivity in some embodiments.

The figure includes: (1) The CA 370Y; (2) the Interface Converter 342; (3) the Indoor Broadband IP AP 340, wherein the Indoor Broadband IP AP 340 can be the Outdoor Broadband IP AP 241 as shown in FIG. 2; and (4) the Broadband IP Network 345.

The CA 370Y comprises: (1) The CA Protocol Stacks 370X; (4) the LAN Adapter 342B; (5) the WLAN Radio 342A; and (6) a multi International Mobile Subscriber Identity (IMSI), the Multi IMSI UICC 343F as detailed with reference to FIG. 14. It should be apparent to any person skilled in the art that the CA 370Y can comprise the WLAN Radio 342A, or the LAN Adapter 342B, or both.

The Interface Converter 342 comprises: (1) The WLAN Radio 342A; (2) the LAN Adapter 342B; (3) the WLAN Radio 340A; and (4) the LAN Adapter 340B.

The Indoor Broadband IP AP 340 comprises: (1) The WLAN Radio 340A; (2) the LAN Adapter 340B; and (3) a Wide Area Network (WAN) adapter, the WAN Adapter 340C. It should be apparent to any person skilled in the art that the Indoor Broadband IP AP 340 can comprise the WLAN Radio 340A, or the LAN Adapter 340B, or both.

The figure also include the following interfaces: (1) The WLAN Interface 397A, for linking the WLAN Radios 342A; (2) the LAN Interface 397B, for linking the LAN Adapters 342B; (3) the WLAN Interface 396A, for linking the WLAN Radios 340A; (4) the LAN Interface 396B, for linking the LAN Adapters 340B; and (5) the IP Interface 393A, for interfacing the WAN Adapter 340C with the HNB-GW (not shown) over the Broadband IP Network 345.

It should be apparent to any person skilled in the art that: (1) The WLAN Interfaces 396A or 397A, are belonging to, but not limited to, any of the multitude short range wireless standards, e.g. a "WiFi" radio according to the IEEE 802.11 family of standards, or a "Bluetooth" radio according to the Bluetooth standard; (2) the LAN Interfaces 396B or 397B, are belonging to, but not limited to, any of the multitude wired standards, e.g. an Ethernet type according to the IEEE 802.3 family of standards, or a FireWire type according to the IEEE 1394 standard, or a Universal Serial Bus (USB) type according to the USB 2.0/3.0 standards; and (3) the IP Interface 393A is belonging to, but not limited to, any of the long range backhaul standards, e.g. a Coaxial Cable type according to the Data Over Cable Service Interface Specifications (DOCSIS) standard, or a Twisted Wire Pair type, according to the DSL family of standards, or an Optic Fiber type according to the Fiber To The x (FTTx) family of standards, or a Line Of Sight (LOS) radio link standard, or a Non Line Of Sight (NLOS) radio link standard.

The CA 370Y and the Indoor Broadband IP AP 340 are communicating via either: (1) A wireless link with endpoints comprising the WLAN Radio 342A and the WLAN Radio 340A respectively; or (2) a wired link with endpoints comprising the LAN Adapter 342B and the LAN Adapter 340B respectively.

In some embodiments, the link endpoints are compatible, i.e. operating according to the same standard, therefore the Interface Converter 342 is not needed. In other embodiments the link endpoints are incompatible, i.e. operating in accordance with different standards and the Interface Converter 342 converts between the physical and protocol entities of the two standards. The HardWare (HW) and the SoftWare (SW) components of the Interface Converter 342 are not shown, however it should be apparent to any person skilled in the art that the Interface Converter 342 can convert from any (W)LAN standard to any other (W)LAN standard.

The following example illustrates one possible configuration: (1) The CA 370Y has only physical interface, i.e. the WLAN Radio 342A operating in accordance with the Bluetooth standard; (2) the Indoor Broadband IP AP 340 has only LAN Adapter operating in accordance with the Ethernet standard; and (3) the Indoor Broadband IP AP 340 has the WAN adapter 340C operating in accordance with a DSL standard. In this example, the communication between the CA 370Y and the HNB-GW (not shown) is characterized by the following steps: (1) the CA 370Y communicates with the Interface Converter 342 over the WLAN Interface 397A, which is in this case a Bluetooth Interface, wherein both ends of the communication link comprising the WLAN Radios 342A; (2) the Interface Converter 342 converts the physical and protocol entities of the Bluetooth Interface into the physical and protocol entities of the Ethernet Interface respectively; (3) the Interface Converter 342 communicates with the Indoor Broadband IP AP 340 over the LAN Interface 396B, which is in this case an Ethernet Interface, wherein both ends of the communication link comprising the LAN Adapters 340B; (4) the Indoor Broadband IP AP 340 converts the physical and protocol entities of the Ethernet Interface into the physical and protocol entities of the DSL Interface respectively; and (5) the Indoor Broadband IP AP 340 communicates with the HNB-GW over the IP Interface 393A, which is in this case a DSL Interface, over the Broadband IP Network 345.

Steps (1) through (5) are reversed when the HNB-GW is communicating with the CA 370Y.

Figure 4:
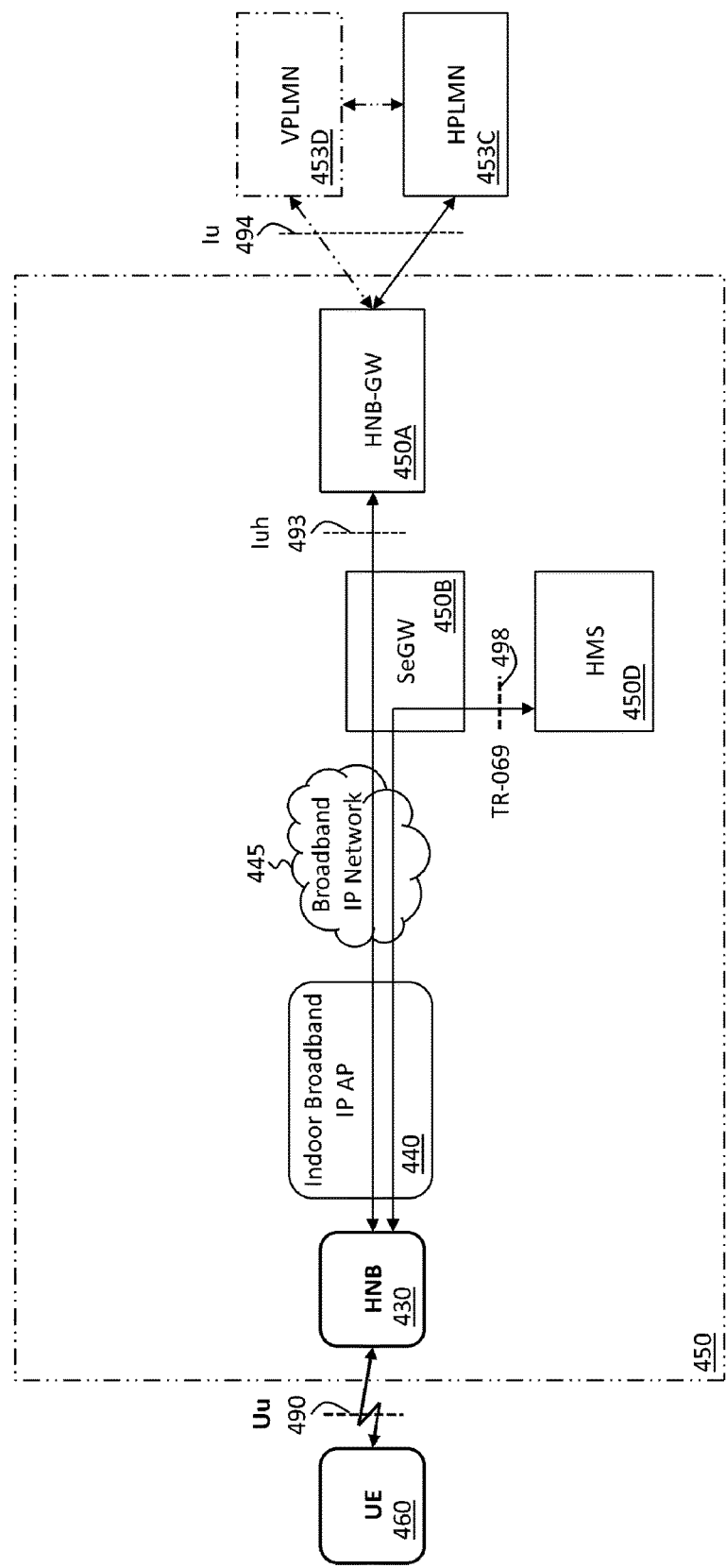
FIG. 4 illustrates the Home Node-B Access Network (HNB-AN), according to the prior art.

FIG. 4 illustrates the Home Node-B Access Network (HNB-AN), according to the prior art.

The figure includes the network entities that comprise a HNB-AN. The HNB-AN 450 comprises: (1) The HNB 430; (2) the Indoor Broadband IP AP 440; (3) the Broadband IP Network 445; (4) the SeGW 450B; (5) the HNB-GW 450A; and (6) a HNB Management System (HMS), the HMS 450D. In another embodiment (not shown) the Indoor Broadband IP AP 440 can be either the Indoor Broadband IP AP 240 or the Outdoor Broadband IP AP 241, as shown in FIG. 2.

The figure also includes the following entities: (1) The UE 460 communicating with the HNB 430 over the Uu Air Interface 490; (2) the HPLMN 453C representing the home CN; and (3) the VPLMN 453D representing the visited CN during roaming.

The figure also includes the following interfaces: (1) The 3GPP Uu Air Interface 490, also known as the Radio Interface, between the HNB 430 and plurality of UEs 460; (2) the 3GPP Iuh Interface 493 between the HNB-GW 450A and plurality of HNBs 430; (3) the 3GPP Iu Interface 494 between the HPLMN 453C, or the VPLMN 453D, and plurality of HNB-GWs 450A; and (4) the TR-069 Interface 498 between the HNB 430 and the HMS 450D, wherein the TR-069 Interface 498 is based on the Broadband Forum TR-069 family of standards.

The overall architectures of the UMTS and the UTRAN are described in the 3GPP TS 25.401 and the TS 25.410 respectively. The HNB-GW 450A serves as a concentrator for the plurality of the HNB 430 connections.

The HNB 430 functionalities comprise: (1) Providing the Uu Air Interface 490 towards the UEs 460; (2) providing the Iuh Interface 493 towards the HNB-GW 450A; (3) providing the Node-B and some of the RNC functionalities, as described in the 3GPP TS 25.467; (4) supporting the HNB 430 registration and the UE 460 registration over the Iuh Interface 493; and (5) other functionalities as described with reference to the HNB 1430 in FIG. 14.

The Indoor Broadband IP AP 440 is termination point, e.g. a modem/router, of the Broadband IP Network 445.

The SeGW 450B functionalities comprise: (1) Providing the HNB 430 with secured tunnel access to the HMS 450D and the HNB-GW 450A, wherein the secured tunnel can be based on the Internet Protocol security Encapsulating Security Payload (IPsec ESP), or another security protocol; and (2) authenticating the HNB 430.

The HNB-GW 450A functionalities comprise: (1) Providing the Iuh Interface 493 towards the HNBs 430; and (2) supporting the HNB 430 registration and the UE 460 registration over the Iuh Interface 493.

The HMS 450D is based on the TR-069 standard published by the Broadband Forum and specifically the TR-196 "Femto Access Point Service Data Model". The HMS 450D functionalities comprise: (1) Facilitating the HNB-GW 450A discovery; (2) provisioning of configuration data to the HNB 430; and (3) assigning the appropriate serving elements i.e. the SeGW 450B and the HNB-GW 450A. Data sent on the TR-069 Interface 498 is secured by the IPsec ESP Secured Tunnel, created by the SeGW 450B during mutual authentication with the HNB 430.

As described in the 3GPP TS 32.583, the HMS 450D and/or the HNB-GW 450A perform location verification of the HNB 430.

In some embodiments, the backhaul between the HNB 430 and the SeGW 450B is based on the Broadband IP Network 445 and unsecured. As described in the 3GPP TS 33.320, the SeGW 450B is an element at the edge of the CN terminating security associations for the backhaul link between the plurality of HNBs 430 and either the HPLMN 453C or the VPLMN 453D. The SeGW 450B performs mutual authentication with the HNB 430. Authentication types comprise: (1) The HNB 430 device certificate authentication, which is mandatory; and (2) the optional Hosting Party (HP) authentication, as described with reference to FIG. 14. For the HNB 430 authentication, a globally unique identifier, in IMSI format, is used for Extensible Authentication Protocol Authentication and Key Agreement (EAP-AKA) based authentication. This special IMSI identifies the HNB 430 in the Home Location Register (HLR) and avoids confusion with the IMSI of the UE 460. The specific IMSI structure is out of scope of this patent application and depends on the MNO policy. The SeGW 450B establishes secured association of the HNB 430 and the HNB-GW 450A and further to the HPLMN 453C or the VPLMN 453D. Any communication between the HNB 430 and the HNB-GW 450A is tunneled via the SeGW 450B with encryption and data integrity check. The SeGW 450B establishes IPsec ESP Secured Tunnels with the HNB 430 using the Integrity Key Exchange Version 2 (IKEv2) protocol signaling. The IPsec ESP Secured Tunnel is responsible for delivering all voice and data between the HNB 430 and the HPLMN 453C or the VPLMN 453D in a secured manner. The SeGW 450B manages all traffic to/from the HNB-GW 450A and from/to the HNB 430.

The UE 460 accesses the CN via the HNB-AN 450 utilizing the Uu Air Interface 490. The UE 460 is authenticated with its own credentials by the HPLMN 453C or the VPLMN 453D. The security of the Uu Air Interface 490, between the UE 460 and the HNB 430, follows the UTRAN security as described in the 3GPP TS 33.102. The Uu Air Interface 490 is protected by optional encryption and integrity checks. Other UE 460 functionalities are described with reference to the UE 1460 in FIG. 14.

The HPLMN 453C is the Public Land Mobile Network (PLMN) in which the UE 460 is subscribed. The VPLMN 453D serves the UE 460 in roaming cases. To give services to the UE 460, the VPLMN 453D interrogates the HLR (not shown) of the HPLMN 453C. Two cases should be considered: (1) The Non-Roaming case, in which the HPLMN 453C authenticates the UE 460, then provides services to the UE 460; and (2) the Roaming case, in which the VPLMN 453D refers to the HLR (not shown) of the HPLMN 453C, for authentication credentials and service approval for the UE 460, then provides services to the UE 460.

Figure 5:
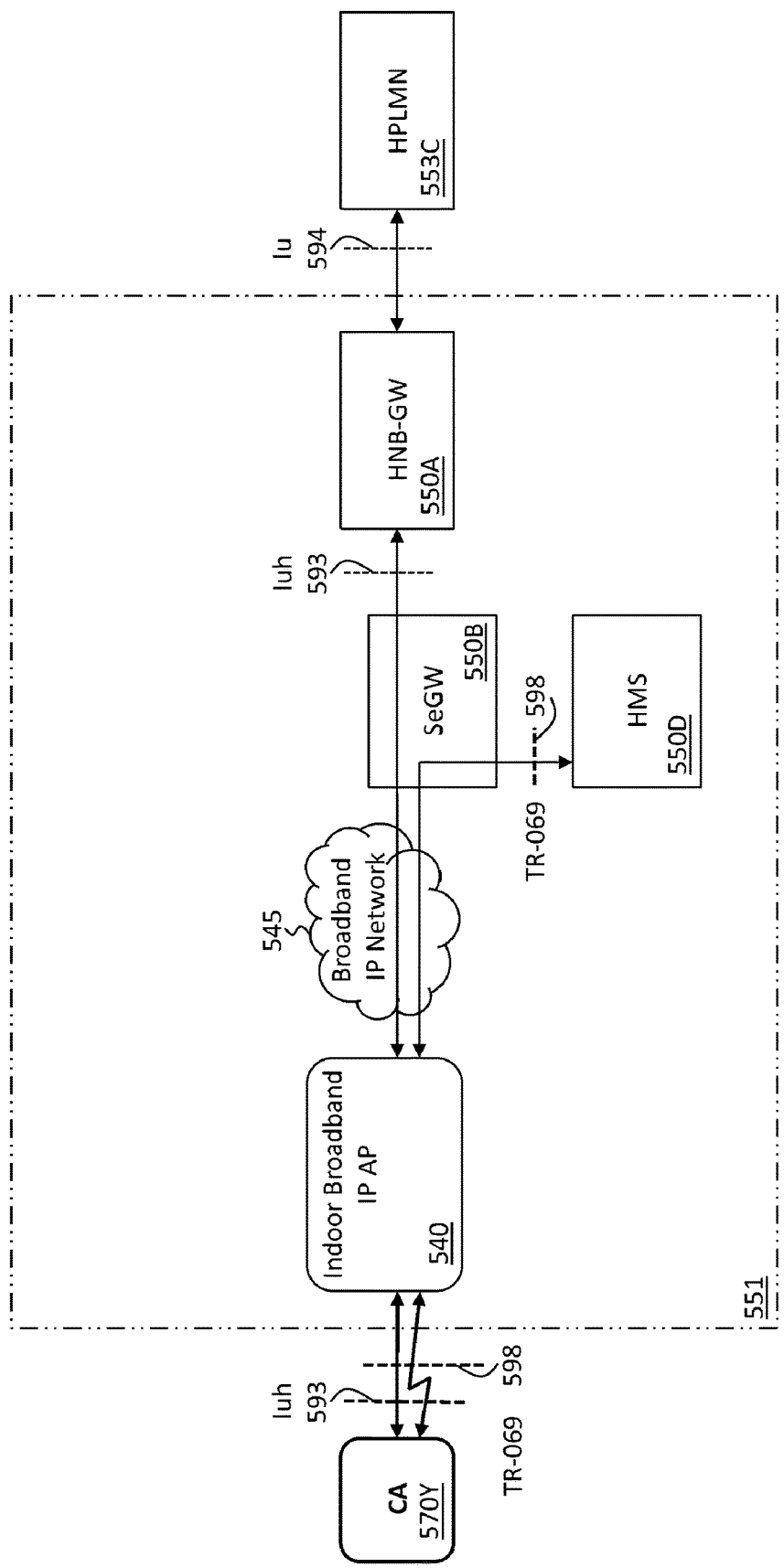
FIG. 5 illustrates the CA Access Network in some embodiments.

FIG. 5 illustrates the CA Access Network in some embodiments.

The figure includes the network entities that comprise A CA Access Network (CA-AN). The CA-AN 551 comprises: (1) The Indoor Broadband IP AP 540; (2) the HNB-GW 550A; (3) the Broadband IP Network 545; (4) the SeGW 550B; and (5) the HMS 550D. In another embodiment (not shown) the Indoor Broadband IP AP 540 can be either the Indoor Broadband IP AP 240 or the Outdoor Broadband IP AP 241, as shown in FIG. 2.

The figure also includes the following entities: (1) The CA 570Y communicating with the HNB-GW 550A over the Iuh Interface 593; and (2) the HPLMN 553C representing the home CN.

The figure also includes the following interfaces: (1) The 3GPP Iuh Interface 593 between the HNB-GW 550A and plurality of CAs 570Y; (2) the 3GPP Iu Interface 594 between the HPLMN 553C and plurality of HNB-GWs 550A; and (3) the Broadband Forum TR-069 Interface 598 between the CA 570Y and the HMS 550D. It should be apparent to any person skilled in the art that the Iuh Interface 593 and the TR-069 Interface 598, between the CA 570Y and the Indoor Broadband IP AP 540, can be implemented using a wired or a wireless medium, as shown in the figure.

The CA 570Y functionalities comprise: (1) providing the Iuh Interface 593 towards the HNB-GW 550A; (3) providing the Node-B and some of the RNC functionalities, as described in the 3GPP TS 25.467; and (4) other functionalities as described with reference to the CA 1470Y in FIG. 14.

The functionalities of the other entities shown in the figure, are described with reference to the corresponding entities in FIG. 4. When comparing the two Access Networks (AN), the main difference between the HNB-AN 450 and the CA-AN 551 is that the HNB-AN 450 can belong to either a home network or to a visited network, therefore the UE 460 can get services from either the HPLMN 453C or the VPLMN 453D respectively, wherein the CA-AN 551 belongs to a home network only, therefore the CA 570Y gets services from the HPLMN 553C only, even during roaming.

In the HNB-AN 450 architecture, as described with reference to prior art with reference to FIG. 4, there is a regulatory requirement implementation for the HNB 430 location verification derived from the use of licensed spectrum. The HNB 430 deployed in an unauthorized location is rejected for services. The CA 570Y has no radio and it does not use licensed spectrum, therefore the location requirement for the CA 570Y can be nullified. In some embodiments the CA 570Y provides location information to the verifying node, i.e. the HNB-GW 550A, the SeGW 550B or the HMS 550D, as described in the 3GPP TS 33.320, comprising the following methods for deriving the location information: (1) The IP address linked to the physical access line location identifier provided by the ISP; and (2) the geo-coordinates provided by a co-located Global Navigation Satellite System (GNSS) receiver, e.g. GPS. In other embodiments the CA 570Y is co-located with a UE, enabling the derivation of the location information by triangulation method, using neighbor Node-Bs. Different deployment scenarios influence the availability, accuracy and reliability of these methods.

Figure 6:
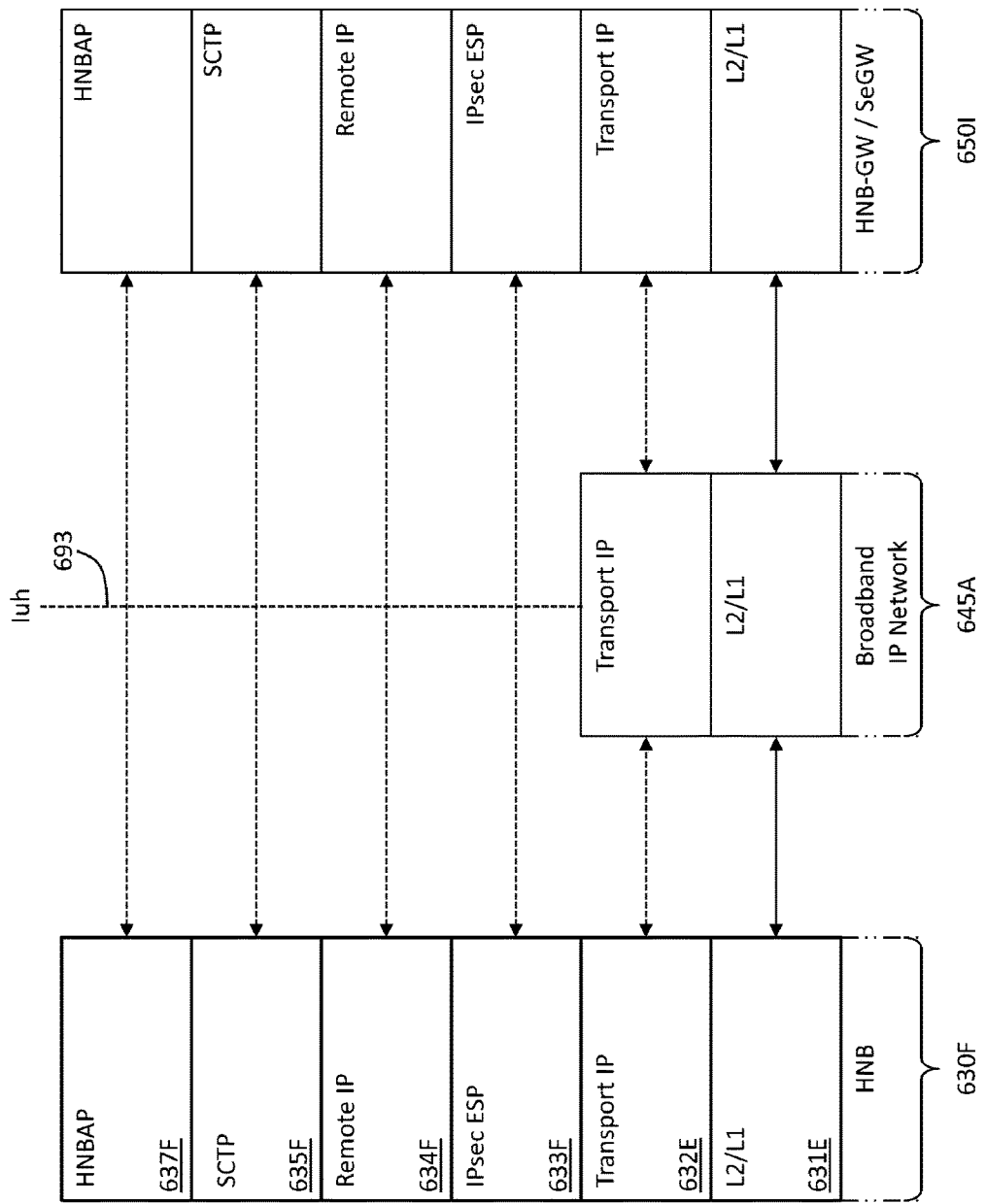
FIG. 6 illustrates the protocol architecture supporting the HNB Application Part (HNBAP) over the Iuh Interface, according to the prior art.

FIG. 6 illustrates the protocol architecture supporting the HNB Application Part (HNBAP) over the Iuh Interface, according to the prior art.

The figure includes: (1) The HNB Control Plane (C-Plane) Protocol Stack 630F; (2) the HNB C-Plane portion of the HNB-GW/SeGW Protocol Stacks 650I, comprised of the peer entities of the HNB C-Plane Protocol Stack 630F; and (3) the Broadband IP Network Protocol Stack 645A providing the transport service for the peer entities of the HNB Protocol Stack 630F and the HNB-GW/SeGW Protocol Stacks 650I.

The figure also includes the Iuh Interface 693 between the peer entities of the HNB Protocol Stack 630F and the HNB-GW/SeGW Protocol Stacks 650I, supported by the peer entities of the Broadband IP Network Protocol Stack 645A. It should be apparent to any person skilled in the art that the unreferenced entities in the figure are peer entities to the described entities, having the same functionality.

The HNB C-Plane Protocol Stack 630F comprises: (1) A HNB Application Part (HNBAP), the HNBAP Layer 637F; (2) a Stream Control Transmission Protocol layer/entity (SCTP), the SCTP Layer 635F; (3) the Remote IP Layer 634F; (4) the IPsec ESP Layer 633F; (5) the Transport IP Layer 632E; and (6) the L2/L1 Access Layer 631E. It should be apparent to any person skilled in the art that the L1, L2 and L3 abbreviations used in this patent application refer to the Layer-1, Layer-2 and Layer-3 respectively, as known in the art.

HNBAP Functionality.

As described in the 3GPP TS 25.469, the HNBAP Layer 637F supports signaling service between the HNB Protocol Stack 630F and the HNB-GW/SeGW Protocol Stacks 650I to fulfill the HNBAP Layer 637F functionalities. The HNBAP Layer 637F comprises the following functions: (1) Management of the underlying transport i.e., the SCTP Layer 635F connection; (2) the HNB-GW/SeGW Protocol Stacks 650I discovery; and (3) the HNB Protocol Stack 630F registration procedures. In some embodiments, the HNBAP Layer 637F also provides a resource management comprising of: (1) The UE (not shown) registration; (2) registration updates; and (3) Access Identification of the HNB Protocol Stack 630F.

HNB C-Plane, Lower Layers Functionalities.

The SCTP Layer 635F provides reliable transport for the HNBAP Layer 637F between the HNB Protocol Stack 630F and the HNB-GW/SeGW Protocol Stacks 650I, using the Remote IP Layer 634F. It should be apparent to any person skilled in the art that other reliable transport protocol layers can be used instead of the SCTP Layer 635F. The IPsec ESP Layer 633F operates in tunnel mode and provides communication encryption and data integrity for the data that is passed using the Upper Layers (UPLRs). The L2/L1 Access Layer 631E and the Transport IP Layer 632E provide the connectivity between the HNB Protocol Stack 630F and the HNB-GW/SeGW Protocol Stacks 650I.

Figure 7:
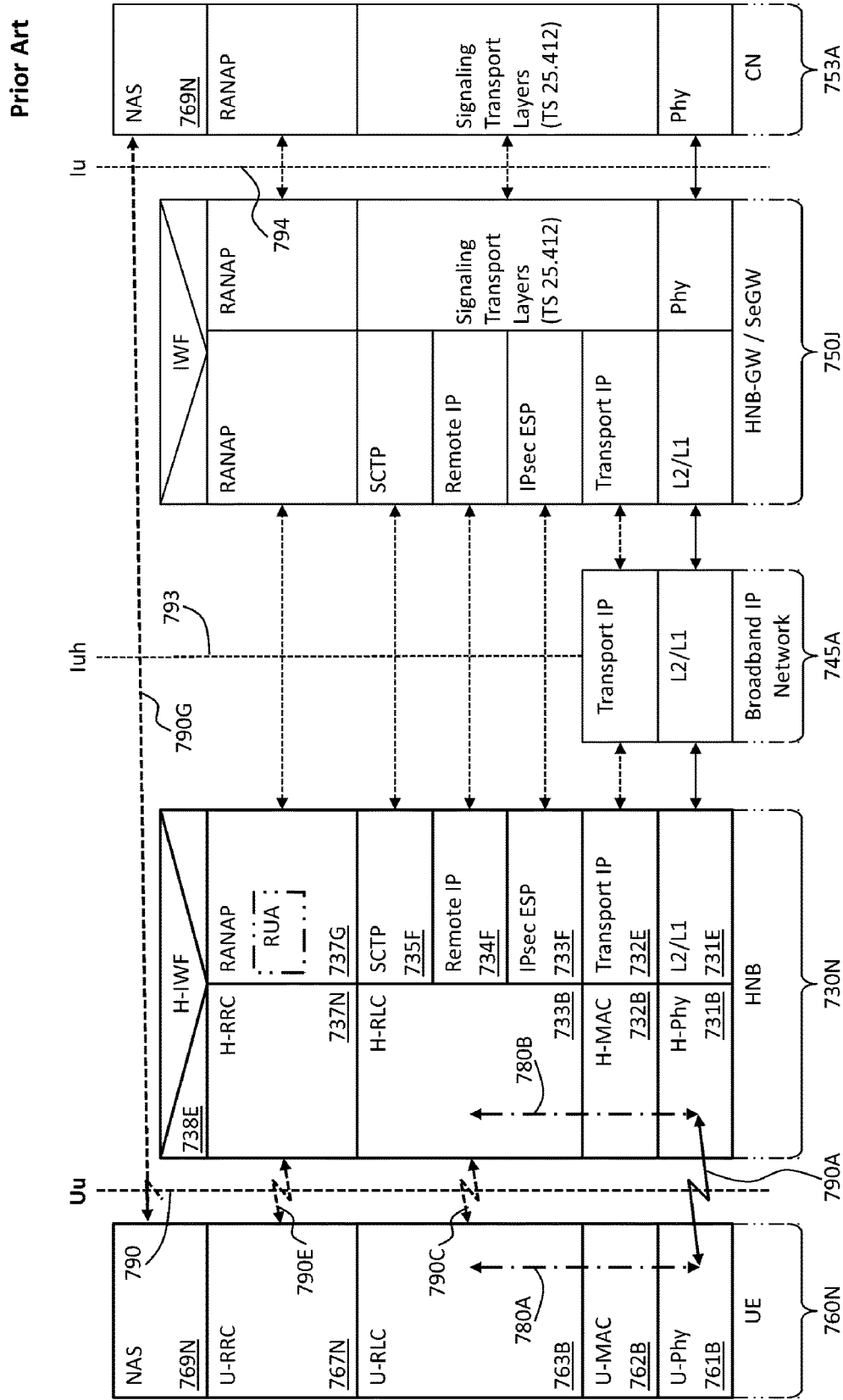
FIG. 7 illustrates the User Equipment (UE)/HNB Control Plane (C-Plane) protocol architecture, according to the prior art.

FIG. 7 illustrates the User Equipment (UE)/HNB Control Plane (C-Plane) protocol architecture, according to the prior art.

The figure includes the following C-Plane Protocol Stacks: (1) the HNB Protocol Stacks 730N; (2) the HNB-GW/SeGW Protocol Stacks 750J; (3) the CN Protocol Stack 753A; (4) the UE Protocol Stack 760N; and (5) the Broadband IP Network Protocol Stack 745A providing the transport service for the peer entities of the HNB-GW/SeGW Protocol Stacks 750J and the HNB Protocol Stacks 730N.

The figure also includes interfaces as described in the 3GPP Specifications: (1) The Uu Air Interface 790 between the peer entities of the UE Protocol Stack 760N and the HNB Protocol Stacks 730N; (2) the Iuh Interface 793 between the peer entities of the HNB Protocol Stacks 730N and the HNB-GW/SeGW Protocol Stacks 750J, supported by the peer entities of the Broadband IP Network Protocol Stack 745A; and (3) the Iu Interface 794 between the peer entities of the HNB-GW/SeGW Protocol Stacks 750J and the CN Protocol Stack 753A. It should be apparent to any person skilled in the art that the Uu Air Interface 790 supports the simultaneous communication between multiple instances of the UE Protocol Stack 760N and the HNB Protocol Stacks 730N. For the clarity of the figure, only one instance is shown. It should also be apparent to any person skilled in the art that the unreferenced entities in the figure are: (1) Either peer entities to the described entities, having the same functionality; or (2) entities which are not directly related to the present invention and are described in the 3GPP Specifications.

The C-Plane Protocol Stack architecture of the Uu Air Interface 790, used for communications between the UE Protocol Stack 760N and the HNB Protocol Stacks 730N comprises: (1) The peer entities of the Radio Resource Control (RRC), A UE RRC layer/entity (U-RRC), the U-RRC Layer 767N and a HNB RRC layer/entity (H-RRC), the H-RRC Layer 737N; (2) the peer entities of the Radio Link Control (RLC), A UE RLC layer/entity (U-RLC), the U-RLC Layer 763B and a HNB RLC layer/entity (H-RLC), the H-RLC Layer 733B; (3) the peer entities of the Medium Access Control (MAC), a UE MAC layer/entity (U-MAC), the U-MAC Layer 762B and a HNB MAC layer/entity (H-MAC), the H-MAC Layer 732B; and (4) the peer entities of the Physical Layer (Phy), a UE Phy layer/entity (U-Phy), the U-Phy Layer 761B and a HNB Phy layer/entity (H-Phy), the H-Phy Layer 731B.

The C-Plane Protocol Stack architecture also comprises the peer entities of a Non Access Stratum (NAS) layer, the NAS Layer 769N of both the UE Protocol Stack 760N and the CN Protocol Stack 753A which are connected over a Logical Link (LL), the LL 790G, wherein the NAS messages are carried transparently between the peer entities of the NAS Layer 769N using direct transfer mechanism.

The LLs between the peer entities of the UE Protocol Stack 760N and the HNB Protocol Stacks 730N comprise: (1) The LL 790E between the U-RRC Layer 767N and the H-RRC Layer 737N; and (2) the LL 790C between the U-RLC Layer 763B and the H-RLC Layer 733B.

The figure also illustrates in a hop-by-hop manner the data path between the peer entities of the RLC, the U-RLC Layer 763B and the H-RLC Layer 733B, comprising the following connection hops: (1) The hop 780A on the UE Protocol Stack 760N, from the U-RLC Layer 763B, via the U-MAC Layer 762B, to the U-Phy Layer 761B; (2) the physical hop 790A over the Uu Air Interface 790; and (3) the hop 780B on the HNB Protocol Stacks 730N, from the H-Phy Layer 731B, via the H-MAC Layer 732B, to the H-RLC Layer 733B. It should be apparent to any person skilled in the art that these hops are bidirectional, i.e. described sequence reversed.

The HNB Protocol Stacks 730N comprise the following: (1) The radio side comprising the C-Plane peer entities of the UE Protocol Stack 760N, as described above; (2) the network side which is terminated by the peer entities in the HNB-GW/SeGW Protocol Stacks 750J; and (3) an Inter-Working Function (IWF), i.e. a HNB IWF (H-IWF), the H-IWF entity 738E, characterized by the following: (a)

Performing protocol conversion between the Radio Protocol Stack and the Network Protocol Stack; and (b) relay messages and data between the two protocols.

The network side comprises: (1) The Radio Access Network Application Part (RANAP) Layer 737G which includes the RANAP User Adaptation (RUA) Sub-Layer; (2) the SCTP Layer 735F; (3) the Remote IP Layer 734F; (4) the IPsec ESP Layer 733F; (5) the Transport IP Layer 732E; and (6) the L2/L1 Access Layer 731E.

C-Plane functionality for supporting the UE.

NAS Functionality.

The NAS Layer 769N performs various procedures comprising of: (1) Call Management (CM); (2) General Packet Radio Service (GPRS); (3) Mobility Management (MM); (4) Session Management (SM); and (5) Short Message Services (SMS).

RRC Functionality.

According to the 3GPP TS 25.331, the U-RRC Layer 767N and the H-RRC Layer 737N main functionalities comprising of: (1) Arbitration of radio resources on the uplink Dedicated Channel (DCH); (2) assignment, reconfiguration and release of radio resources for the RRC connection; (3) broadcast of information related to the Access Stratum; (4) broadcast of information related to the NAS Layer 769N; (5) Cell Broadcast Service (CBS) control; (6) control of ciphering; (7) control of requested QoS; (8) establishment, maintenance and release of the RRC connection; (9) establishment, reconfiguration and release of radio bearers; (10) initial cell selection and cell re-selection; (11) outer loop power control; (12) paging; (13) RRC connection mobility functions; (14) RRC message integrity protection; and (15) UE measurement reporting and control of the reporting RLC Functionality.

As described in the 3GPP TS 25.301 and the TS 25.322, the U-RLC Layer 763B and the H-RLC Layer 733B provide the following services to the UPLRs via their Service Access Points (SAPs): (1) The Acknowledged Mode (AM), the Transparent Mode (TM) and the Unacknowledged Mode (UM) data transfer; (2) maintenance of QoS as requested by the UPLRs; and (3) notification of unrecoverable errors.

MAC Functionality.

According to the TS 25.301 and TS 25.321, the U-MAC Layer 762B and the H-MAC Layer 732B provide the following services to the UPLRs: (1) Data transfer; (2) reallocation of radio resources and MAC parameters; and (3) reporting of measurements. The MAC provides data transfer services to the UPLRs in terms of Logical CHannels (LCHs). The LCH concept is further described in the 3GPP TR 21.905. Each LCH type is characterized by the type of information transferred. The LCHs are generally classified in two groups: (1) Control channels for the transfer of C-Plane information; or (2) traffic channels for the transfer of the User Plane (U-Plane) information.

Phy Functionality.

According to the TS 25.301, the U-Phy Layer 761B and the H-Phy Layer 731B offer information transfer services to the higher layers in terms of transport channels. The transport channels are classified by the mechanism and the characteristics by which data is transferred over the Uu Air Interface 790.

C-Plane functionality for supporting the HNB.

RANAP/RUA Functionality.

The RANAP Layer 737G, as described in the TS 25.413, is used for CS/PS signaling between the HNB Protocol Stacks 730N and the CN Protocol Stack 753A. The RANAP Layer 737G comprises a protocol used for UMTS signaling between the CN Protocol Stack 753A and the UTRAN of a licensed spectrum MNO. The HNB-GW/SeGW Protocol Stacks 750J relays the RANAP Layer 737G messages between the HNB Protocol Stacks 730N and the CN Protocol Stack 753A. In some embodiments, the HNB-GW/SeGW Protocol Stacks 750J terminates and re-originates some RANAP Layer 737G messages, which is done by an IWF.

The RUA Sub-Layer, as described the in the 3GPP TS 25.468, has been added by the 3GPP in order to support RANAP signaling in the UTRAN built with HNBs/HNB-GWs, while preserving backward RANAP signaling compatibility in the UTRAN built with Node-Bs/RNCs. The key function of this Adaptation Sub-Layer is to provide the functionality, over the Iuh Interface 793, of transporting the RANAP Layer 737G messages and control functions, as described in the 3GPP TS 25.413, between the HNB Protocol Stacks 730N and the HNB-GW/SeGW Protocol Stacks 750J. Specifically, the RUA Sub-Layer encapsulates the RANAP Layer 737G messages in a RUA header for transport between the HNB Protocol Stacks 730N and the HNB-GW/SeGW Protocol Stacks 750J. The RUA Sub-Layer minimizes the decoding and processing of RANAP Layer 737G messages at the HNB-GW/SeGW Protocol Stacks 750J. The HNB-GW/SeGW Protocol Stacks 750J does not decode and process the RANAP Layer 737G message. Instead, the HNB-GW/SeGW Protocol Stacks 750J processes information within the RUA header in order to determine the destination within the CN Protocol Stack 753A. The RUA Sub-Layer also eliminates the need for the HNB-GW/SeGW Protocol Stacks 750J to process and decode the NAS Layer 769N messages sent over the LL 790G.

The C-Plane functionalities for the Lower Layers, i.e. the SCTP Layer 735F, the Remote IP Layer 734F, the IPsec ESP Layer 733F, the Transport IP Layer 732E and the L2/L1 Access Layer 731E, are described with reference to FIG. 6, wherein the reliable transport is for the RANAP Layer 737G and the RUA Sub-Layer.

Figure 8:
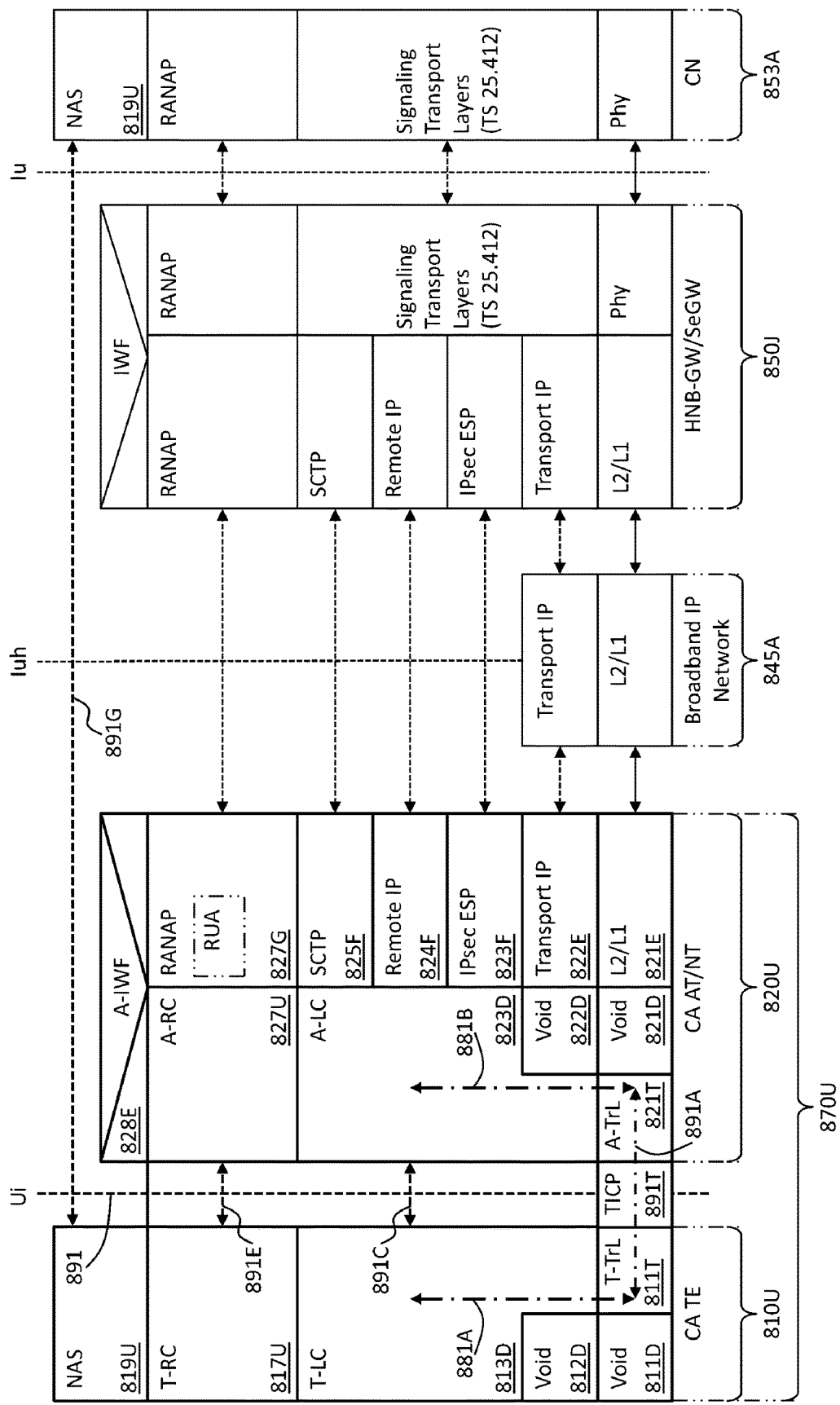
FIG. 8 illustrates the CA C-Plane protocol architecture in some embodiments.

FIG. 8 illustrates the CA C-Plane protocol architecture in some embodiments.

The figure includes the following C-Plane Protocol Stacks: (1) the CA Protocol Stacks 870U; (2) the HNB-GW/SeGW Protocol Stacks 850J; (3) the CN Protocol Stack 853A; and (4) the Broadband IP Network Protocol Stack 845A providing the transport service for the peer entities of the HNB-GW/SeGW Protocol Stacks 850J and the CA Protocol Stacks 870U.

The C-Plane Protocol Stack architecture of the Ui Interface 891, used for communications between a CA Terminal Equipment protocol stack (TE), the CA TE 810U and the CA AT/NT 820U comprises: (1) The Resource Control layer/ entity (RC) peers: (a) A Terminal-equipment RC layer/entity (T-RC), the T-RC Layer 817U; and (b) an Access-termination RC layer/entity (A-RC), the A-RC Layer 827U; (2) the Link Control layer/entity (LC) peers; (a) A Terminal-equipment LC layer/entity (T-LC), the T-LC Layer 813D; and (b) an Access-termination LC layer/entity (A-LC), the A-LC Layer 823D; and (3) the peer entities of the Transport Layer (TrL), A Terminal-equipment TrL layer/entity (T-TrL), the T-TrL 811T and an Access-termination TrL layer/entity (A-TrL), the A-TrL 821T. The Ui Interface 891 is implemented by an Inter Process Communication (IPC) method. As shown on the figure, the following prior art layers are void: (1) a Terminal-equipment MAC Void layer/entity (T-MAC-Void), the T-MAC-Void Layer 812D and an Terminal-equipment Phy Void layer/entity (T-Phy-Void), the T-Phy-Void Layer 811D of the CA TE 810U; and (2) an Access-termination MAC Void layer/entity (A-MAC-Void), the A-MAC-Void Layer 822D and an Access-termination Phy Void layer/entity (A-Phy-Void), the A-Phy-Void Layer 821D of the CA AT/NT 820U.

The C-Plane Protocol Stack architecture also comprises the peer entities of the NAS Layer 819U of both the CA TE 810U and the CN Protocol Stack 853A which are connected over the LL 891G, wherein the NAS messages are carried transparently between the peer entities of the NAS Layer 819U using direct transfer mechanism.

The LLs between the peer entities of the CA TE 810U and the CA AT/NT 820U comprise: (1) The LL 891E between the T-RC Layer 817U and the A-RC Layer 827U; and (2) the LL 891C between the T-LC Layer 813D and the A-LC Layer 823D.

The figure also illustrates a hop-by-hop a bi-directional data pass between two peer entities, the T-LC Layer 813D and the A-LC Layer 823D comprising the following hops: (1) The Data Hop 881A between the T-LC Layer 813D and the T-TrL 811T; (2) the Data Hop 891A, of the Ui Interface 891, between the T-TrL 811T and the A-TrL 821T; and (3) the Data Hop 881B, between the A-LC Layer 823D and the A-TrL 821T. The intermediation Transport Interface Common Point entity (TICP), the TICP 891T, which belongs to the hosting Operating System (OS), gives transport services to both the T-TrL 811T and the A-TrL 821T in terms of the Data Hop 891A.

In some embodiments, as shown on the figure, the Data Hop 891A is based on the Shared Memory IPC method. The TICP 891T represents some pre-allocated portion of the physical memory, controlled by the OS, which is designated specifically for inter-communication between peer entities. In other embodiments, other IPC methods are used, as described with reference to FIG. 12.

The CA Protocol Stacks 870U comprise: (1) The CA TE 810U, comprising the C-Plane peer entities as described above; and (2) the CA AT/NT 820U comprising three parts: (a) the Access Termination protocol stack (AT), comprising the C-Plane peer entities as described above; (b) the Network Termination protocol stack (NT), which is terminated by the peer entities in the HNB-GW/SeGW Protocol Stacks 850J; and (3) an Access-termination-to-network-termination IWF (A-IWF), the A-IWF Entity 828E, characterized by the following: (a) Performing protocol conversion between the CA AT and the CA NT; and (b) relaying messages and data between the two protocols.

The NT comprises: (1) The RANAP Layer 827G which includes the RUA Sub-Layer; (2) the SCTP Layer 825F; (3) the Remote IP Layer 824F; (4) the IPsec ESP Layer 823F; (5) the Transport IP Layer 822E; and (6) the L2/L1 Access Layer 821E.

C-Plane functionality for supporting the CA.

RC Functionality.

The functionalities of the T-RC Layer 817U and the A-RC Layer 827U in the present invention, are similar to the prior art U-RRC Layer 767N and the H-RRC Layer 737N respectively, as described with reference to FIG. 7, i.e.: (1) Optional assignment, reconfiguration and release of resources for the RC connection; (2) Broadcast of information related to the NAS; (3) Control of requested QoS; (4) optional establishment, maintenance and release of an RC connection; and (5) Paging.

It should be apparent to any person skilled in the art that in the present invention, as the T-RC Layer 817U and the A-RC Layer 827U utilize the Ui Interface 891 implemented by an IPC method, there is no need to establish the prior art RRC connection each time the CA TE 810U tries to communicate with the CN Protocol Stack 853A. In some embodiments, the RRC connection is established just after power up or after reset, between the T-RC Layer 817U and the A-RC Layer 827U, and is kept opened until the CA Protocol Stacks 870U power off or reset. In other embodiments, the prior art principles of RRC connection establishment can be utilized to keep backward compatibility with the legacy protocol stacks.

LC Functionality.

Figure 9:
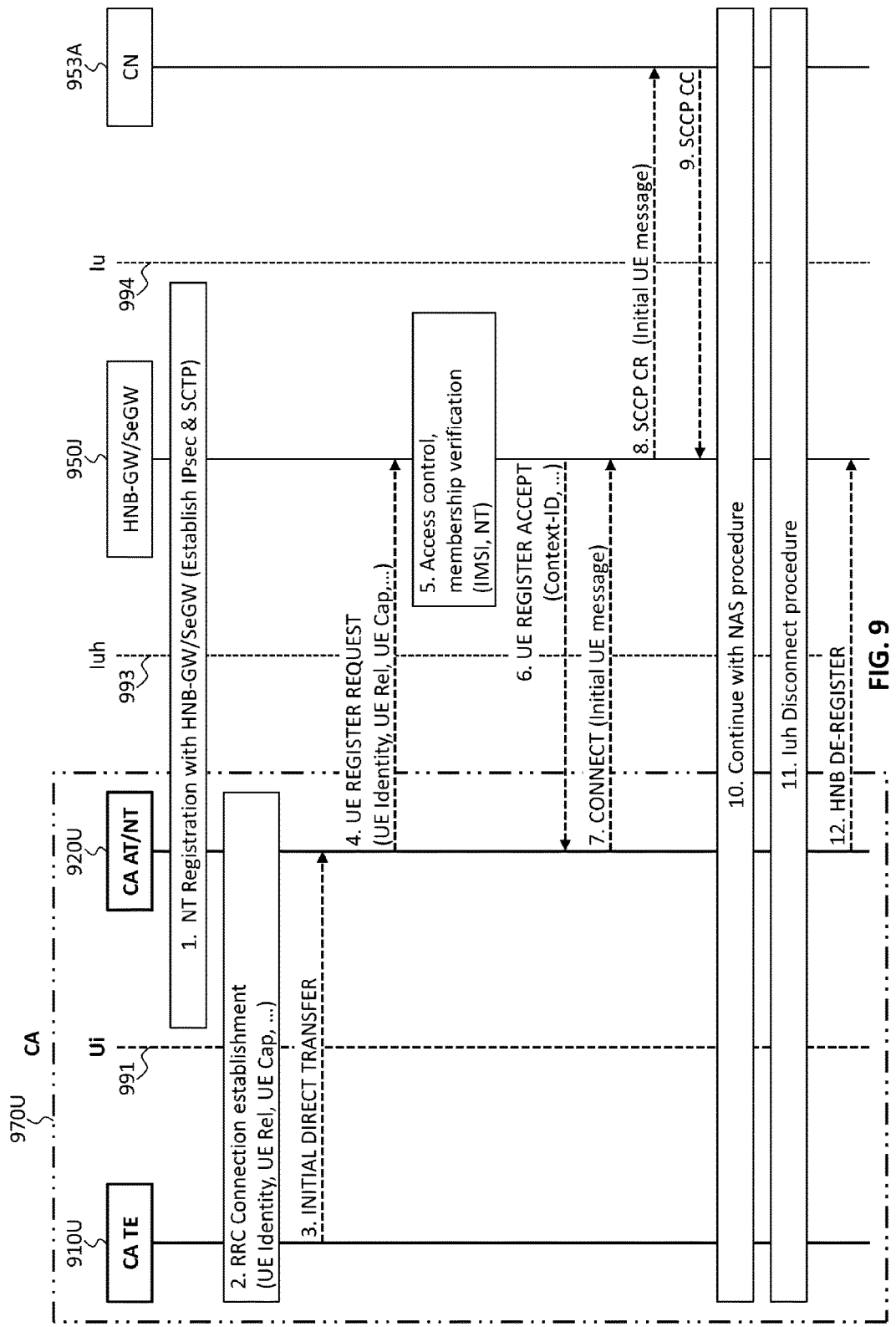
FIG. 9 illustrates the Message Sequence Chart (MSC) for the CA registration in some embodiments.

The functionalities of the T-LC Layer 813D and the A-LC Layer 823D in the present invention, are similar to the prior art U-RLC Layer 763B and the H-RLC Layer 733B respectively, as described with reference to FIG. 7. However, the LC peer entities communicate logically, by means of the LL 891C, over the Ui Interface 891 using the TrL implemented by an IPC method, as described with reference to FIG. 11, wherein the prior art RLC entities communicate logically, by means of the LL 790C, over the Uu Air Interface 790, using the MAC & Phy Layers, as described with reference to FIG. 7. It should be apparent to any person skilled in the art that for the reliability, security and throughput on the Ui Interface link, the LC Layer needs lower complexity algorithms in comparison with the prior art RLC Layer, as the transfer between the peer LC entities is characterized by the following: (1) Guaranteed, therefore there is no need for re-transmissions; (2) free of errors and duplications, therefore there is no need for error detection and recovery; (3) always in-sequence, i.e. the order of the Protocol Data Units (PDUs) reception is the same as the order of the PDUs submission, therefore there is no need for re-ordering of the PDUs; (4) secured, because both peer LC entities are hosted by the Trusted Execution Environment (TEE), as described with reference to FIG. 16, therefore there is no need for additional ciphering/deciphering between the peer LC entities; (5) limited only by the OS in terms of message length, i.e. unlimited for all practical purposes, therefore the segmentation/concatenation procedures can be nullified; and (6) single entity support i.e. the Ui Interface 891 supports the communication between only one instance of the CA TE 810U and the CA AT/NT 820U, wherein the Uu Air Interface 790 supports the simultaneous communication between multiple instances of the UE Protocol Stack 760N and the HNB Protocol Stacks 730N as described with reference to FIG. 7. Therefore, it should be apparent to any person skilled in the art that although the LC Layer functionality is derived from the 3GPP RLC Layer functionality, some of the RLC functionalities, as described above, are redundant for the proper operation of the LC Layer, i.e. the LC Layer is a degenerated version of the 3GPP RLC Layer. In the preferred embodiment, these redundant functionalities are omitted from the LC Layer. In another embodiment (not shown), the CA comprises the RLC Layer instead of the LC Layer, wherein the CA further comprises: (1) An Abstraction Layer between the RLC Layer and the TrL, which intercepts the redundant RLC messages and deals with them in a way to prevent undesirable CA behavior; or (2) an additional functionality of the TrL, providing the functionality of the Abstraction Layer. Consequently the examples of data flow and Message Sequence Charts (MSCs), as shown e.g. in FIG. 9, are derived from the prior art MSCs by removing the redundant functionalities, however the names of the primitives, messages and parameters are kept according to the 3GPP Specifications. The same reasoning and the same naming conventions are applied for the comparison of the CA RC and the prior art RRC Layers.

MAC and Phy Functionalities.

It should be apparent to any person skilled in the art that in lieu of the redundancy derived from the implementation of the Ui Interface 891, as described in the previous section, the prior art MAC and Phy functionalities are nullified in the present invention, therefore the peer MAC Layers and the peer Phy Layers are void, as shown in the figure. Furthermore, the T-TrL 811T is used instead of the T-Phy-Void Layer 811D and the A-TrL 821T is used instead of the A-Phy-Void Layer 821D.

The C-Plane functionalities for the NAS Layer 819U, the RANAP Layer 827G and the RUA Sub-Layer are described with reference to FIG. 7. The C-Plane functionalities for the other layers of the NT portion of the CA AT/NT 820U, i.e. the SCTP Layer 825F, the Remote IP Layer 824F, the IPsec ESP Layer 823F, the Transport IP Layer 822E and the L2/L1 Access Layer 821E, are described with reference to FIG. 6, wherein the reliable transport is for the RANAP Layer 827G and the RUA Sub-Layer.

Paging and QoS Functionalities

In the prior art, the paging service sends information to a specific UE or UEs as described in the 3GPP TS 25.301. The information is broadcasted in a certain geographical area but is addressed to a specific UE or UEs. In some embodiments of the present invention the information, for paging and notification services, is transferred internally inside the CA Protocol Stack 870U, from the NT portion of the CA AT/NT 820U, over the Ui Interface 891, towards the CA TE 810U. Responses, as appropriate, are transferred in the opposite direction.

In the prior art, the 3GPP Specification defines the levels of QoS required for the various Radio Bearers, including the allocation of sufficient radio resources, which are being dealt by the MAC and Phy Layers. It should be apparent to any person skilled in the art that the implementation of the Ui Interface 891, as described in the previous sections, provides the means for the required QoS.

FIG. 9 illustrates the Message Sequence Chart (MSC) for the CA registration in some embodiments.

The figure illustrates the CA Protocol Stacks 970U registration procedure characterized by the following sub-stages: (1) The CA AT/NT 920U registration with the serving HNB-GW/SeGW Protocol Stacks 950J as described with reference to Step 1 below; and (2) the CA TE 910U registration with the serving HNB-GW/SeGW Protocol Stacks 950J as described with reference to Step 4 through Step 9 below.

The CA AT/NT 920U registration sub-stage is performed upon power up or reset of the CD. The CA AT/NT 920U registration procedure utilizes the HNB registration procedure as described in the 3GPP TS 25.467. To perform registration procedure, the CA AT/NT 920U establishes IPsec ESP Secured Tunnel and sets up a reliable transport session, e.g. SCTP, for the Iuh Interface 993 signaling on the serving HNB-GW/SeGW Protocol Stacks 950J.

The CA TE 910U registration sub-stage is triggered when the CA TE 910U attempts to access the CA AT/NT 920U by means of an initial NAS message, e.g., LOCATION UPDATING REQUEST. The CA TE 910U and the CA AT/NT 920U communicate over the Ui Interface 991. The CA Protocol Stacks 970U and the HNB-GW/SeGW Protocol Stacks 950J communicate over the Iuh Interface 993. The HNB-GW/SeGW Protocol Stacks 950J and the CN Protocol Stack 953A communicate over the Iu Interface 994. The CA Protocol Stacks 970U registration procedure is characterized by the following steps:

Step 1: The CA Protocol Stacks 970U registers the CA AT/NT 920U entity with the HNB-GW/SeGW Protocol Stacks 950J utilizing the HNB registration procedure as described in the 3GPP TS 25.467. During the registration procedure, the CA AT/NT 920U is identified by an IMSI stored in the UICC (not shown) as the prior art HNB does for the hosting party identity. It should be apparent to any person skilled in the art that with regard to the specific implementation, this step of registration procedure can be done during earlier stages, e.g. after secure boot and protocol stack initialization, and the CA Protocol Stacks 970U can keep the CA AT/NT 920U being registered until the arrival of one of the following events: (1) De-registration Request from any side; (2) Reset; or (3) Power Off.

Step 2: Upon the UPLRs request, the CA TE 910U initiates an initial NAS procedure, e.g. Location Updating procedure, by optional establishing an RRC connection with the CA AT/NT 920U. As described above regarding the CA AT/NT 920U, the RRC connection can be established earlier and the CA Protocol Stacks 970U can keep it established until the arrival of one of the following events: (1) De-registration Request from any side; (2) Reset; or (3) Power Off. The UE identity i.e. equivalent to the TE identity, the UE Capabilities i.e. equivalent to the TE capabilities and the Establishment Cause, are reported to the CA AT/NT 920U as part of the RRC Connection establishment procedure.

Step 3: The CA TE 910U then transmits over the Ui Interface 991 the RRC INITIAL DIRECT TRANSFER message carrying the Initial NAS message, e.g. the LOCATION UPDATING REQUEST message, with some form of the UE Identity. In the prior art, upon reception of the INITIAL DIRECT TRANSFER message from the UE, the HNB checks the UE Capabilities and optionally performs Access Control. In the present invention the CA AT/NT 920U does not check the CA TE 910U capabilities or perform Access Control, as these attributes are known a-priori to the CA AT/NT 920U.

Step 4: The CA Protocol Stacks 970U, i.e. the CA AT/NT 920U, attempts to register the CA TE 910U with the HNB-GW/SeGW Protocol Stacks 950J by transmitting the message UE REGISTER REQUEST. The message comprises at least: (1) The CA TE 910U Identity, derived from the UE Identity parameter, which has been provided in Step 2; (2) the CA TE 910U Capabilities, derived from the UE Capabilities parameter, which have been provided in Step 2; and (3) the Registration Cause, e.g. the indication regarding the CA TE 910U registration for an Emergency Call.

Step 5: The HNB-GW/SeGW Protocol Stacks 950J checks the CA TE 910U capabilities, derived from the UE Capabilities parameter, and the Registration Cause. The HNB-GW/SeGW Protocol Stacks 950J performs Access Control or membership verification for the particular CA TE 910U attempting to utilize the specific CA AT/NT 920U. If the CA TE 910U requests Emergency Call services, it is always admitted to the HNB-GW/SeGW Protocol Stacks 950J.

Step 6: If the HNB-GW/SeGW Protocol Stacks 950J accepts the CA TE 910U registration attempt it allocates a Context-ID for the CA TE 910U and responds with the HNBAP UE REGISTER ACCEPT message, including the Context-ID, towards the CA AT/NT 920U. Alternatively, if the HNB-GW/SeGW Protocol Stacks 950J does not accept the incoming CA TE 910U registration Request then the HNB-GW/SeGW Protocol Stacks 950J responds with the HNBAP UE REGISTER REJECT message (not shown).

Step 7: The CA AT/NT 920U then sends the RUA CONNECT message containing the RANAP Initial UE message towards the HNB-GW/SeGW Protocol Stacks 950J.

Step 8: The reception of the RUA CONNECT message at the HNB-GW/SeGW Protocol Stacks 950J triggers the setup of the Signalling Connection Control Part (SCCP) connection by the HNB-GW/SeGW Protocol Stacks 950J towards the CN Protocol Stack 953A. The HNB-GW/SeGW Protocol Stacks 950J then forwards the RANAP Initial UE message to the CN Protocol Stack 953A by the SCCP Connection Request (CR) message.

Step 9: The CN Protocol Stack 953A responds with the SCCP Connection Confirm (CC) message.

Step 10: The CA TE 910U continues with the NAS procedure, e.g. Location Updating procedure, towards the CN Protocol Stack 953A, via the CA AT/NT 920U and the HNB-GW/SeGW Protocol Stacks 950J using the Ui Interface 991.

Step 11: The CA AT/NT 920U initiates Iuh Disconnect procedure, as described in the 3GPP TS 25.467, to release the signaling connection associated with the CA TE 910U across the Iuh Interface 993. The HNB-GW/SeGW Protocol Stacks 950J is then responsible to co-ordinate the release of the connection across the Iuh Interface 993 and the corresponding connection across the Iu Interface 994, which is triggered by the CN Protocol Stack 953A. The Iuh Disconnect procedure also comprises optional de-registration of the CA TE 910U in the HNB-GW/SeGW Protocol Stacks 950J, which allows the HNB-GW/SeGW Protocol Stacks 950J to clear the context associated with the CA TE 910U.

Step 12: Whenever the CA AT/NT 920U needs to terminate operations, it sends HNB DE-REGISTER message towards the HNB-GW/SeGW Protocol Stacks 950J. Upon reception of the HNB DE-REGISTER message, the HNB-GW/SeGW Protocol Stacks 950J releases all resources associated with the CA AT/NT 920U. The de-registration procedure can be invoked also by the HNB-GW/SeGW Protocol Stacks 950J by sending the HNB DE-REGISTER message towards the CA AT/NT 920U.

While connected with the HNB-GW/SeGW Protocol Stacks 950J, and with reference to FIG. 8, the SCTP Layer 825F of the CA AT/NT 920U periodically sends the SCTP HEARTBEAT message (not shown) to the HNB-GW/SeGW Protocol Stacks 950J to check connection existence. If the HNB-GW/SeGW Protocol Stacks 950J detects that IP connectivity with the CA Protocol Stacks 970U is broken due to some broadband network problem, it releases resources assigned to the CA Protocol Stacks 970U, e.g. SCTP connection, locally de-registers the CA AT/NT 920U and, optionally, removes all contexts of the CA TE 910U. If the CA Protocol Stacks 970U detect a loss of connectivity with the HNB-GW/SeGW Protocol Stacks 950J, it attempts to re-establish connectivity and re-register the CA Protocol Stacks 970U with the HNB-GW/SeGW Protocol Stacks 950J.

The ERROR INDICATION messages (not shown) are sent by either the CA AT/NT 920U or the HNB-GW/SeGW Protocol Stacks 950J to report detected errors to the other side.

Figure 10A:
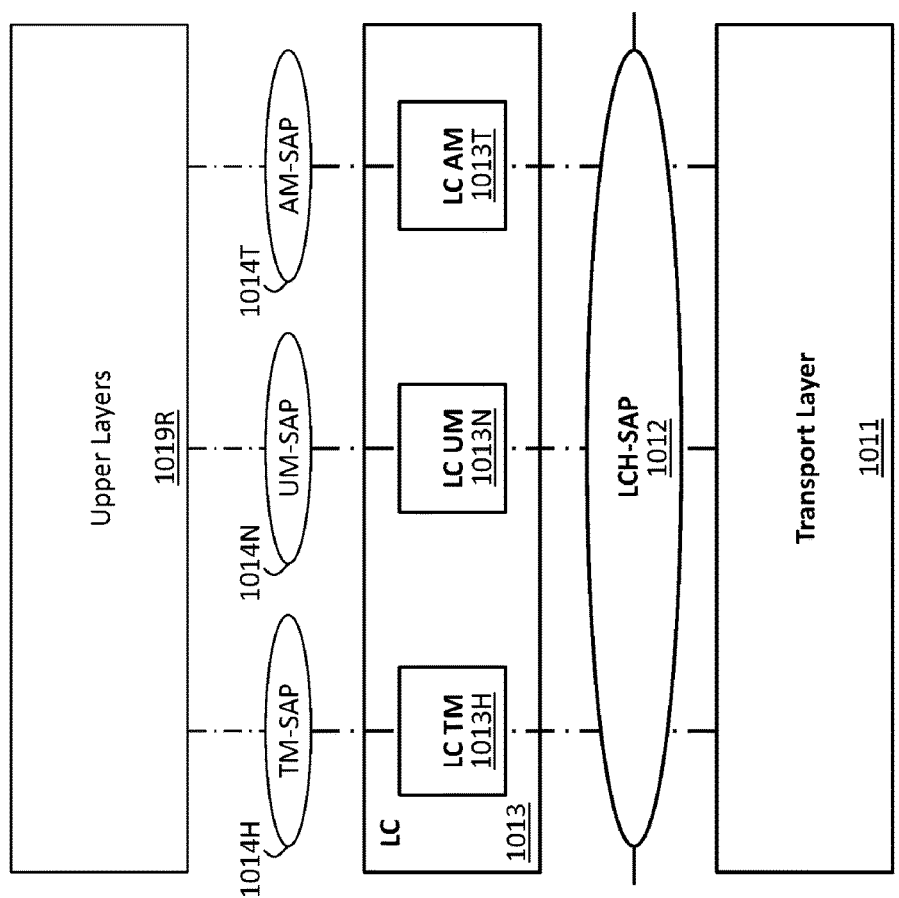
FIG. 10A illustrates the Link Control (LC) Layer relationships with other Layers.

FIG. 10A illustrates the Link Control (LC) Layer relationships with other Layers.

The figure includes: (1) The LC Layer 1013; (2) The UPLRs 1019R; (3) the TrL 1011; and (4) the LCH Service Access Point (SAP) 1012 wherein the TrL 1011 gives its services to the LC Layer 1013, as further detailed in FIG. 11, FIG. 12 and FIG. 13.

The LC Layer 1013 is comprised of three LC entity types: (1) A Link Control Transparent Mode entity (LC-TM), the LC-TM 1013H; (2) a Link Control Unacknowledged Mode entity (LC-UM), the LC-UM 1013N; and (3) a Link Control Acknowledged Mode entity (LC-AM), the LC-AM 1013T. As described with reference to FIG. 8 the ciphering/deciphering and segmentation/concatenation procedures, of the messages between peer LC entities, are not performed.

The figure also includes the following SAPs: (1) The TM SAP 1014H; (2) the UM SAP 1014N; and (3) the AM SAP 1014T. These SAPs are used by the corresponding entities of the LC Layer 1013 for providing the UPLRs 1019R with the TM, UM, and AM data transfer services.

The primitives between the TrL and LC are: (1) The TRL-DATA-Req; and (2) the TRL-DATA-Ind. Both primitives have the following parameters: (1) The Data parameter that is mapped from/to the LC Service Data Unit (SDU); (2) the LCH-Identity parameter, indicating the LCH that the Data is sent to or received from; and (3) the UE-Identity parameter. TRL-DATA-Req is used by the UPLRs to request transmission of a SDU. TRL-DATA-Ind is used by the TrL entity to deliver to the UPLRs a TRL SDU that has been received from a peer entity.

A single primitive which belongs to the UPLRs 1019R, the CPHY-RL-SETUP-Req with the LCH-Identity parameter, is used between the TrL and the RC. This primitive is used by the RC Layer for requesting the TrL to create and initialize the LCH, wherein the LCH-Identity parameter indicates the LCH identity.

The primitives between the LC Layer 1013 and the UPLRs 1019R are depicted in Table-1 shown in FIG. 10B. The rows of Table-1 represent the primitives that are used in the interaction between the LC Layer 1013 and the UPLRs 1019R, whilst the columns represent specific types of those primitives, namely "Request", "Indication", or "Confirmation". The meaning of the types is the same as in the 3GPP Specifications. Each cell of Table-1 defines a list of parameters for the specific primitive in the row and of the specific type in the column. The "Not Defined" token in a cell means that the specific type, in the column title of the corresponding primitive in the row, is not defined in the present invention. The "w/o Parameters" token in a cell means that the specific type, in the column title of the corresponding primitive in the row, does not have parameters.

RLC-AM-DATA-Req is used by the UPLRs 1019R to request transmission of a LC SDU in AM. RLC-AM-DATA-Ind is used by the LC-AM 1013T to deliver to the UPLRs 1019R a LC SDU that has been received in AM. The RLC-AM-DATA-Cnf is used by the LC-AM 1013T to confirm to the UPLRs 1019R the sending of a LC SDU to the peer LC-AM (not shown). The RLC-UM-DATA-Req is used by the UPLRs 1019R to request transmission of a LC SDU in UM. The RLC-UM-DATA-Ind is used by the LC-UM 1013N to deliver to the UPLRs 1019R a LC SDU that has been received in UM. The RLC-UM-DATA-Cnf is used by the LC-UM 1013N to report to the UPLRs 1019R regarding a discarded LC SDU. This is used for backward compatibility with the 3GPP RRC. The RLC-TM-DATA-Req is used by the UPLRs 1019R to request transmission of a LC SDU in TM. The RLC-TM-DATA-Ind is used by the LC-TM 1013H to deliver to the UPLRs 1019R a LC SDU that has been received in TM. The RLC-TM-DATA-Cnf is used by the LC-TM 1013H to report to the UPLRs 1019R regarding a discarded LC SDU.

The CRLC-CONFIG-Req is used by the UPLRs 1019R to establish a new LC Entity, or to release an already running LC Entity. The CRLC-SUSPEND-Req is used by the UPLRs 1019R to suspend the LC-UM 1013N or the LC-AM 1013T. The CRLC-SUSPEND-Cnf is used by the LC-UM 1013N or the LC-AM 1013T to confirm that the entity is suspended. The CRLC-RESUME-Req is used by the UPLRs 1019R to resume the LC-UM 1013N or the LC-AM 1013T, after the LC-UM 1013N or the LC-AM 1013T has been suspended.

The parameters of the primitives between the LC Layer 1013 and the UPLRs 1019R comprise the following: (1) The Data parameter, wherein this parameter is a LC SDU that is mapped onto the Data field in the LC PDU; (2) the Confirmation Request (CNF) parameter, wherein this parameter indicates whether the transmitting side of the LC-AM 1013T needs to confirm the sending of the LC SDU; (3) the Message Unit Identifier (MUI) parameter, wherein this parameter is an identity of the LC SDU, which is used to indicate which LC SDU is confirmed with the RLC-AM-DATA-Cnf primitive; (4) the Establishment/Release (E/R) parameter, wherein this parameter indicates the need for establishment of a new LC Entity, or release of an already running LC Entity, and wherein If release is requested, then all protocol parameters, variables and timers are released and the specified LC entity enters the NULL state; (5) the UE-ID parameter, wherein this parameter is the UE identification that is used with the associated LC SDU; and (6) the Mode parameter, wherein this parameter is an enumerated field i.e. Acknowledged, Unacknowledged, and Transparent, that specifies the operation mode of the specified LC entity.

The LC-TM 1013H follows the state model of the prior art RLC-TM, as described in the 3GPP TS 25.322, and can be in one of the two following states: (1) The NULL state in which the LC-TM 1013H does not exist; or (2) The DATA_TRANSFER_READY state in which TM data exchange enabled between the peer entities of the LC-TM.

At the NULL state and upon reception of the CRLC-CONFIG-Req primitive from the UPLRs 1019R indicating establishment (E/R=Establish), the LC-TM 1013H is created and enters the DATA_TRANSFER_READY state.

At the DATA_TRANSFER_READY state and upon reception of the CRLC-CONFIG-Req primitive from the UPLRs 1019R indicating release (E/R=Release), the LC-TM 1013H is terminated and enters the NULL state.

The LC-TM data transfer procedure follows the RLC-TM data transfer procedure of the prior art, as described in the 3GPP TS 25.322. It is used for transferring data between the peer entities of the LC-TM. The procedure applies to entities in the DATA_TRANSFER_READY state.

The LC Non-TM Entities, i.e. either the LC-AM 1013T or the LC-UM 1013N can be in one of the three following states: (1) The NULL state, in which the specified LC entity does not exist; (2) the DATA_TRANSFER_READY state, in which Non-TM data exchange enabled between the specified peer LC Non-TM Entities; and (3) The LOCAL_SUSPEND state in which the specified LC entity does not send PDUs.

At the NULL state and upon reception of the CRLC-CONFIG-Req primitive from the UPLRs 1019R indicating establishment (E/R=Establish), the specified LC Entity is created and enters the DATA_TRANSFER_READY state.

At the DATA_TRANSFER_READY state and upon reception of the CRLC-SUSPEND-Req primitive from the UPLRs 1019R, the specified LC entity returns the CRLC-SUSPEND-Req message and enters the LOCAL_SUSPEND state.

At the LOCAL_SUSPEND state and upon reception of the CRLC-RESUME-Req primitive from the UPLRs 1019R, the specified LC entity enters the DATA_TRANSFER_READY state and resumes the data transmission.

At either the DATA_TRANSFER_READY state or the LOCAL_SUSPEND state and upon reception of the CRLC-CONFIG-Req primitive from the UPLRs 1019R indicating release (E/R=Establish), the specified LC entity remains in the current state.

At either the DATA_TRANSFER_READY state or the LOCAL_SUSPEND state and upon reception of the CRLC-CONFIG-Req primitive from the UPLRs 1019R indicating release (E/R=Release), the specified LC entity is terminated and enters the NULL state.

The Non-TM data transfer procedure is used for transferring data between the peer entities of the LC-AM, or the peer entities of the LC-UM. This procedure is applied to the LC Entities in the DATA_TRANSFER_READY state as follows: (1) Upon request of the Non-TM data transfer, i.e. the RLC-UM-DATA-req primitive or the RLC-AM-DATA-req primitive, from the UPLRs 1019R via the corresponding SAP, the specified LC entity: (a) Submits the received LC SDU, i.e. the Data parameter of the corresponding primitive, to the TrL 1011 as the corresponding Unacknowledged Mode Data (UMD) PDU or the Acknowledged Mode Data (AMD) PDU, via the corresponding LCH; and (b) in the case of the AM data transfer and if it was requested by the UPLRs 1019R by setting the CNF parameter, submits the RLC-AM-DATA-Cnf primitive to the UPLRs 1019R as a transmission acknowledgement; and (2) Upon reception of the corresponding UMD PDU or AMD PDU from the TrL 1011, the specified LC entity: (a) Considers the data part in this PDU as one complete LC SDU; and (2) submits the LC SDU to the UPLRs 1019R via the corresponding SAP, as the Data parameter of the corresponding RLC-UM-DATA-ind primitive or the RLC-AM-DATA-ind primitive.

FIG. 10B illustrates the table of primitives between the LC Layer and the Upper Layers (UPLRs).

Table-1 shows the primitives between the LC Layer 1013 and the UPLRs 1019R as described with reference to FIG. 10A.

Figure 11:
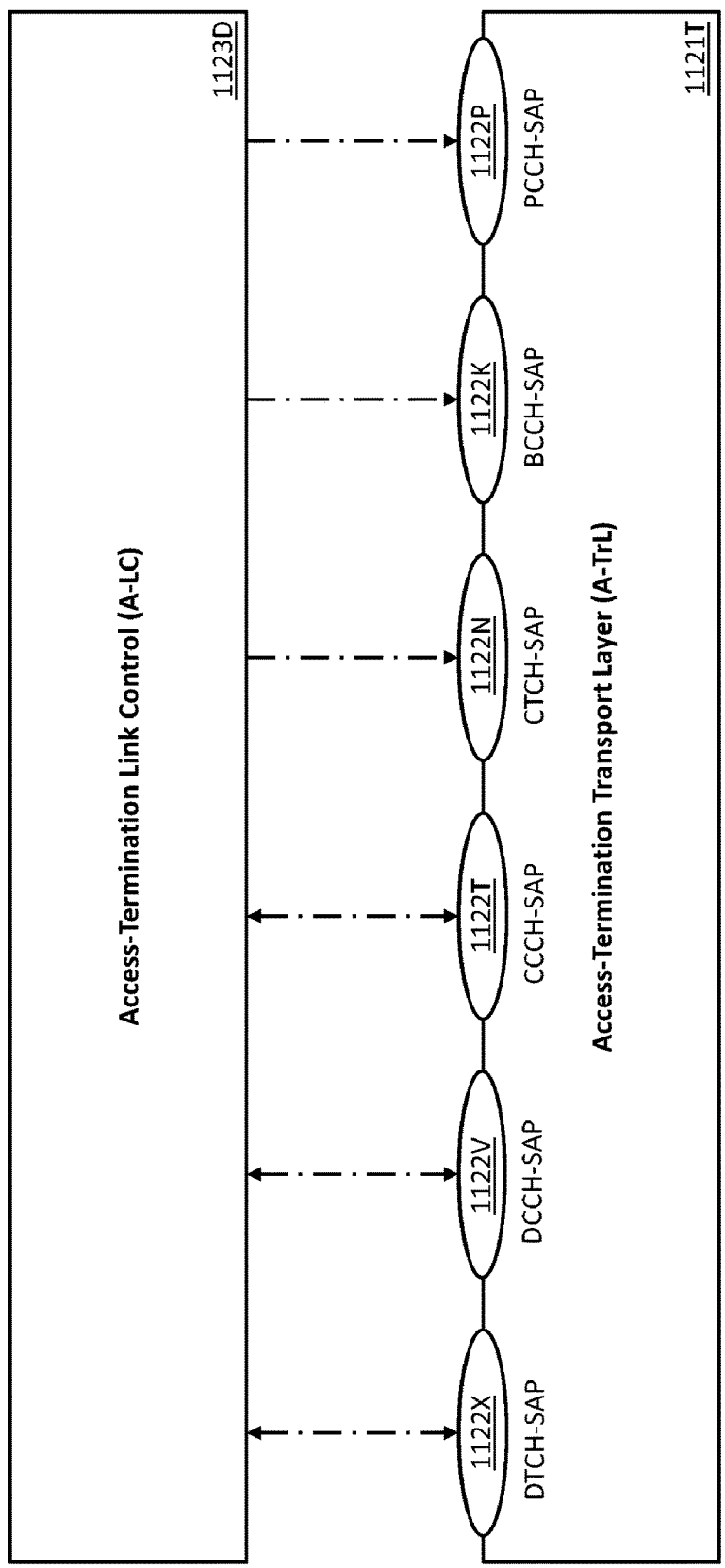
FIG. 11 illustrates the Transport Layer (TrL) relationships with the LC Layer.

FIG. 11 illustrates the Transport Layer (TrL) relationships with the LC Layer.

The figure includes the following Lower Layers of the CA AT: (1) The A-LC Layer 1123D; and (2) the A-TrL 1121T. The figure is simplified for illustration purposes by showing the CA AT Layers, however not showing the peer CA TE Layers. It should be apparent to any person skilled in the art that the peer T-LC Layer (not shown) and the peer T-TrL (not shown) use the same set of SAPs as the A-LC Layer 1123D and the A-TrL 1121T respectively however the directions of the data flows represented by the arrows are reversed.

In the preferred embodiments, the TrL is implemented by an IPC method. In some embodiments, the TrL is implemented as a three entity configuration, supporting for example the Shared Memory IPC method, as described with reference to FIG. 15. In other embodiments the TrL is implemented as a single entity configuration, supporting for example the Pipe IPC method, as described with reference to FIG. 12 and FIG. 13.

The TrL comprises: (1) Plurality of the Unidirectional LCHs 1212H, in both directions, as described with reference to FIG. 12; and (2) plurality of the Bidirectional LCHs 1312Q, as described with reference to FIG. 13.

The function of the TrL is to transfer the LC PDUs between the peer LC entities. The A-TrL 1121T gives its services to the A-LC Layer 1123D via the following LCH SAPs: (1) The Broadcast Control CHannel SAP (BCCH-SAP) 1122K; (2) the Paging Control CHannel SAP (PCCH- SAP) 1122P; (3) the Common Control CHannel SAP (CCCH-SAP) 1122T; (4) the Dedicated Control CHannel SAP (DCCH-SAP) 1122V; (5) the Dedicated Traffic CHannel SAP (DTCH-SAP) 1122X and (6) the Common Traffic CHannel SAP (CTCH-SAP) 1122N.

Figure 12:
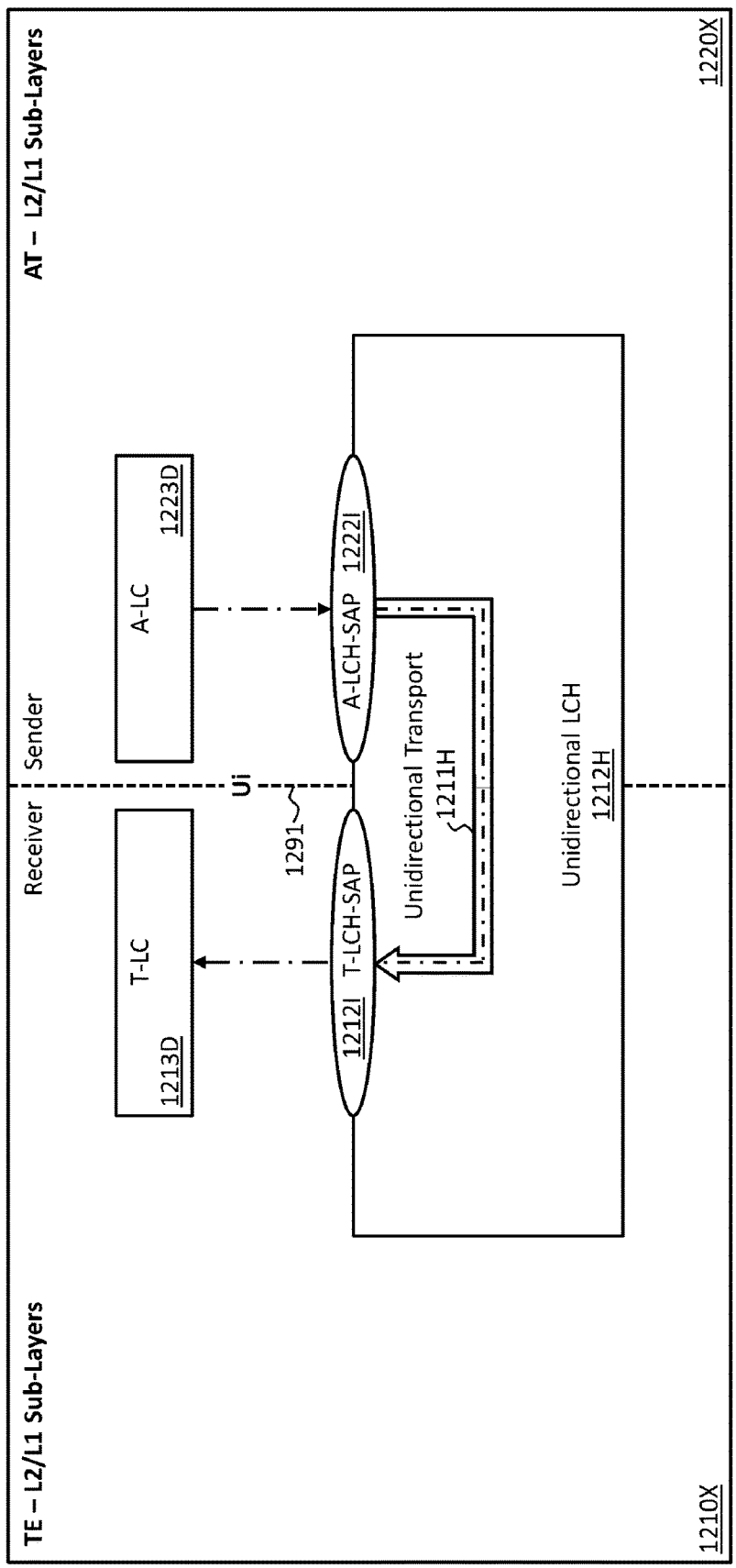
FIG. 12 illustrates the unidirectional Logical CHannel (LCH) model in some embodiments.

FIG. 12 illustrates the unidirectional Logical CHannel (LCH) model in some embodiments.

The figure includes: (1) The CA AT-L2/L1 Sub-Layers 1220X of the CA AT representing in some embodiments a Sender side, comprising the A-LC Layer 1223D; (2) the CA TE-L2/L1 Sub-Layers 1210X of the CA TE representing in some embodiments a Receiver side, comprising the T-LC Layer 1213D; (3) the Ui Interface 1291 between the Sender and the Receiver; and (4) the Unidirectional LCH 1212H that serves both sides, comprising of: (a) An Access-termination LCH SAP (A-LCH-SAP), the A-LCH-SAP 12221; (b) A Terminal-equipment LCH SAP (T-LCH-SAP), the T-LCH-SAP 12121; and (c) the Unidirectional Transport 1211H which transports messages/data from the A-LCH-SAP 12221 to the T-LCH-SAP 12121. It should be apparent to any person skilled in the art that in some embodiments the direction of Unidirectional LCH 1212H can be reversed, i.e. the T-LC Layer 1213D plays the role of the Sender and the A-LC Layer 1223D plays the role of the Receiver.

The Unidirectional LCH 1212H comprises one of the CTCH, BCCH or PCCH, as described with reference to FIG. 11, and gives its services to the A-LC Layer 1223D and the T-LC Layer 1213D via the A-LCH-SAP 12221 and T-LCH-SAP 12121 respectively. Hence, the Sender A-LC Layer 1223D sends the messages/data towards the A-LCH-SAP 12221 and the Receiver T-LC Layer 1213D receives the messages/data from the T-LCH-SAP 12121. The Unidirectional Transport 1211H, which belongs to the hosting OS, gives transport services to both the A-LC Layer 1223D and the T-LC Layer 1213D entities via the A-LCH-SAP 12221 and T-LCH-SAP 12121 respectively.

The Unidirectional Transport 1211H is implemented by an IPC method. The IPC methods comprise one of the following methods, or combinations thereof: (1) Socket; (2) Message Queue (MQ); (3) Pipe; (4) Shared Memory controlled by Semaphore(s); and (5) Message Passing. It should be apparent to any person skilled in the art that other IPC methods, or combinations thereof, can be used depending on the following: (1) The data stream type; (2) the capabilities of the Operating System (OS); and (3) the physical architecture of the CD as described with reference to FIG. 16, FIG. 17, FIG. 18 and FIG. 19.

In some embodiments, as shown in the figure, the Unidirectional Transport 1211H is based on the Pipe IPC method and represents some pre-allocated portion of the physical memory, controlled by the OS, which is designated specifically for inter-communication between peer entities. In other embodiments, other IPC methods are used as described with reference to FIG. 15.

Figure 13:
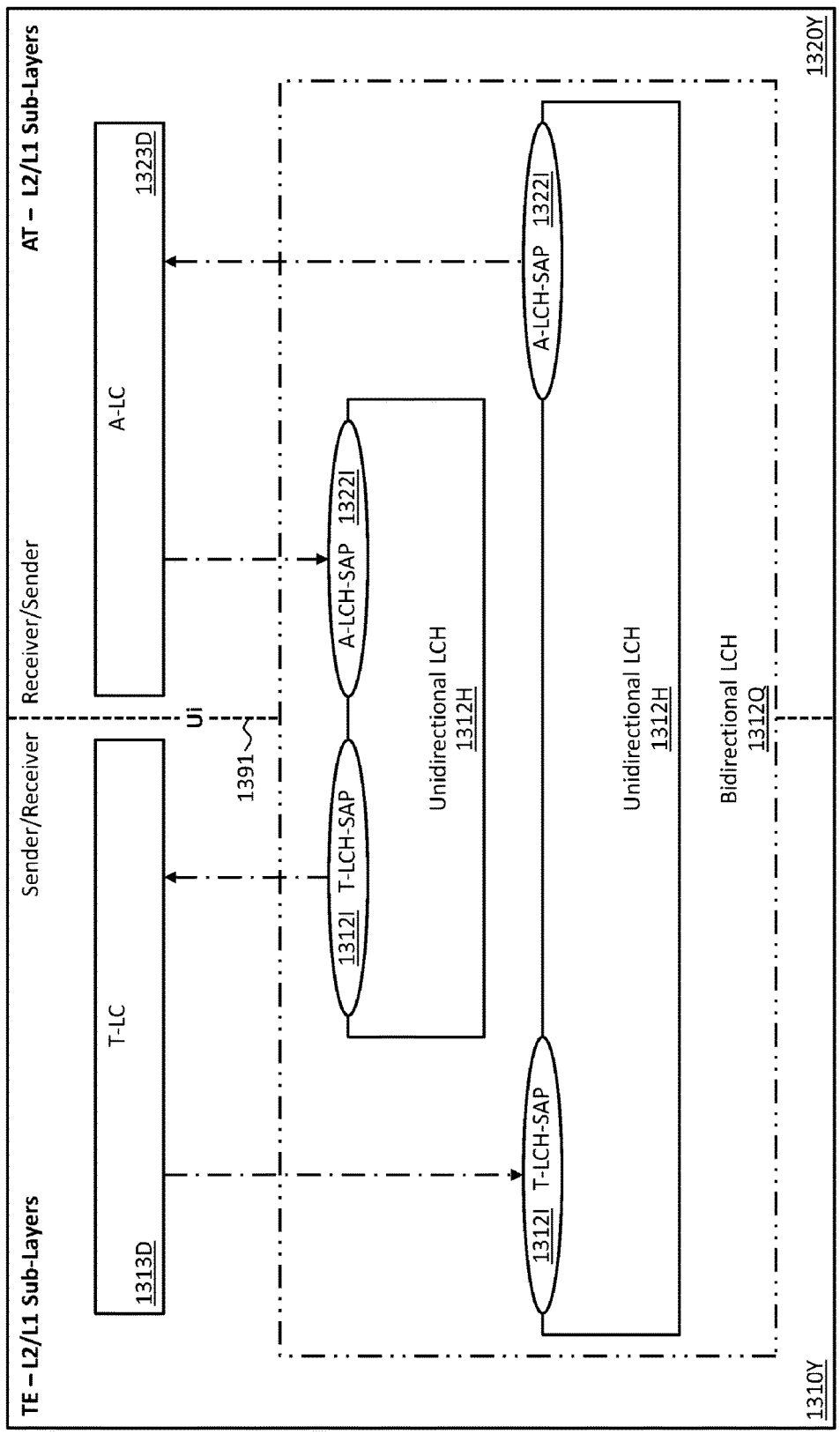
FIG. 13 illustrates the bidirectional logical channel model in some embodiments.

FIG. 13 illustrates the bidirectional logical channel model in some embodiments.

The figure includes: (1) the AT-L2/L1 Sub-Layers 1320Y with shown A-LC Layer 1323D; (2) the TE-L2/L1 Sub-Layers 1310Y with shown T-LC Layer 1313D; and (3) the Bidirectional LCH 1312Q.

The bidirectional LCH 1312Q is created from two separate unidirectional LCHs 1312H that are working in opposite directions, comprises one of the DTCH, DCCH or CCCH, as described with reference to FIG. 11. Both Unidirectional LCHs 1312H give their services to both sides, i.e. the A-LC Layer 1323D and the T-LC Layer 1313D entities via the A-LCH-SAP 13221 and T-LCH-SAP 13121 respectively.

The Bidirectional LCH 1312Q utilizes the Ui Interface 1391 to transfer messages/data between the peer LC entities in both directions.

In some embodiments, e.g. using the CA 1570M as described with reference to FIG. 15, the TrL is created just after power up, or hard reset of the CA with the initial collection of LCHs e.g. CCCH, BCCH, and PCCH. It is the responsibility of the RC entity to trigger a creation of additional LCHs, e.g. DCCH and DTCH, when needed and bind the specific LC entities to the corresponding LCH. In the case that multiple LC entities are bound to a single LCH, the TrL is responsible to route the data to the corresponding LC entities using LCH-ID parameter. In other embodiments, e.g. using the CA 1570R as described with reference to FIG. 15, the TrL is not created. In these embodiments, a TE and AT (TE-AT) emulator, the TE-AT Emulator 1529A and the CA NT 1521R communicate directly.

Figure 14:
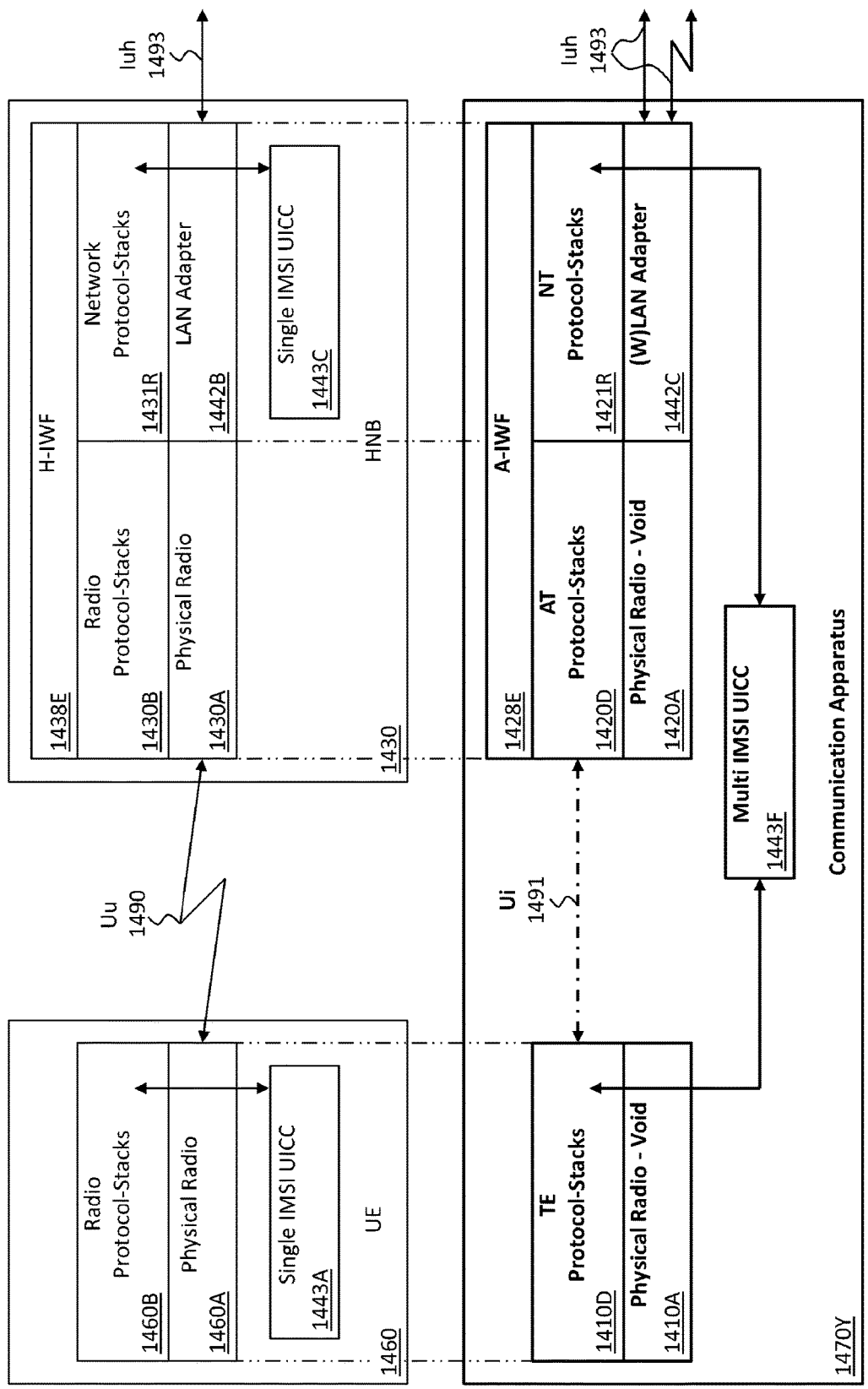
FIG. 14 illustrates the CA reference architecture and its derivation from the prior art.

FIG. 14 illustrates the CA reference architecture and its derivation from the prior art.

The figure includes: (1) The UE 1460 and the HNB 1430, communicating over the Uu Air Interface 1490; and (2) the CA 1470Y.

The UE 1460 comprises: (1) The Radio Protocol Stacks 1460B; (2) the Single IMSI UICC 1443A; and (3) the UE Physical Radio entity 1460A.

The HNB 1430 comprises: (1) The Radio Protocol Stacks 1430B; (2) the Network Protocol Stacks 1431R that provide means for communication of the HNB 1430 with the CN (not shown) via the HNB-GW (not shown); (3) the H-IWF entity 1438E characterized by the following: (a) Performing protocol conversion between the Radio Protocol Stacks 1430B and the Network Protocol Stacks 1431R; and (b) relay messages and data between the two protocols; (4) the Single IMSI UICC 1443C hosting the USIM application; (5) the LAN Adapter 1442B providing wired communication between the HNB 1430 and the CN (not shown) over the Iuh Interface 1493; and (6) the HNB Physical Radio entity 1430A. It should be apparent to any person skilled in the art that the Uu Air Interface 1490, between the UE 1460 and the HNB 1430, is a physical wireless interface supported by physical radios on both sides, wherein the UE Physical Radio entity 1460A and the HNB Physical Radio entity 1430A are driven by the U-Phy Layer 761B and the H-Phy Layer 731B, respectively, as shown in FIG. 7.

The CA 1470Y comprises: (1) the CA TE 1410D that provides the Radio Protocol Stacks 1460B functionality of the UE 1460; (2) the CA NT1421R that provides the Network Protocol Stacks 1431R functionality of the HNB 1430 and is responsible for communication with the HNB-GW (not shown); (3) the CA AT 1420D that provides the Radio Protocol Stack 1430B functionality of the HNB 1430 and is responsible for communication between the CA TE 1410D and the CA NT 1421R; (4) the A-IWF entity 1428E characterized by the following: (a) Performing protocol conversion between the CA AT 1420D and the CA NT 1421R; and (b) relay messages and data between the two protocols; (5) Multi IMSI UICC 1443F; (6) the (W)LAN Adapter 1442C providing wired/wireless communication between the CA 1470Y and the CN (not shown) over the Iuh Interface 1493; and (7) the peer Physical Radio entities which are void, the TE Physical Radio Void entity 1410A and the AT Physical Radio Void entity 1420A. The communication link between the CA TE 1410D and the CA AT 1420D is based on the Ui Interface 1491, which as described with reference to FIG. 8 is based on an IPC method supported by the device's OS. It should be apparent to any person skilled in the art, that the Ui Interface 1491 is a Non-Wireless Interface, which does not require Physical Radio entities for transport, therefore as shown in the figure, when combining the functionalities of the two entities, the UE 1460 and the HNB 1430, into one entity, the CA 1470Y, the peer Physical Radio entities are void: (a) The TE Physical Radio Void entity 1410A; and (b) the AT Physical Radio Void entity 1420A.

The figure shows the CA 1470Y architecture based on the CA 1570M as described with reference to FIG. 15. The Multi IMSI USIM applications (not shown) are hosted by the Multi IMSI UICC 1443F. The Multi IMSI USIM applications (not shown) perform security procedures and securely store the IMSI, authentication and ciphering information for the following entities running on the CA 1470Y and connecting to the CN: (1) the CA TE 1410D; and (2) the CA NT 1421R, both connecting to the CN in the I-Mode over the Iuh Interface 1493. With reference to the alternate embodiment of FIG. 15, the CA 1570R uses multi IMSI USIM applications services (not shown) while connecting to the CN with its CA NT 1521R. Credentials for all entities comprising the CA 1470Y, and using the CN services, are dependent on the MNO policy. In the prior art there is a mechanism in the USIM application which enables the MNO to distinguish between the UE 1460 and the HNB 1430. In the present invention the same mechanism is used to distinguish among the UE 1460, the HNB 1430 and the CA 1470Y. As described with reference to FIG. 5, this mechanism allows the MNO to activate the policy in which location requirement is nullified.

Figure 15:
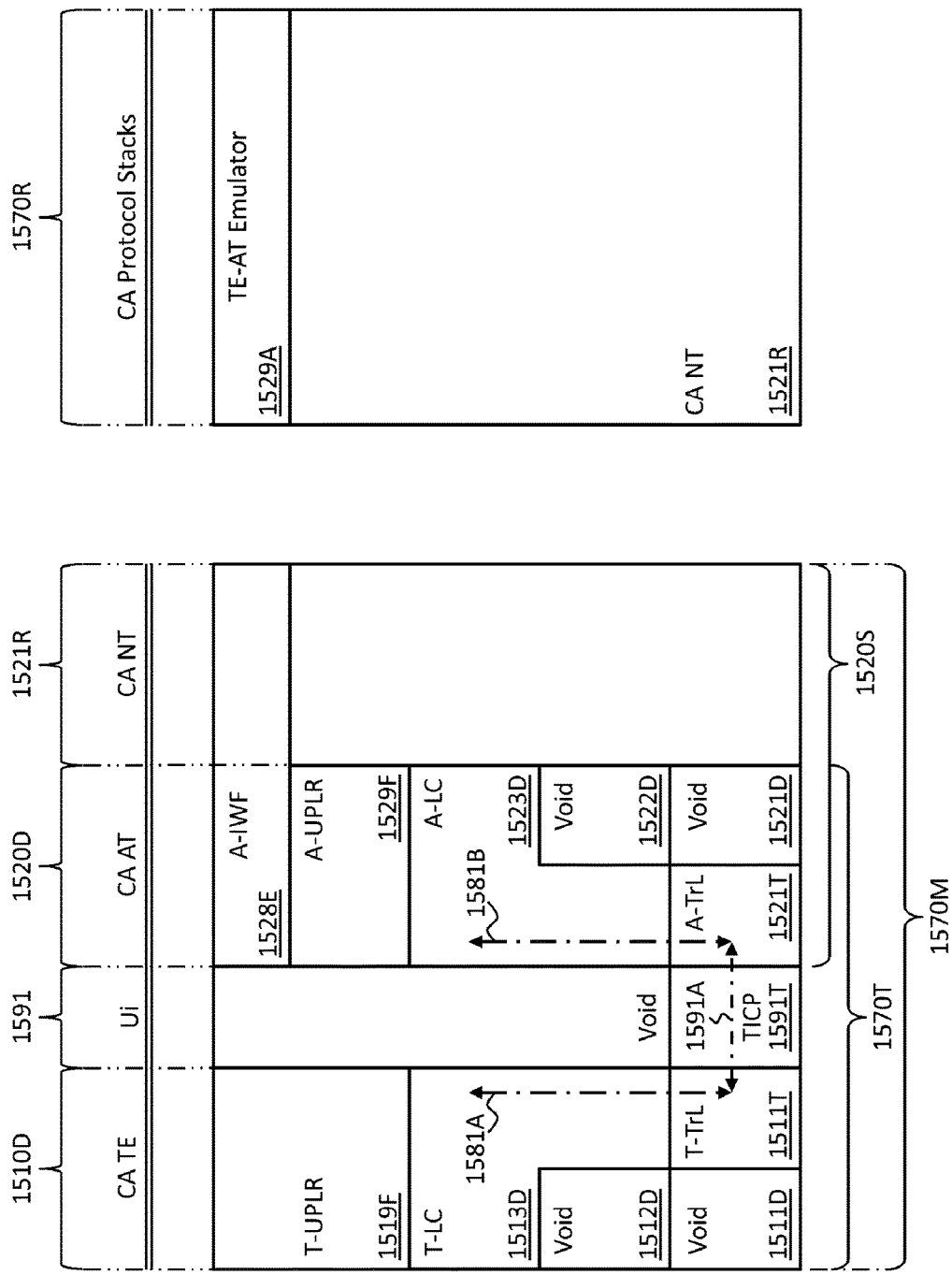
FIG. 15 illustrates the preferred and alternate CA protocol architecture embodiments.

FIG. 15 illustrates the preferred and alternate CA protocol architecture embodiments.

The figure illustrates the preferred embodiment for the CA architecture, the CA 1570M and an alternate embodiment for the CA architecture, the CA 1570R. The CA 1570M comprises: (1) the CA TE 1510D; and (2) the CA AT/NT 1520S, comprising: (a) the CA AT 1520D; and (b) the CA NT 1521R. The relations between the prior art protocol stacks and the corresponding present invention protocol stacks are described with reference to FIG. 14.

The communication link between the CA TE 1510D and the CA AT 1520D is based on the Ui Interface 1591. The A-IWF entity 1528E characterized by the following: (a) Performing protocol conversion between the CA AT 1520D and the CA NT 1521R; and (b) relay messages and data between the two protocols.

The CA TE 1510D comprises: (1) A Terminal-equipment UPLR (T-UPLR), the T-UPLR 1519F comprising Layer 3 and above, e.g. the NAS and the RC Layers for the C-Plane domain, or the Adaptive Multi-Rate (AMR) and the Packet Data Convergence Protocol (PDCP) Layers for the U-Plane domain; (2) the Link Control T-LC Layer 1513D; and (3) a Transport Layer, the T-TrL 1511T. The CA AT 1520D comprises the corresponding peers of the CA TE 1510D: (1) An Access-termination UPLR (A-UPLR), the A-UPLR 1529F; (2) the A-LC Layer 1523D; and (3) the A-TrL 1521T. As shown on the figure, the following prior art layers are void: (1) The T-MAC-Void Layer 1512D and the T-Phy-Void Layer 1511D of the CA TE 1510D; and (2) the A-MAC-Void Layer 1522D and the A-Phy-Void Layer 1521D of the CA AT 1520D.

The figure also illustrates a hop-by-hop a bi-directional data pass between two peer entities, the T-LC Layer 1513D and the A-LC Layer 1523D comprising the following hops: (1) The Data Hop 1581A between the T-LC Layer 1513D and the T-TrL 1511T; (2) the Data Hop 1591A, of the Ui Interface 1591, between the T-TrL 1511T and the A-TrL 1521T; and (3) the Data Hop 1581B, between the A-LC Layer 1523D and the A-TrL 1521T. The TICP 1591T, an intermediation entity which belongs to the hosting OS, gives transport services to both the T-TrL 1511T and the A-TrL 1521T in terms of the Data Hop 1591A.

In some embodiments, as shown on the figure, the Data Hop 1591A is based on the Shared Memory IPC method. The TICP 1591T represents some pre-allocated portion of the physical memory, controlled by the OS, which is designated specifically for inter-communication between peer entities. In other embodiments, other IPC methods are used, as described with reference to FIG. 12.

The CA 1570R comprises: (1) the CA NT 1521R and (2) the CA TE-AT Emulator 1529A emulating the functionality of the CA TE-AT 1570T.

The CA is embedded, without limitation, in one of the following CD basic architecture configurations: (1) The CD-A 1670A; (2) the CD-B 1770B; (3) the CD-C 1870C; or (4) the CD-D 1970D, as described with reference to FIG. 16, FIG. 17, FIG. 18 and FIG. 19 respectively.

Figure 16:
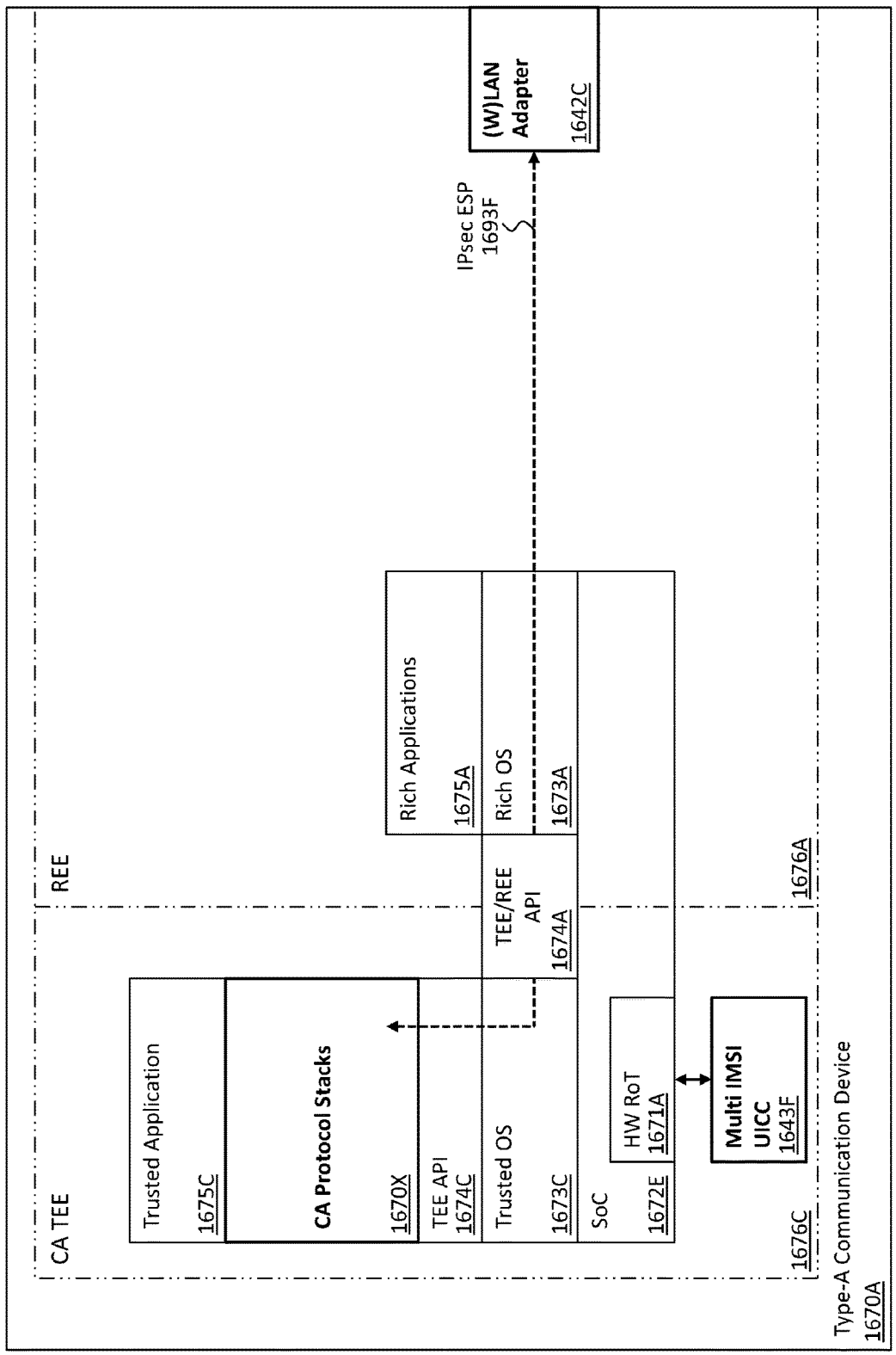
FIG. 16 illustrates the Type-A CD architecture in some embodiments.

FIG. 16 illustrates the Type-A CD architecture in some embodiments.

The figure shows a single System on Chip (SoC), I-Mode, CD Type-A configuration, referred to as the CD-A 1670A. The CD-A 1670A comprises: (1) The CA TEE 1676C supporting the CD's CA Protocol Stacks 1670X; (2) a Rich Execution Environment (REE), the REE 1676A supporting the CD's Rich Applications (RAs) 1675A; and (3) an Application Programming Interface (API), the TEE/REE API 1674A providing communication means between the CA TEE 1676C and the REE 1676A, based on an IPC method.

The following entities are built on the SoC 1672E: (1) The CA TEE 1676C; and (2) the REE 1676A.

It should be apparent to any person skilled in the art, that typical implementation examples for the CD-A 1670A are: (1) A Machine to Machine (M2M) using the evolved UICC (eUICC); and (2) a Connected Consumer Electronics (CCE), e.g. Game Console, using UICC.

The CA TEE 1676C comprises the following: (1) the I-Mode Trusted Application (I-TA) 1675C; (2) the CA Protocol Stacks 1670X; (3) the TEE API 1674C; (4) a Trusted Operating System (TOS), the TOS 1673C; (5) The SoC 1672E; (6) a HW Root of Trust (HW RoT), the HW RoT 1671A; and (7) the Multi IMSI UICC 1643F.

It should be apparent to any person skilled in the art that the CA Protocol Stacks 1670X represents the architecture of either the CA 1570M or the CA 1570R as described with reference to FIG. 15.

As described in the GlobalPlatform GPD_SPE_009 standard, the TEE is an execution environment that runs alongside but isolated from the REE. The TEE has security capabilities and meets certain security-related requirements, for supporting a single or multiple trusted applications: (1) It protects TEE assets from general software attacks; (2) defines rigid safeguards as to data and functions that a trusted application can access; and (3) resists a set of described threats. The isolation of the TEE from the REE can be achieved by either HW or SW means, or a combination thereof, however this aspect is out of the scope of the current invention. The CA 570Y is using the same security mechanisms, therefore meets the same security requirements as the HNB 430, as described with reference to FIG. 5 and FIG. 4 respectively. These security requirements are described in the 3GPP TS 33.320 and comprise of a TEE and a HW RoT. It should be apparent to any person skilled in the art, that there are multiple security technologies created by different standard bodies that can be used to implement the CA TEE 1676C and/or the HW RoT 1671A, e.g. the following non-exhaustive examples: (1) The ISO-11889 standards by the International Organization for Standardization/International Electrotechnical Commission (ISO/IEC) in cooperation with the Trusted Computing Group (TCG), regarding the Trusted Platform Module (TPM); and (2) an Open Mobile Terminal Platform (OMTP) standard, the OMTP TR1, regarding the TEE.

The HW RoT 1671A is a component that enables trust in computing platforms. The HW RoT 1671A comprises the following: (1) Authentication keys storage for one or more entities, e.g. the CA Protocol Stacks 1670X, wherein the authentication keys are used for platform authentication; and (2) a cryptographic engine for the TEE comprising a Random Number Generator (RNG) and a HW accelerator for ciphering/de-ciphering computations. It should be apparent to any person skilled in the art that if more than one entity is using the services provided by the HW RoT 1671A, then due to security requirements, these entities are isolated from each other. In some embodiments, the HW RoT 1671A is implemented as a stand-alone HW component, e.g. the TPM specified by the TCG. In other embodiments, the HW RoT 1671A is implemented as an integral component of the SoC on which the TEE is built, e.g. TrustZone® System Security by ARM®.

The TOS 1673C, in conjunction with the HW RoT 1671A, provide unique functionalities which are not provided by a Rich Operating System (ROS). The TOS 1673C functionalities comprise: (1) Maintaining the integrity of the CA TEE 1676C by managing the data in such a manner that it can be altered or moved only by entities having appropriate and authorized access rights; and (2) Maintaining the security of the CA TEE 1676C that it can be viewed only by entities having appropriate and authorized access rights.

The TEE API 1674C is used by the CA Protocol Stacks 1670X for communicating with the TOS 1673C. The TEE API 1674C also provides a number of different sub-sets of functionalities to the CA Protocol Stacks 1670X and to the I-TA 1675C e.g.: (1) integration, scheduling, communication, memory management, and system information retrieval interfaces; (2) trusted storage for keys and general data; and (3) cryptographic capabilities, as described in the GPD_SPE_009 standard.

The Multi IMSI UICC 1643F is described with reference to the Multi IMSI UICC 1443F in FIG. 14.

The REE 1676A comprises the following: (1) A plurality of Rich Applications (RAs), the RAs 1675A; (2) the ROS 1673A; (3) the SoC 1672E; and (4) the (W)LAN Adapter 1642C. It should be apparent to any person skilled in the art, that this component can be implemented as either an integral component of the SoC 1672E or as a separate element dependent on the SoC 1672E design. The figure does not show the HW components of the (W)LAN Adapter 1642C used for communication with the (W)LAN (not shown), however it should be apparent to any person skilled in the art that those components are integral part of the CD-A 1670A.

The CD-A 1670A execution environment is divided between two mutually exclusive execution environments, each with its own resources: (1) The CA TEE 1676C; and (2) the REE 1676A. The REE 1676A has access to the un-trusted resources but cannot access the trusted resources resided in the CA TEE 1676C. The REE 1676A and the RAs 1675A running on it are considered un-trusted. In some embodiments, this access control is enforced and implemented by physical isolation of the trusted resources from the un-trusted resources, by HW and/or SW means or a combination thereof. The only way for the REE 1676A to get access to the trusted resources of the CA TEE 1676C is over the TEE/REE API 1674A, e.g. the TEE Client API as described in the GPD_SPE_009 standard. This does not exclude the capability of the REE 1676A to pass data buffers to the CA TEE 1676C in a controlled and protected manner and vice versa. In this context the REE 1676A can function as the communication agent between the I-TA 1675C then the CA Protocol Stacks 1670X, and the IP broadband network (not shown) via the (W)LAN Adapter 1642C.

The REE 1676A is governed by the ROS 1673A, potentially in conjunction with other supporting operating systems and hypervisors. The ROS 1673A is an operating system with a rich capability set that allows consumers to install and run the RAs 1675A. The following list comprises non-exhaustive examples for the ROS 1673A: Android™, Linux®, Symbian OS™, and Microsoft® Windows® Phone 7.

In the preferred embodiment, the CA Protocol Stacks 1670X operating in the I-Mode, communicate with the MNO network (not shown) via the IPsec ESP Secured Tunnel 1693F over the Broadband IP Network (not shown). In other embodiments another security protocol can be used.

The (W)LAN Adapter 1642C is described with reference to the (W)LAN Adapter 1442C in FIG. 14.

Figure 17:
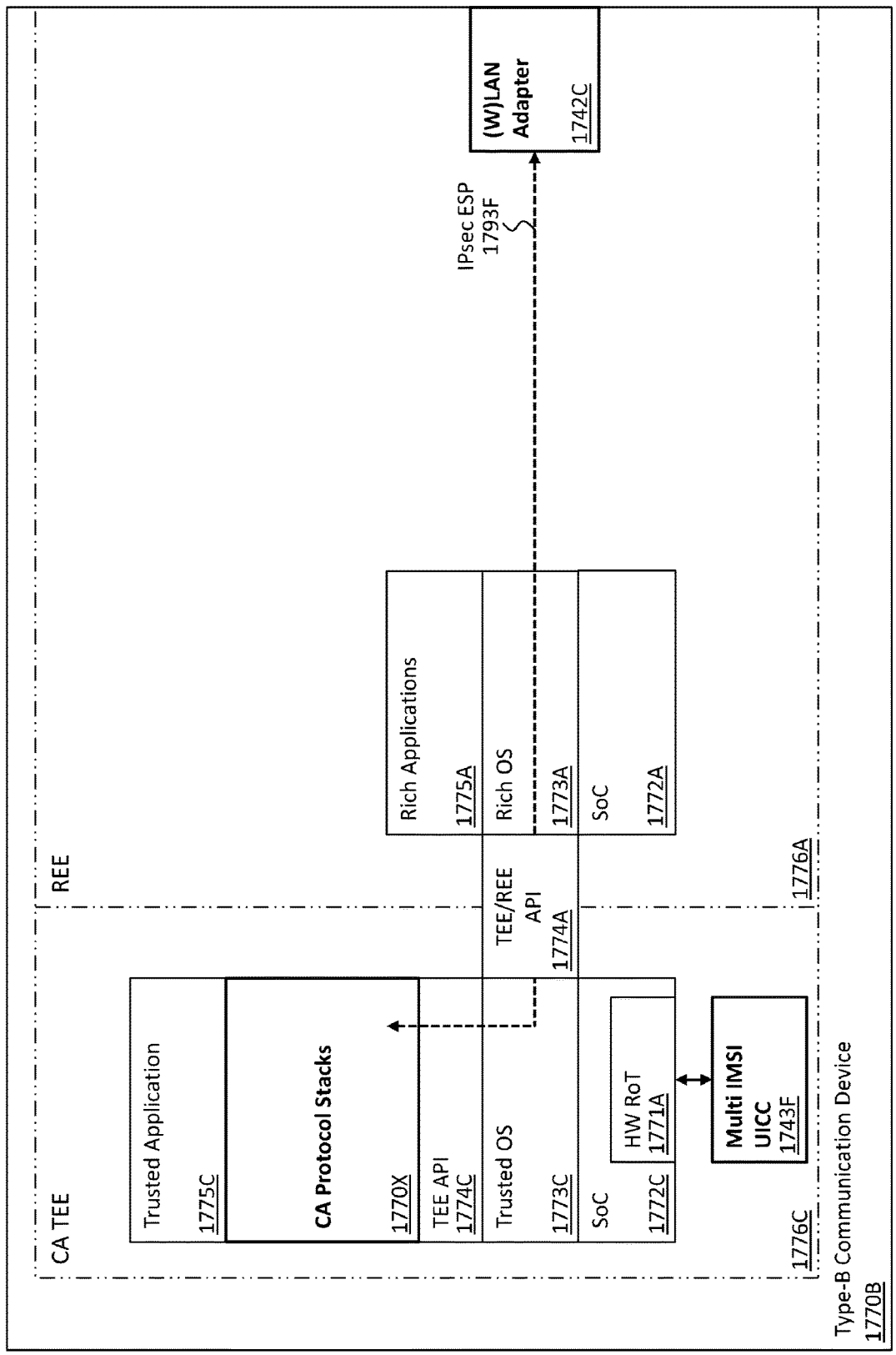
FIG. 17 illustrates the Type-B CD architecture in some embodiments.

FIG. 17 illustrates the Type-B CD architecture in some embodiments.

The figure shows a dual SoC, I-Mode, CD Type-B configuration, referred as the CD-B 1770B. The CD-B 1770B comprises: (1) The CA TEE 1776C supporting the CD's CA Protocol Stacks 1770X, as described with reference to the CA TEE 1676C in FIG. 16; (2) the REE 1776A supporting the RAs 1775A of the CD's, as described with reference to the REE 1676A in FIG. 16; and (3) the TEE/REE API 1774A providing communication means between the CA TEE 1776C and the REE 1776A, based on an IPC method, wherein the TEE/REE API 1774A utilizes a physical transport between the two separate SoCs.

The CA TEE 1776C is built on a 1st SoC, the SoC 1772C. The REE 1776A is built on a 2nd SoC, the SoC 1772A. It should be apparent to any person skilled in the art that the SoC 1772C and the SoC 1772A can be of the same or different models.

It should be apparent to any person skilled in the art, that a typical implementation example for the CD-B 1770B is a laptop computer hosting the REE 1776A and a USB-Dongle hosting the CA TEE 1776C.

The CA TEE 1776C comprises the following: (1) the I-TA 1775C; (2) the CA Protocol Stacks 1770X; (3) the TEE API 1774C, as described with reference to the TEE API 1674C in FIG. 16; (4) the TOS 1773C, as described with reference to the TOS 1673C in FIG. 16; (5) the SoC 1772C; (6) the HW RoT 1771A, as described with reference to the HW RoT 1671A in FIG. 16; and (7) the Multi IMSI UICC 1743F.

It should be apparent to any person skilled in the art that the CA Protocol Stacks 1770X represents the architecture of either the CA 1570M or the CA 1570R as described with reference to FIG. 15.

The Multi IMSI UICC 1743F is described with reference to the Multi IMSI UICC 1443F in FIG. 14.

The REE 1776A comprises the following: (1) The RAs 1775A; (2) the ROS 1773A, as described with reference to the ROS 1673A in FIG. 16; (3) the SoC 1772A; and (4) the (W)LAN Adapter 1742C. It should be apparent to any person skilled in the art, that this component can be implemented as either an integral component of the SoC 1772A or as a separate element dependent on the SoC 1772A design. The figure does not show the HW components of the (W)LAN Adapter 1742C used for communication with the (W)LAN (not shown), however it should be apparent to any person skilled in the art that those components are integral part of the CD-B 1770B.

In the preferred embodiment, the CA Protocol Stacks 1770X operating in the I-Mode, communicate with the MNO network (not shown) via the IPsec ESP Secured Tunnel 1793F over the Broadband IP Network (not shown). In other embodiments another security protocol can be used.

The (W)LAN Adapter 1742C is described with reference to the (W)LAN Adapter 1442C in FIG. 14.

Figure 18:
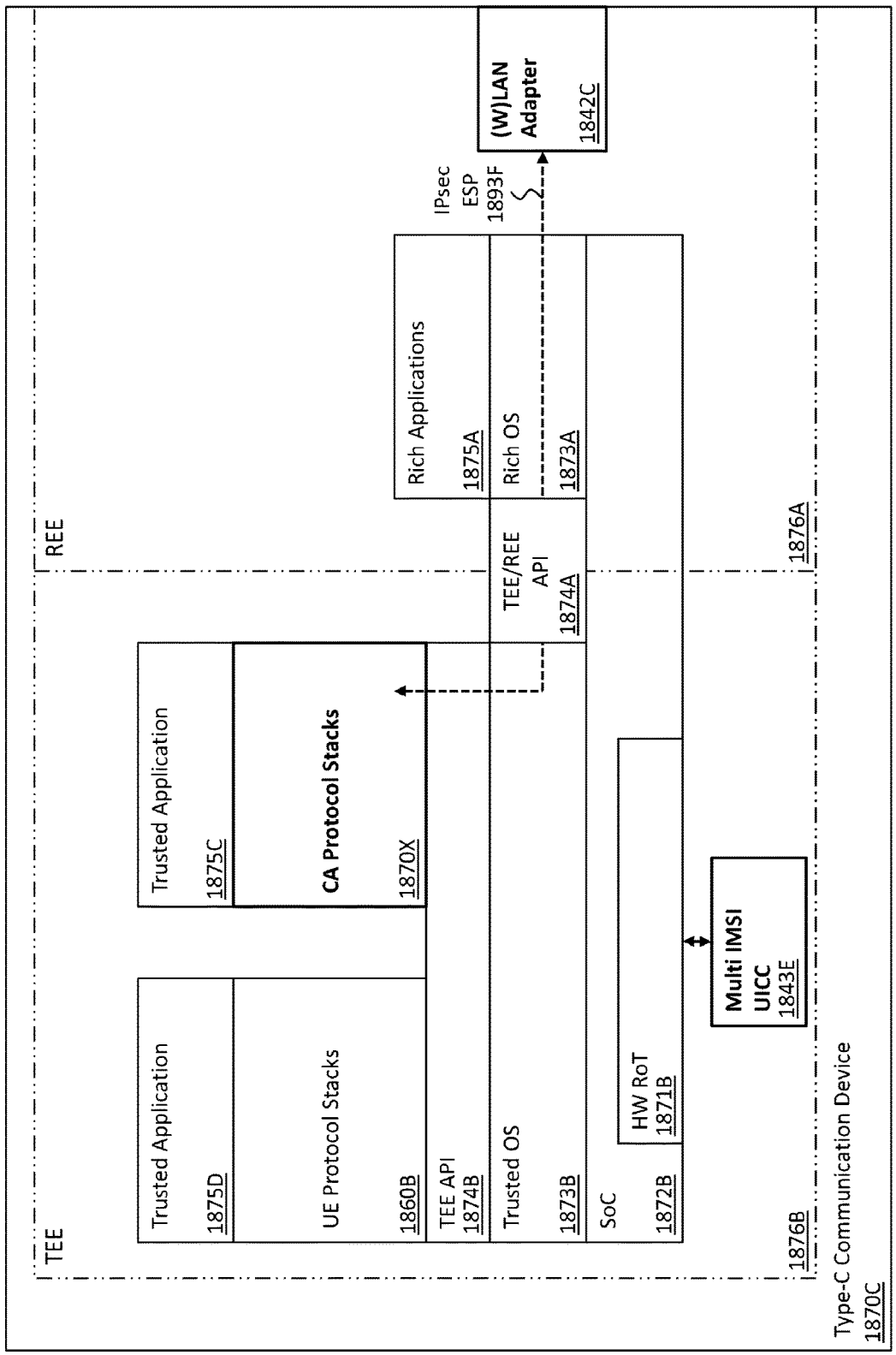
FIG. 18 illustrates the Type-C CD architecture in some embodiments.

FIG. 18 illustrates the Type-C CD architecture in some embodiments.

Void.

The figure shows a single SoC, dual I/U-Mode, CD Type-C configuration, referred as the CD-C 1870C. The CD-C 1870C comprises: (1) The TEE 1876B supporting both the CD's UE Protocol Stacks 1860B and the CD's CA Protocol Stacks 1870X, as described with reference to the CA TEE 1676C in FIG. 16; (2) the REE 1876A supporting the RAs 1875A of the CD's, as described with reference to the REE 1676A in FIG. 16; and (3) the TEE/REE API 1874A providing communication means between the TEE 1876B and the REE 1876A, based on an IPC method.

The following entities are built on the SoC 1872B: (1) The TEE 1876B; and (2) the REE 1876A.

It should be apparent to any person skilled in the art, that a typical implementation example for the CD-C 1870C is a Low-Tier Smartphone, wherein both the Base-Band Processor and the Application Processor are sharing the SoC 1872B.

The TEE 1876B comprises the following: (1) The U-Mode Trusted Application (U-TA) 1875D; (2) the I-TA 1875C; (3) the UE Protocol Stacks 1860B; (4) the CA Protocol Stacks 1870X; (5) the TEE API 1874B; (6) the TOS 1873B, supporting both the UE Protocol Stacks 1860B and the CA Protocol Stacks 1870X, as described with reference to the TOS 1673C in FIG. 16; (7) the SoC 1872B; (8) the HW RoT 1871B for supporting both the UE Protocol Stacks 1860B and the CA Protocol Stacks 1870X, as described with reference to the HW RoT 1671A in FIG. 16; and (9) the Multi IMSI UICC 1843E.

It should be apparent to any person skilled in the art that the CA Protocol Stacks 1870X represents the architecture of either the CA 1570M or the CA 1570R as described with reference to FIG. 15.

Both the CA Protocol Stacks 1870X and the UE Protocol Stacks 1860B, communicate with the TOS 1873B over the TEE API 1874B. The TEE API 1874B is used by the CA Protocol Stacks 1870X and the UE Protocol Stacks 1860B, for utilizing the TEE 1876B capabilities, as described with reference to the TEE API 1674C in FIG. 16.

The basic functionality of the Multi IMSI UICC 1843E is described with reference to the Multi IMSI UICC 1443F in FIG. 14. The Multi IMSI UICC 1843E comprises an IMSI and a USIM application (not shown) for supporting the U-TA 1875D and the UE Protocol Stacks 1860B. The Multi IMSI UICC 1843E also comprises the IMSIs and the USIM applications supporting the I-TA 1875C and the CA Protocol Stacks 1870X.

The REE 1876A comprises the following: (1) the RAs 1875A; (2) the ROS 1873A, as described with reference to the ROS 1673A in FIG. 16; (3) the SoC 1872B; and (4) the (W)LAN Adapter 1842C. It should be apparent to any person skilled in the art, that this component can be implemented as either an integral component of the SoC 1872B or as a separate element dependent on the SoC 1872B design.

The figure does not show the HW components of the (W)LAN Adapter 1842C used for communication with the (W)LAN (not shown), however it should be apparent to any person skilled in the art that those components are integral part of the CD-C 1870C.

In the preferred embodiment, the CA Protocol Stacks 1870X operating in the I-Mode, communicate with the MNO network (not shown) via the IPsec ESP Secured Tunnel 1893F over the Broadband IP Network (not shown). In other embodiments another security protocol can be used.

The (W)LAN Adapter 1842C is described with reference to the (W)LAN Adapter 1442C in FIG. 14.

In some embodiments, the U-TA 1875D together with the UE Protocol Stacks 1860B represent prior art UE SW e.g. a Smartphone SW. The figure does not show the HW components associated with the UE Protocol Stacks 1860B, however it should be apparent to any person skilled in the art that those components are integral part of the CD-C 1870C. In the I-Mode of operation, the CA Protocol Stacks 1870X are connected to the MNO network over the Iuh Interface 593, as described with reference to FIG. 5. In the U-Mode of operation, the UE Protocol Stacks 1860B are connected to the MNO network over the Uu Air Interface 490, as described with reference to FIG. 4. The RAs 1875A is responsible to control the CD-C 1870C mode of operation, either the I-Mode, or the U-Mode according to user commands in accordance with the requirements. Upon user decision, and depending on the IMSIs hosted by the Multi IMSI UICC 1843E, the I-Mode and the U-Mode can run with either a single MNO or with different MNOs. It should be apparent to any person skilled in the art that when both the I-Mode and the U-Mode are running with a single MNO, a transition between the UE and the CA is possible, depending on network policy.

Figure 19:
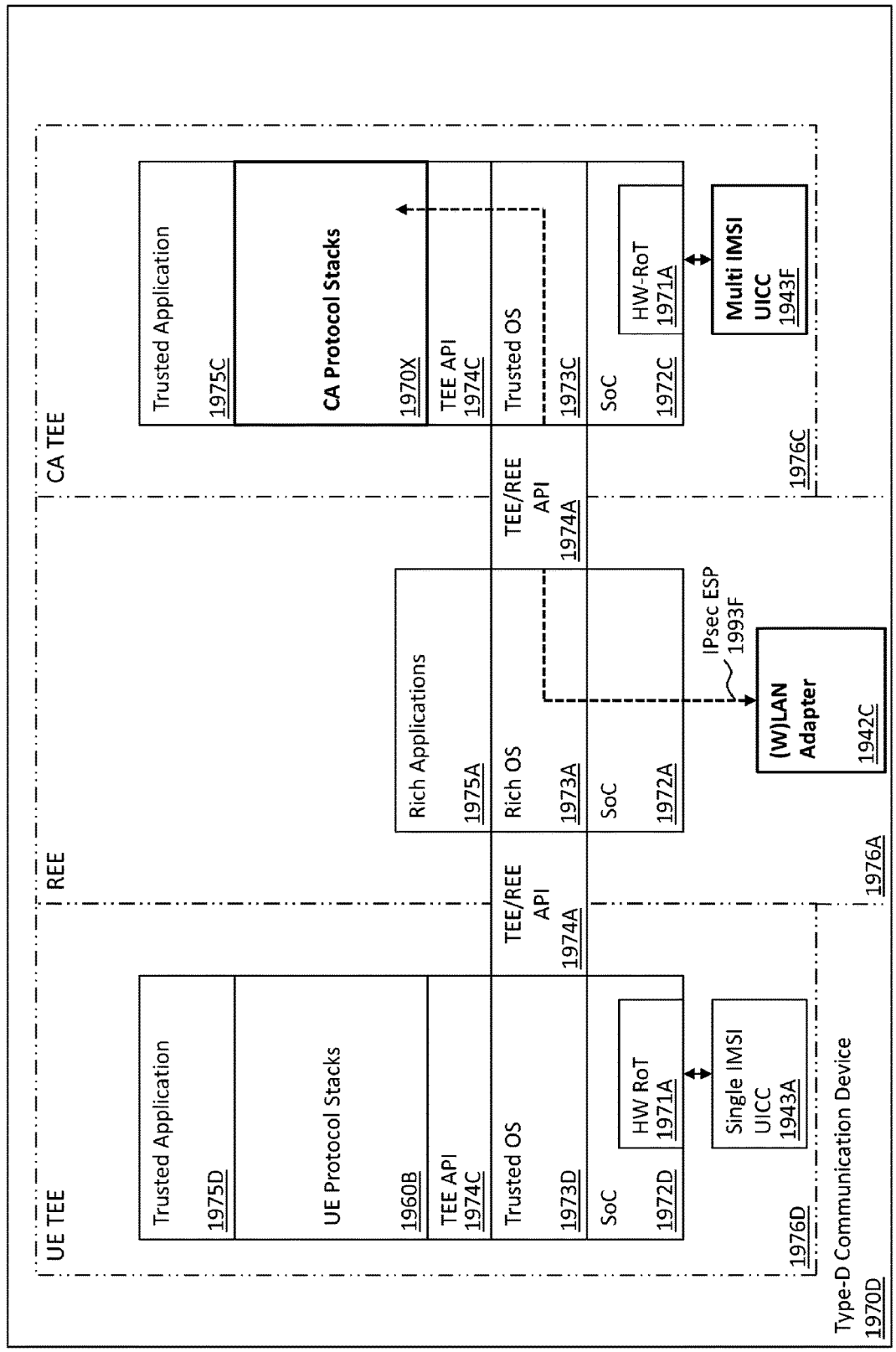
FIG. 19 illustrates the Type-D CD architecture in some embodiments.

FIG. 19 illustrates the Type-D CD architecture in some embodiments.

Void.

The figure shows a multiple SoC, dual I/U-Mode, CD Type-D configuration, referred as the CD-D 1970D. The CD-D 1970D comprises: (1) The UE TEE 1976D supporting the CD's UE Protocol Stacks 1960B, as described with reference to the CA TEE 1676C in FIG. 16, wherein the UE Protocol Stacks 1960B replacing the CA Protocol Stacks 1670X; (2) the CA TEE 1976C supporting the CD's CA Protocol Stacks 1970X, as described with reference to the CA TEE 1676C in FIG. 16; (3) the REE 1976A supporting the RAs 1975A of the CD's; (4) the TEE/REE API 1974A providing communication means between the UE TEE 1976D and the REE 1976A, based on an IPC method, wherein the TEE/REE API 1974A utilizes a physical transport between the two separate SoCs; and (5) the TEE/REE API 1974A providing communication means between the CA TEE 1976C and the REE 1976A, based on an IPC method, wherein the TEE/REE API 1974A utilizes a physical transport between the two separate SoCs.

The UE TEE 1976D is built on a 1st SoC, the SoC 1972D. The CA TEE 1976C is built on a 2nd SoC, the SoC 1972C. The REE 1976A is built on a 3rd SoC, the SoC 1972A. It should be apparent to any person skilled in the art that the SoC 1972C, the SoC 1972D and the SoC 1972A can be of the same or different models.

It should be apparent to any person skilled in the art, that a typical implementation example for the CD-D 1970D is a High-Tier Smartphone, wherein the Base-Band Processor having a dedicated SoC, the SoC 1972D for the UE TEE 1976D, the Application Processor having a dedicated SoC, the SoC 1972A for the REE 1976A and a dedicated SoC, the SoC 1972C is reserved for the CA TEE 1976C.

The UE TEE 1976D comprises the following: (1) The U-TA 1975D; (2) the 3GPP UE Protocol Stacks 1960B; (3) the TEE API 1974C; (4) the TOS 1973D, as described with reference to the TOS 1673C in FIG. 16; (5) the SoC 1972D; (6) the HW RoT 1971A, as described with reference to the HW RoT 1671A in FIG. 16; and (7) the Single IMSI UICC 1943A.

The TEE API 1974C is used by the UE Protocol Stacks 1960B for utilizing the UE TEE 1976D capabilities and communicating with the TOS 1973D, as described with reference to the TEE API 1674C in FIG. 16.

The Single IMSI UICC 1943A is described with reference to the Single IMSI UICC 1443A in FIG. 14. In the preferred embodiment, the U-TA 1975D and the UE Protocol Stacks 1960B use the dedicated Single IMSI UICC 1943A. In another embodiment (not shown), the U-TA 1975D and the UE Protocol Stacks 1960B use the Multi IMSI UICC 1943F, in a Multi IMSI UE/CA UICC configuration, as described with reference to the Multi IMSI UICC 1843E in FIG. 18.

The CA TEE 1976C comprises the following: (1) the I-TA 1975C; (2) the CA Protocol Stacks 1970X; (3) the TEE API 1974C; (4) the TOS 1973C, as described with reference to the TOS 1673C in FIG. 16; (5) the SoC 1972C; (6) the HW RoT 1971A, as described with reference to the HW RoT 1671A in FIG. 16; and (7) the Multi IMSI UICC 1943F.

It should be apparent to any person skilled in the art that the CA Protocol Stacks 1970X represents the architecture of either the CA 1570M or the CA 1570R as described with reference to FIG. 15.

It should be apparent to any person skilled in the art that the CD-D 1970D can be comprised of multiple of the CA TEE 1976C so that all of them are controlled by the RAs 1975A. Each of the CA TEE 1976C entities can create an independent connection to the HPLMN.

The TEE API 1974C is used by the CA Protocol Stacks 1970X for utilizing the CA TEE 1976C capabilities and communicating with the TOS 1973C, as described with reference to the TEE API 1674C in FIG. 16.

The Multi IMSI UICC 1943F is described with reference to the Multi IMSI UICC 1443F in FIG. 14.

The REE 1976A comprises the following: (1) the RAs 1975A; (2) the ROS 1973A, as described with reference to the ROS 1673A in FIG. 16; (3) the SoC 1972A; and (4) the (W)LAN Adapter 1942C. It should be apparent to any person skilled in the art, that this component can be implemented as either an integral component of the SoC 1972A or as a separate element dependent on the SoC 1972A design. The figure does not show the HW components of the (W)LAN Adapter 1942C used for communication with the (W)LAN (not shown), however it should be apparent to any person skilled in the art that those components are integral part of the CD-D 1970D.

The RAs 1975A, running in the ROS 1973A environment, governs both the I-TA 1975C and the U-TA 1975D according to the user inputs or preset policy. The RAs 1975A, within the REE 1976A, controls the I-TA 1975C and the U-TA 1975D over the TEE/REE API 1974A. The REE 1976A is further described with reference to the REE 1676A in FIG. 16.

In the preferred embodiment, the CA Protocol Stacks 1970X operating in the I-Mode, communicate with the MNO network (not shown) via the IPsec ESP Secured Tunnel 1993F over the Broadband IP Network (not shown). In other embodiments another security protocol can be used.

The (W)LAN Adapter 1942C is described with reference to the (W)LAN Adapter 1442C in FIG. 14.

In some embodiments, the U-TA 1975D together with the UE Protocol Stacks 1960B represent prior art UE SW e.g. a Smartphone SW. The figure does not show the HW components associated with the UE Protocol Stacks 1960B; however it should be apparent to any person skilled in the art that those components are integral part of the CD-D 1970D. In the I-Mode of operation, the CA Protocol Stacks 1970X are connected to the MNO network over the Iuh Interface 1993, as described with reference to FIG. 5. In the U-Mode of operation, the UE Protocol Stacks 1960B are connected to the MNO network over the Uu Air Interface 490, as described with reference to FIG. 4. The RAs 1975A is responsible to control the CD-D 1970D mode of operation, either the I-Mode, or the U-Mode, or both according to user commands or other policy as required. Upon user decision, and depending on the IMSIs hosted by the Multi IMSI UICC 1943F and the Single IMSI UICC 1943A, both the I-Mode and the U-Mode can run simultaneously with either a single MNO or with different MNOs. It should be apparent to any person skilled in the art that when both the I-Mode and the U-Mode are running with a single MNO, a transition between the U-Mode and the I-Mode is possible, depending on network policy.

FIG. 16, FIG. 17, FIG. 18 and FIG. 19 illustrate the CD basic architecture configurations of the CD-A 1670A, CD-B 1770B, CD-C 1870C, and CD-D 1970D respectively. It should be apparent to any person skilled in the art that other embodiment types of CD are based on combinations of the basic types described in these figures.

FIG. 20 is a Finite State Machine (FSM) table for the CD T e-B in some embodiments.

The figure shows a Finite State Machine (FSM) applicable for the CA 1570M as described with reference to FIG. 15, embedded in CD-B 1770B, as described with reference to FIG. 17, in the form of a state transitions matrix. Each row R of matrix represents a current state of the CA while each column C represents the next state to which the CA transits when a certain event arrives. Each cell contains zero or more possible EVent/OPeration pair (EV/OP), wherein the event is given by its EV name and the operation is given by its OP reference. Each pair in the cell of row R and column C having event-operation pair in it should be understood as the following: "While FSM in the current state R and upon arrival of EV, the CA transits from the current state R to the next state C and performs the operation OP". If some EV is not bound to an OP, this means that the transition from the current state to the next state is done without operation. The events which are not included in the cell are ignored by the FSM and no operations and transitions are performed.

The CA FSM has the following states: (1) OFF_ST—the CA is turned off; (2) NO_LINE_ST—the CA is turned on but has no open IP connection the ISP; (3) NO_SECURED_CONNECTION_ST—the CA connected to the Broadband IP Network but the IPsec ESP Secured Tunnel between the CA and the HNB-GW/SeGW is not established yet; (4) SECURED_CONNECTION_ST—the CA has established secure connection with the HNB-GW/SeGW via the IPsec ESP Secured Tunnel and is fully operational; and (5) EMERGENCY_ST—the same as "SECURED CONNECTION" state but the USIM is not inserted/validated. It should be apparent to any person skilled in the art, that the emergency state only allows for calls to be established with an emergency entity, however accurate automatic location cannot be provided, as the CD is communicating over the IP Broadband Network which allows only for an approximate location determination. The user is warned that he/she should provide location to the emergency entity called, either verbally or by text, similarly to other IP based services, e.g. Skype®.

The events comprise the following: (1) CD_Plugged_In_EV—User plug in the CA into a hosting device, for example, a personal computer; (2) CD_Unplugged_EV—User unplugged the CA; (3) Secure_Boot_Success_EV—the secure boot process was successfully done; (4) Secure_Boot_Failure_EV—one of the secure boot steps has failed; (5) User_Init_Shutdown_EV—User initiates the CA shutdown; (6) HNB_GW_Con_Available_EV—the IP connection to the HNB-GW/SeGW exists; (7) HNB_GW_Con_Unavailable_EV the connection to the MNO is broken; (8) USIM_Pres_EV—the USIM is present, i.e. inserted and available for read; (9) NT_TE_USIM_Not_Pres_EV—the multi IMSI USIM, hosting the NT Entity and the TE Entity credentials, is not present, i.e. the NT Entity and the TE Entity credentials are not available; (10) TE_USIM_Not_Pres_EV—wherein the NT Entity USIM is optional and the TE Entity USIM is not present, i.e. the TE Entity credentials are not available; (11) Iuh_Success_EV—the secure connection to the HNB-GW/SeGW was successfully established; (12) Iuh_Failure_EV—the secure connection to the HNB-GW/SeGW failed to establish; (13) Broken_Line_EV—the IP connection to the HNB-GW/SeGW is broken; (14) User_init_Secured_Con_EV—user requested to re-establish secure connection to the HNB-GW/SeGW; (15) User_init_Disconnect_EV—user requested to disconnect from the HPLMN; (16) Signal_Enters_Red_EV—the WLAN signal enters the Red zone, i.e. below the minimum permitting communication, according to the requirements; (17) Signal_Enters_Yellow_EV—the WLAN signal enters the Yellow zone, i.e. approaching the minimum permitting communication, according to the requirements; and (18) CN_Init_Disconnect_EV—the CN requested the CA to disconnect.

The operations comprise the following: (1) OP01, the CA performs secure boot to ensure that the device is secured and tamper-proof and running approved software. If secure boot has been performed successfully, the CA generates the Secure_Boot_Success_EV event, otherwise the CA generates the Secure_Boot_Failure_EV event; (2) OP04, periodically in intervals according to the requirements, the CA checks the USIM availability and validity. After each check procedure, the CA generates one of the following events: (a) NT_TE_USIM_Pres_EV—If USIM is present and credentials for both the TE Entity and the NT Entity are available; (b) NT_TE_USIM_Not_Pres_EV—If USIM is not present; or (c) TE_USIM_Not_Pres_EV—If USIM is present however the mandatory TE Entity credentials are not available; (3) OP05, the CA tests the availability of IP connection via (W)LAN with given recurrence. If IP connection is available the HNB_GW_Con_Available_EV event is generated, otherwise—the HNB_GW_Con_Unavailable_EV event is generated; (4) OP06, the CA establishes connection to the HNB-GW and registers the NT Entity with the HNB-GW. If both establishment and registration procedures were successful, the CA generates event Iuh_Success_EV, otherwise—Iuh_Failure_EV; (5) OP08, the CA registers the TE Entity with the CN, invokes GPRS attachment procedure and informs a user that CA is fully operational; (6) OP10, the CA releases the Iuh connection; (7) OP14, the CA de-registers the TE Entity from the CN, detaches GPRS and informs user regarding the emergency only mode of operation; (8) OP15, the CA informs the user regarding an arrived event; (9) OP19, the CA logs the unplugging event in the non-volatile memory. Such a logging is possible when the CA is equipped with a backup battery; and (10) OP21, the CA logs a shutdown cause in the non-volatile memory, shutdown itself, and generates no events. It should be apparent to any person skilled in the art that due to the fact that these operations are invoked from different events and states, the internal sequences might be different.

The FSM, its states, events, and operations described above are for illustration of CA behavior only. It should be apparent to any person skilled in the art that in other embodiments, the FSM and its states, events and operations are different according to: (1) The architecture of the CA 1570M or the CA 1570R as described with reference to FIG. 15; and (2) the CD basic configurations the CD-A 1670A, the CD-B 1770B, the CD-C 1870C, or the CD-D 1970D, as described with reference to FIG. 16, FIG. 17, FIG. 18 and FIG. 19 respectively.

Figure 21A:
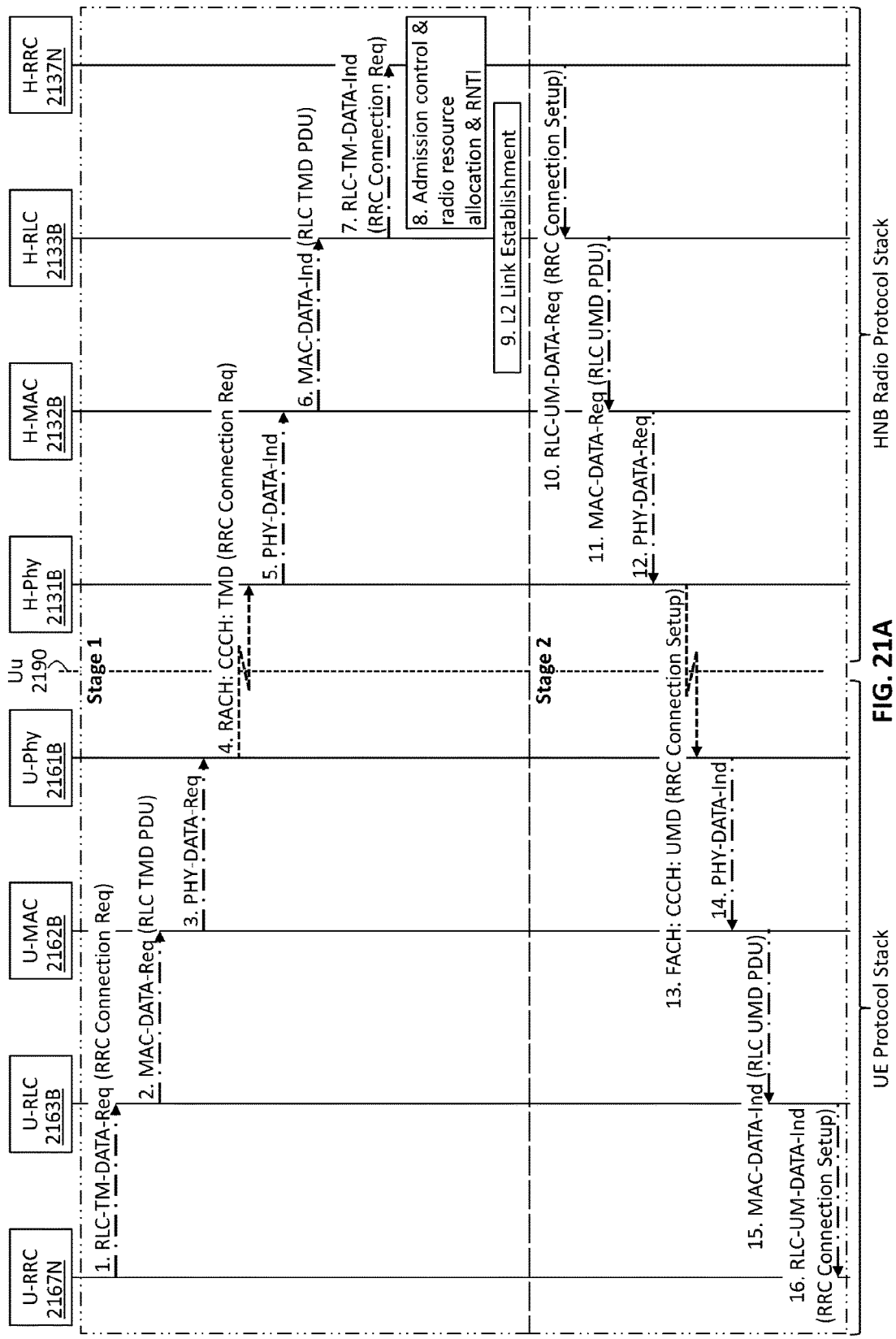
FIG. 21A illustrates the prior art Radio Resource Control (RRC) Connection establishment MSC in some embodiments.

FIG. 21A illustrates the prior art Radio Resource Control (RRC) Connection establishment MSC in some embodiments.

The figure illustrates a sample MSC of the RRC connection establishment procedure of the prior art. The MSC is based on the RRC connection procedure as described in the 3GPP TS 25.303. The figure includes the UE and the HNB Radio Protocol Stack entities, participating in the RRC connection establishment procedure, which communicate over the Uu Air Interface 2190. The UE Protocol Stack comprises: (1) The Radio Resource Control U-RRC Entity 2167N; (2) the Radio Link Control U-RLC Entity 2163B; (3) the Medium Access Control U-MAC Entity 2162B; and (4) the Physical Layer U-Phy Entity 2161B of the Uu Air Interface 2190. The HNB Radio Protocol Stack comprises: (1) The Radio Resource Control H-RRC Entity 2137N; (2) the Radio Link Control H-RLC Entity 2133B; (3) the Medium Access Control H-MAC Entity 2132B; and (4) the Physical Layer H-Phy Entity 2131B of the Uu Air Interface 2190.

Figure 21B:
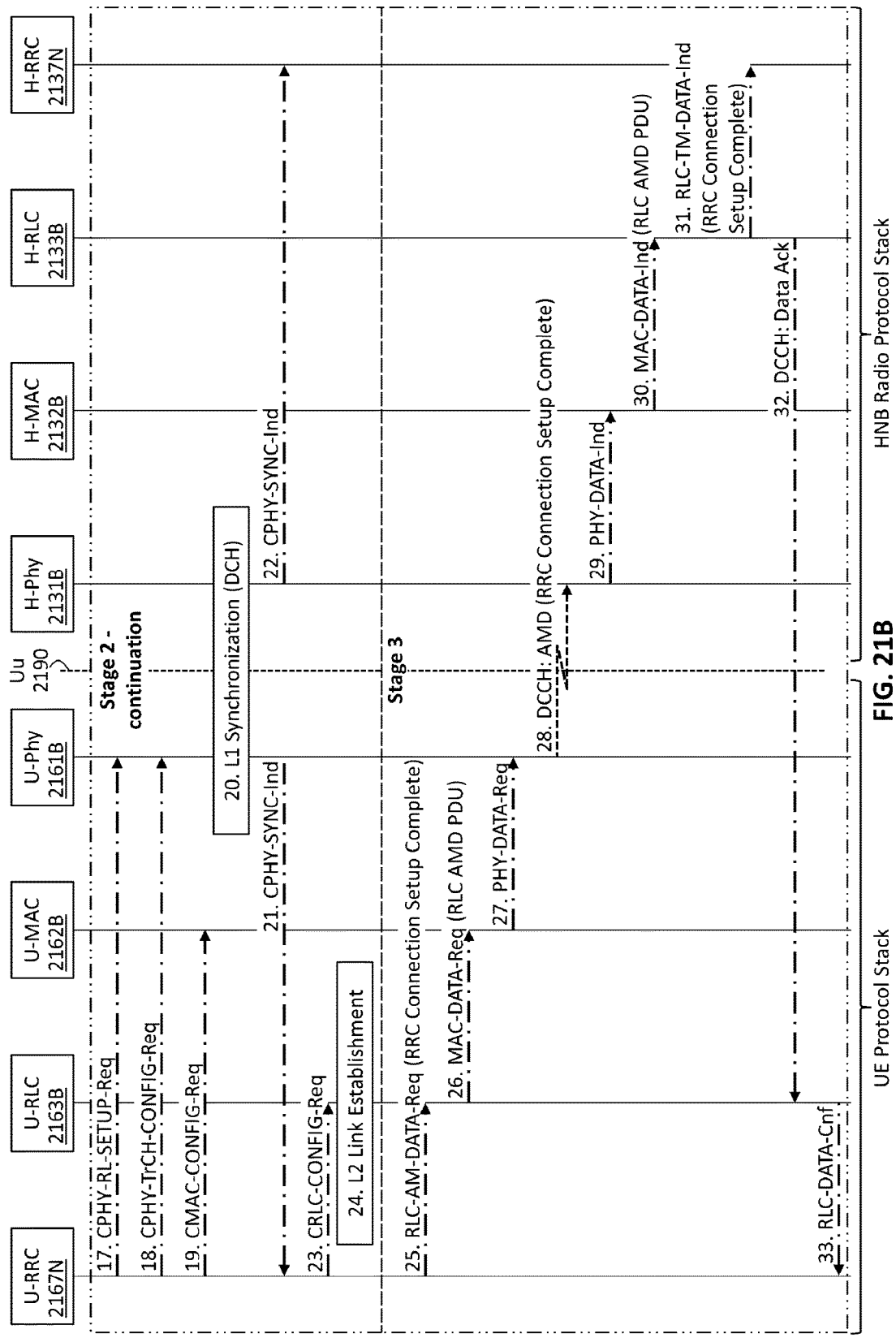
FIG. 21B is the continuation of FIG. 21A.
Figure 22A:
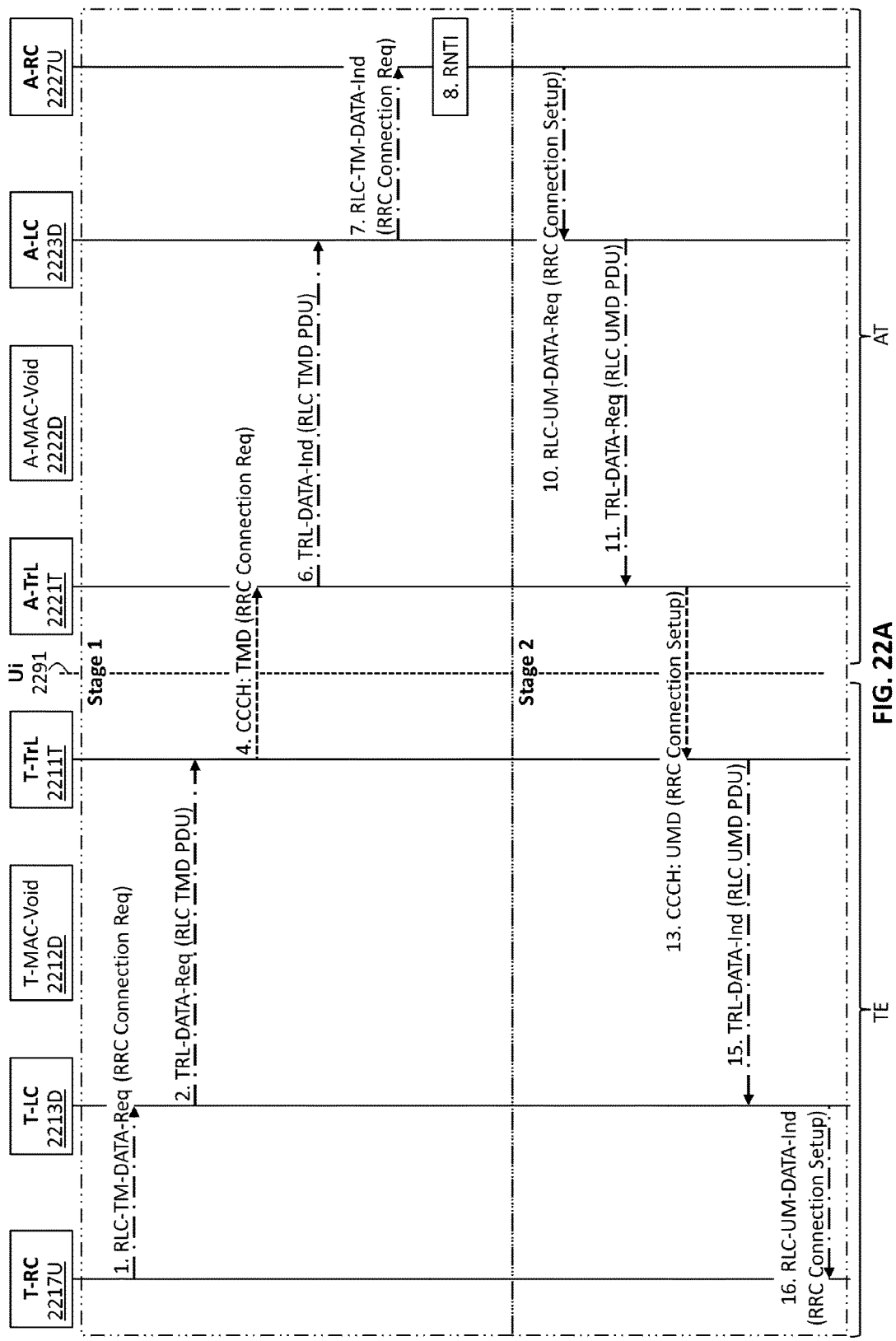
FIG. 22A illustrates the RRC Connection establishment MSC applicable to the CA in some embodiments.
Figure 22B:
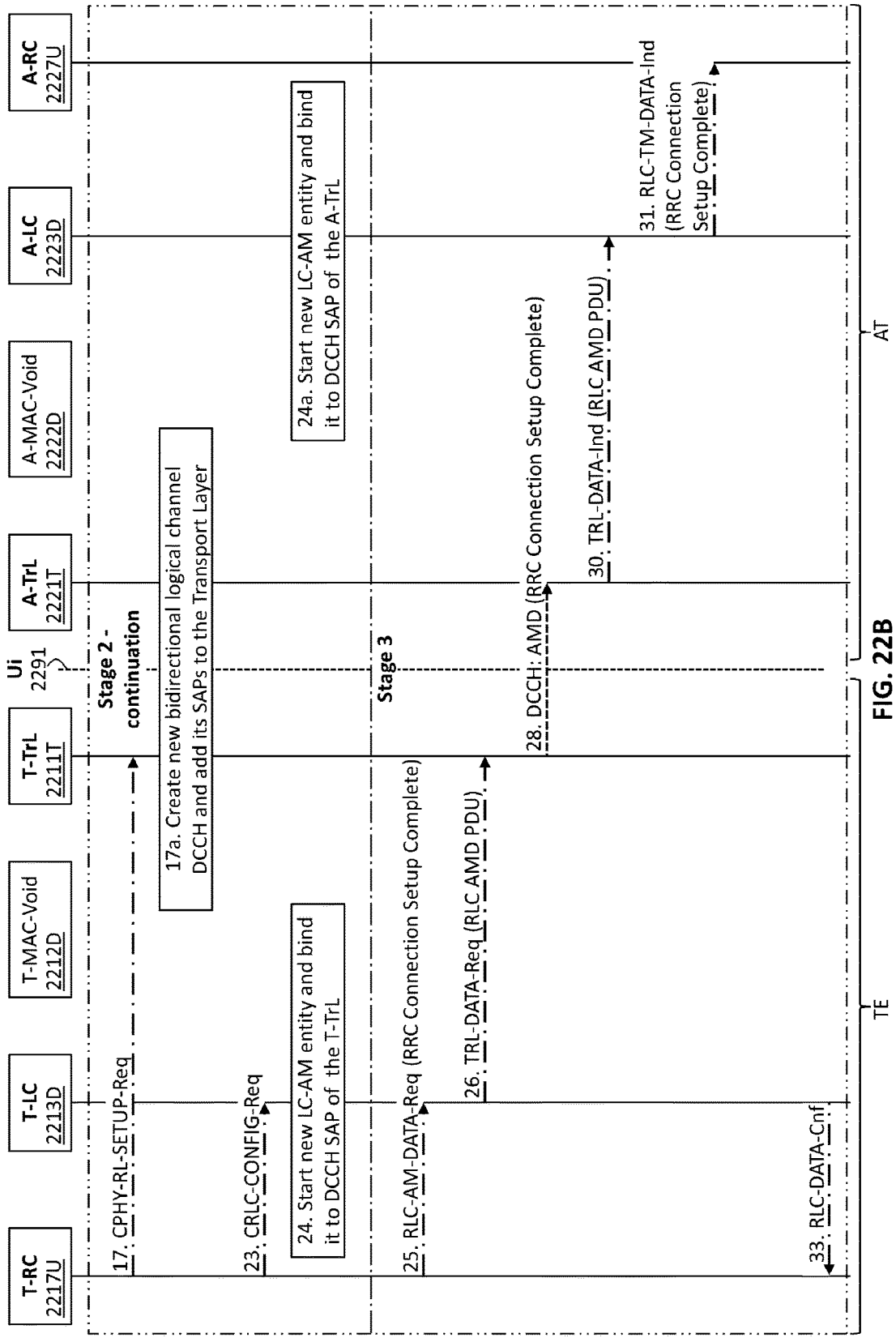
FIG. 22B is the continuation of FIG. 22A.

FIG. 21A and FIG. 21B illustrate the sample MSC for the RRC connection establishment of the prior art, while FIG. 22A and FIG. 22B illustrate the same for the present invention. For easier understanding of the differences between the prior art MSC on FIG. 21A and FIG. 21B and the present invention MSC on FIG. 22A and FIG. 22B both MSCs are drawn using the same template. It means that the MSC steps are kept the same but some of the steps can be void. The MSCs contain three stages. The generic data procedure can be applied for each stage separately. The stages are: (1) Stage 1, Submission in uplink of the RRC Connection Request message on CCCH in TM, wherein the SENDER is either the U-RRC Entity 2167N or the T-RC Entity 2217U, and the RECEIVER is either the H-RRC Entity 2137N or the A-RC Entity 2227U respectively; (2) Stage 2, Sending on downlink the RRC Connection Setup message on CCCH in UM, wherein the SENDER is either the H-RRC Entity 2137N or the A-RC Entity 2227U, and the RECEIVER is either The U-RRC Entity 2167N or the T-RC Entity 2217U respectively; and (3) Stage 3, Response in uplink with RRC Connection Setup Complete on DCCH in AM, wherein the SENDER is either the U-RRC Entity 2167N or the T-RC Entity 2217U, and the RECEIVER is either the H-RRC Entity 2137N or the A-RC Entity 2227U respectively.

The Iuh signaling between the HNB and the CN is not shown. The procedure can be initiated by the UPLR NAS Entity (not shown) while the UE, or the TE shown in FIG. 22A, is in idle mode. The signaling Radio Bearer #0 (RB0), i.e. the CCCH, was established by the UE during camping on the serving cell or, in case of the TE shown in FIG. 22A, during power up or hard reset procedures.

Following is the MSC description by steps:

Stage 1:

Step 1: The U-RRC Entity 2167N constructs the RRC Connection Request message to establish the RRC connection. The message comprises among others things the initial UE Identity, CN domain (PS or CS), and Establishment Cause information elements. The U-RRC Entity 2167N submits the RRC Connection Request message, contained in the RLC-TM-DATA-Req primitive, to the U-RLC Entity 2163B that is bound on the CCCH LCH.

Step 2: Upon reception of the RLC-TM-DATA-Req primitive, the U-RLC Entity 2163B creates the Transparent Mode Data (TMD) PDU and submits it to the U-MAC Entity 2162B as an information element of the MAC-DATA-Req [RLC TMD PDU] primitive.

Step 3: The U-MAC Entity 2162B prepares the PHY-DATA-Req primitive containing the received RLC TMD PDU and sends it to the U-Phy Entity 2161B for scheduling and transmission over the Uu Air Interface 2190.

Step 4: The U-Phy Entity 2161B schedules submission of the message and transmits it on the CCCH, mapped onto the Random Access CHannel (RACH) in uplink, towards the peer H-Phy Entity 2131B.

Step 5: Upon successful reception of the message on the RACH, the H-Phy Entity 2131B indicates with the PHY-DATA-Ind primitive to the H-MAC Entity 2132B.

Step 6: The H-MAC Entity 2132B submits the MAC-DATA-Ind primitive with the RLC TMD PDU to the H-RLC Entity 2133B.

Step 7: Upon reception the RLC TMD PDU, the H-RLC Entity 2133B sends the RRC Connection Request message, contained in the RLC-TM-DATA-Ind primitive, to the H-RRC Entity 2137N.

Step 8: Upon reception the RRC Connection Request message from the UE, the H-RRC Entity 2137N on the network side performs admission control and if the UE is allowed to connect to the specific core network domain (CS or PS), assigns the Radio Network Temporary Identifier (RNTI) for RRC connection and selects the radio resource parameters, such as transport channel type, transport format sets etc.

Step 9: If a DCH is to be established, the CPHY-RL-SETUP and the CPHY-TrCH-Cnf primitives, transmitted as one RADIO LINK SETUP PDU, are sent to all Node-Bs that would be involved in the channel establishment (not shown). The Physical Layer operation is started and confirmation primitives are returned from each Node-B. The H-RRC Entity 2137N configures parameters on Layer 2 to establish the DCCH LCH locally.

Stage 2:

Step 10: The H-RRC Entity 2137N requests the H-RLC Entity 2133B, to transmit the selected parameters including the RNTI in the RRC Connection Setup message using the UM on the downlink CCCH, using the RLC-UM-DATA-Req [RRC Connection Setup] primitive.

Step 11: The H-RLC Entity 2133B forwards the message to the H-MAC Entity 2132B as a MAC-DATA-Req [RLC UMD PDU] primitive.

Step 12: The H-MAC Entity 2132B prepares the PHY-DATA-Req primitive including the information of the received RLC UMD PDU and sends it to the H-Phy Entity 2131B for scheduling and transmission over the Uu Air Interface 2190.

Step 13: The H-Phy Entity 2131B schedules submission of the message and transmits it on the CCCH, mapped onto the Forward Access CHannel (FACH) in downlink towards the peer U-Phy Entity 2161B.

Step 14: Upon successful reception of the message on the FACH the U-Phy Entity 2161B prepares and sends the PHY-DATA-Ind primitive with the received data to the U-MAC Entity 2162B.

Step 15: The U-MAC Entity 2162B submits the MAC-DATA-Ind primitive with the RLC UMD PDU to the U-RLC Entity 2163B.

Step 16: Upon successful reception of the RLC UMD PDU, the U-RLC Entity 2163B sends the RRC Connection Setup message, contained in the RLC-UM-DATA-Ind primitive, to the U-RRC Entity 2167N.

Stage 2 continues on FIG. 21B.

FIG. 21B is the continuation of FIG. 21A.

Stage 2 continuation:

Step 17: Upon reception of the RRC Connection Setup message, the U-RRC Entity 2167N configures the U-Phy Entity 2161B in accordance with the parameters of the radio link received in the RRC Connection Setup message. This is done by sending the CPHY-RL-SETUP-Req primitive to the U-Phy Entity 2161B.

Step 18: The U-RRC Entity 2167N sets up the U-Phy Entity 2161B in accordance with the transport channel parameters received in the RRC Connection Setup message. This is done by sending the CPHY-TrCH-CONFIG-Req primitive to the U-Phy Entity 2161B.

Step 19: The U-RRC Entity 2167N configures the U-MAC Entity 2162B in accordance with the parameters received in the RRC Connection Setup message. This is done by sending the CMAC-CONFIG-Req primitive to the U-MAC Entity 2162B.

Step 20: The U-Phy Entity 2161B and the H-Phy Entity 2131B synchronize the physical and transport channels for the DCH.

Step 21: The U-Phy Entity 2161B indicates the U-RRC Entity 2167N that it has reached synchronization by submission of the CPHY-SYNC-Ind primitive.

Step 22: The U-Phy Entity 2161B indicates the U-RRC Entity 2167N that it has reached synchronization by submission of the CPHY-SYNC-Ind primitive.

Step 23: The U-RRC Entity 2167N configures parameters on Layer 2 by sending the CRLC-CONFIG-Req primitive to the U-RLC Entity 2163B to establish the DCCH locally.

Step 24: The UE Radio Link has been established.

Stage 3:

Step 25: The RRC Connection Setup Complete message should be sent on the DCCH in AM. Integrity and Ciphering related parameters and the UE capability information are sent back to the HNB. The U-RRC Entity 2167N sends the RRC Connection Setup Complete message, contained in the RLC-AM-DATA-Req primitive, to the U-RLC Entity 2163B. The RLC-AM-DATA-Req primitive contains request from the U-RLC Entity 2163B to confirm the reception of the message by the peer H-RLC Entity 2133B.

Step 26: Upon reception the RLC-AM-DATA-Req primitive, the U-RLC Entity 2163B creates the RLC Acknowledged Mode Data (AMD) Protocol Data Unit (PDU) and sends it to the U-MAC Entity 2162B as an information element of the MAC-DATA-Req [RLC AMD PDU] primitive.

Step 27: The U-MAC Entity 2162B prepares the PHY-DATA-Req primitive, including the received RLC AMD PDU, and sends it to the U-Phy Entity 2161B for scheduling and transmission over the Uu Air Interface 2190.

Step 28: The U-Phy Entity 2161B schedules submission of the message and transmits it on the Dedicated Control Channel (DCCH) in uplink direction towards the peer H-Phy Entity 2131B.

Step 29: Upon successful reception of the message on the DCCH, the H-Phy Entity 2131B indicates it with the PHY-DATA-Ind primitive to the H-MAC Entity 2132B.

Step 30: The H-MAC Entity 2132B submits the MAC-DATA-Ind [RLC AMD PDU] primitive to the H-RLC Entity 2133B.

Step 31: Upon successful reception the RLC AMD PDU, the H-RLC Entity 2133B sends the RRC Connection Setup Complete message, contained in the RLC-TMD-DATA-Ind primitive, to the H-RRC Entity 2137N.

Step 32: Upon reception the RLC AMD PDU with request for acknowledges, the H-RLC Entity 2133B sends acknowledge to the peer U-RLC Entity 2163B.

Step 33: Upon reception of acknowledge from the peer H-RLC Entity 2133B, the U-RLC Entity 2163B confirms successful reception of the RRC Connection Setup Complete message to the U-RRC Entity 2167N.

FIG. 22A illustrates the RRC Connection establishment MSC applicable to the CA in some embodiments.

The figure includes the CA TE and the CA AT. The CA TE comprises: (1) The T-RC Entity 2217U; (2) the T-LC Entity 2213D; (3) the T-MAC-Void Entity 2212D is void; and (4) the Transport Layer T-TrL Entity 2211T. The CA AT comprises: (1) the A-RC Entity 2227U; (2) the A-LC Entity 2223D; (3) the A-MAC-Void Entity 2222D is void; and (4) the A-TrL Entity 2221T. The CA TE and the CA AT communicate over the Ui Interface 2291. It should be apparent to any person skilled in the art that the Ui Interface 2291 is an error free interface, as it is physically residing inside a single SoC and is implemented by an IPC method supported by a single OS. Therefore the send-receive operations are always considered successful and the related acknowledgements are redundant, therefore nullified. The MSC in this figure, as well as in FIG. 22B comprises a sequence of steps for the present invention CA. It should be apparent to any person skilled in the art, that when comparing these steps to the prior art UE & HNB MSC some steps are identical, and some are unique or redundant in the present invention. In order to preserve consistent naming conventions with the prior art MSCs, the names for identical stages, steps & messages are given according to the prior art convention as shown in FIG. 21A and FIG. 21B. In order to preserve consistent numbering conventions with the prior art MSC, the numbers for the redundant prior art steps are void in the present invention and the numbers for identical steps are given according to the prior art convention.

Following is the MSC description by steps:

Stage 1:

Step 1: the T-RC Entity 2217U leaves the idle mode and constructs the RRC Connection Request message to establish the RRC connection. The message comprises among others things the Initial UE Identity, CN Domain (PS or CS), and Establishment Cause information elements. The T-RC Entity 2217U submits the RRC Connection Request message, contained in the RLC-TM-DATA-Req primitive, to the T-LC Entity 2213D that is bound on the CCCH LCH via the TM SAP.

Step 2: Upon reception of the RLC-TM-DATA-Req primitive, the T-LC Entity 2213D creates the LC TMD PDU and sends it to the T-TrL Entity 2211T as an information element of the TRL-DATA-Req [RLC TMD PDU] primitive.

Step 3: Void.

Step 4: The T-TrL Entity 2211T sends the message on the CCCH to the peer A-TrL Entity 2221T.

Step 5: Void

Step 6: Upon reception of the message on the CCCH, the A-TrL Entity 2221T indicates the TRL-DATA-Ind primitive with the RLC TMD PDU to the A-LC Entity 2223D.

Step 7: Upon reception the RLC TMD PDU, the A-LC Entity 2223D sends the RRC Connection Request message, contained in the RLC-TM-DATA-Ind primitive, to the A-RC Entity 2227U.

Step 8: Upon reception the RRC Connection Request message from the TE, the A-RC Entity 2227U on the NT assigns a RNTI for RRC connection.

Step 9: Void.

Stage 2:

Step 10: The A-RC Entity 2227U requests the A-LC Entity 2223D, to transmit the selected parameters including the RNTI in an RRC Connection Setup message using the UM on the CCCH using the RLC-UM-DATA-Req [RRC Connection Setup] primitive.

Step 11: The A-LC Entity 2223D forwards the message to the A-TrL Entity 2221T as a TRL-DATA-Req [RLC UMD PDU] primitive.

Step 12: Void.

Step 13: The A-TrL Entity 2221T sends the message on the CCCH to the peer T-TrL Entity 2211T.

Step 14: Void.

Step 15: Upon reception of the message on the CCCH, the T-TrL Entity 2211T prepares and sends the TRL-DATA-Ind primitive with the RLC UMD PDU to the T-LC Entity 2213D.

Step 16: Upon reception of the RLC UMD PDU, the T-LC Entity 2213D sends the RRC Connection Setup message, contained in the RLC-UM-DATA-Ind primitive, to the A-RC Entity 2227U.

Stage 2 continues on FIG. 22B.

FIG. 22B is the continuation of FIG. 22A.

Stage 2 continuation:

Step 17: Upon reception of the RRC Connection Setup message, the T-RC Entity 2217U sends the CPHY-RL-SETUP-Req [LCH=DCCH] primitive to the T-TrL Entity 2211T. This primitive contains command to create DCCH channel.

Step 17a: Upon receiving the CPHY-RL-SETUP-Req primitive, the T-TrL Entity 2211T creates new bidirectional logical channel DCCH and add its SAPs to the Transport Layer.

Step 18 through Step 22: Void.

Step 23: The T-RC Entity 2217U sends configuration request by the CRLC-CONFIG-Req primitive. The T-RC Entity 2217U establishes the LC-AM and binds it to the DCCH LCH by sending the CRLC-CONFIG-Req [mode=Acknowledged] primitive to the T-LC Entity 2213D. The T-LC Entity 2213D triggers (on Step 24a) an establishment of the LC-AM on the NT.

Step 24: Upon reception of the CRLC-CONFIG-Req primitive, the T-LC Entity 2213D establishes a new LC-AM and binds it to the DCCH channel.

Step 24a: On the NT, the peer A-LC Entity 2223D establishes the peer LC-AM and binds it to the DCCH channel.

Stage 3:

Step 25: The T-RC Entity 2217U sends the RRC Connection Setup Complete message, contained in the RLC-AM-DATA-Req primitive, to the T-LC Entity 2213D. The RLC-AM-DATA-Req primitive contains request from the T-LC Entity 2213D to confirm the reception of the message by the peer A-LC Entity 2223D.

Step 26: Upon reception the RLC-AM-DATA-Req primitive, the T-LC Entity 2213D creates the LC AMD PDU and sends it to the T-TrL Entity 2211T as an information element of the TRL-DATA-Req [LC AMD PDU] primitive.

Step 27: Void.

Step 28: The T-TrL Entity 2211T submits the message on the DCCH to the peer A-TrL Entity 2221T.

Step 29: Void.

Step 30: Upon reception of the message on the DCCH, the A-TrL Entity 2221T indicates it with the TRL-DATA-Ind primitive to the A-LC Entity 2223D.

Step 31: Upon reception the LC AMD PDU, the A-LC Entity 2223D sends the RRC Connection Setup Complete message, contained in the RLC-TMD-DATA-Ind primitive, to the A-RC Entity 2227U.

Step 32: Void.

Step 33: Immediately after sending the RRC Connection Setup Complete message to the A-RC Entity 2227U, the T-LC Entity 2213D confirms transmission to the T-RC Entity 2217U.

FIG. 23 illustrates the communication interface legend used in the present patent application.

The figure illustrates the legend of the message flow communication InterFace (I/F) types, which is used throughout the drawings of the present invention.

Each I/F is drawn as double/single arrowhead line. It should be apparent to any person skilled in the art that the double arrowhead denotes a bidirectional I/F and/or a bidirectional communication, as applicable. It should be also apparent to any person skilled in the art that the single arrowhead denotes a unidirectional I/F and/or the direction of a unidirectional communication, as applicable.

These I/Fs are grouped into 2 main sub-groups: (1) The Physical group I/Fs 2399A; and (2) the Logical group I/Fs 2399B.

The Physical group has two members, further drawn as solid-line, as follows: (1) The wireless I/F 2399C, e.g. the Uu L1 peer-to-peer I/F, wherein the I/F is further drawn as a "lightning symbol"; and (2) the wired I/F 2399D, e.g. the Iuh L1 peer-to-peer I/F, wherein the I/F is further drawn as a straight line.

The Logical group has 4 members further drawn as various non-solid line types, as follows: (1) The wireless I/F 2399E, e.g. the Uu L2/L3 peer-to-peer I/F, wherein the I/F is further drawn as a "Square-Dot" "lightning symbol" line; (2) the wired I/F 2399F, e.g. the Iuh L2/L3 peer-to-peer I/F, wherein the I/F is further drawn as a "Square-Dot" straight line; (3) the inter-layer protocol I/F 2399G, e.g. the U-RLC to U-MAC I/F, wherein the I/F is further drawn as a "Long-Dash-Dot" straight line; and (4) the IPC method I/F 2399H, e.g. the present invention Ui T-TrL to A-TrL peer-to-peer I/F, wherein the I/F is further drawn as a "Dash-Dot" straight line.

FIG. 24A shows a table of abbreviations and terms used in the present patent application.

The table contains a glossary of the non-standard abbreviations and terms encountered in the present patent application. The standard abbreviations and terms appear in the 3GPP TR 21.905 titled: "Vocabulary for 3GPP Specifications".

FIG. 24B is the continuation of FIG. 24A.

The figure includes the continuation of the glossary table.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. The various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the such as; the term "example" is used to provide exemplary instances of the item in discussion, not an exhaustive or limiting list thereof; the terms "a" or "an" should be read as meaning "at least one," "one or more" or the such as; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Hence, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other such as phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A communication system, comprising:
   a cellular Core Network (CN);
   a plurality of cellular base stations (BS);
   a cellular GateWay (GW);
   a Communication Device (CD) with an embedded Home Node-B (HNB) or cellular Small Cell Base Station (SC-BS) as a mobile or location independent portable entity with interprocess communication (IPC), wherein said CD interconnects to the CN by interconnecting to the GW over an Internet Protocol Network (IP NW) in cellular-IP transfer, wherein said CD includes a Communication Apparatus (CA) comprising multi-layered protocol stacks for implementing control plane functionality, user plane functionality and management functionality with a backhaul link between the SC-BS and the CN; and
   a terminal equipment (TE) including:
      a Terminal Equipment Transport Layer (T-TrL) providing transport links for Logical Channels (LCHs) between the TE and access termination (AT);
      a Terminal Equipment Link Control (T-LC) layer for providing a 3rd Generation Partnership Project (3GPP) user equipment (UE) Radio Link Control (RLC) functionality, wherein said T-LC includes a subset of said RLC;
      a Terminal Equipment Resource Control (T-RC) layer for providing a 3GPP UE Radio Resource Control (RRC) functionality, wherein said T-RC includes a subset of said RRC;
      a Terminal Equipment Packet Data Convergence Protocol (T-PDCP) layer for providing a 3GPP UE PDCP functionality; and
      a Terminal Equipment Upper Application Layers (T-UPLR) for providing a 3GPP UE Non Access Stratum (NAS), Packet Switched (PS) and Circuit Switched (CS) functionalities.

2. The system of claim 1, wherein said CA includes a Terminal Equipment Access Termination (TE-AT), wherein said TE-AT is a single entity having computer readable code providing a combined functionality of said TE, said AT and a Transport Layer (TrL), and wherein said TE-AT interconnects directly with a Network Termination (NT) entity.

3. The system of claim 1, wherein said CA operates in a single mode supporting the 3G Iuh (Iu home) interface or the LTE S1 interface.

4. The system of claim 1, wherein said CA operates in a dual mode supporting the 3G Iuh and the LTE Si interfaces.

5. The system of claim 1, wherein said TrL is implemented by Inter-Process Communication (IPC) methods.

6. The system of claim 1, comprising an embedded Wireless Local Area Network (WLAN) radio which interconnects to the CN by:
   interconnecting the CA to an IP Access Point (IP AP) using the WLAN radio;
   interconnecting the IP AP to the HNB-GW over an Internet Protocol Network (IP Network); and
   interconnecting the HNB-GW to the CN.

7. The system of claim 1, wherein said TrL includes plurality of directional Logical Channels (LCHs), and wherein said CD further comprising:
   at least one Trusted Execution Environment (TEE) logical entity for hosting a plurality of trusted applications, wherein said TEE hosts at least one said trusted application;
   a Rich Execution Environment (REE) logical entity for hosting a plurality of rich applications, wherein said REE hosts at least one said rich application;
   at least one computing engine for the REE and/or at least one said TEE;
   at least one Root of Trust (RoT) for providing authentication and a cryptographic engine for said TEE; and
   a network interface adapter for interfacing the REE to an IP AP.

8. The system of claim 7, comprising a CA trusted application of a particular TEE for providing combined functionality of a 3GPP UE and a 3GPP HNB, including:
   a Terminal Equipment Access Termination (TE-AT), wherein said TE-AT is a single entity comprising computer readable code providing a combined functionality of a TE, an AT and a TrL;
   an NT further comprising computer readable code providing an equivalent network functionality of a 3GPP HNB, wherein said NT communicates with said TE-AT;
   at least one UICC (Universal Integrated Circuit Card) for subscriber authentication, wherein said UICC includes at least one IMSI; and
   a network interface adapter for interfacing the NT and the IP AP, wherein said network interface adapter together with said TE-AT and said NT provide a 3GPP HNB functionality.

9. The system of claim 7, comprising a CA trusted application of a particular TEE for providing combined functionality of a 3GPP UE and a 3GPP HNB, including:
- a TE further comprising computer readable code providing an equivalent radio functionality of a 3GPP UE;
- an AT further comprising computer readable code providing an equivalent radio functionality of a 3GPP HNB;
- at least one unidirectional LCH for providing a unidirectional message/data flow from the AT to the TE, or from the TE to the AT;
- at least one Bidirectional LCH for providing a bidirectional message/data flow between the AT and the TE, wherein said bidirectional LCH includes two said unidirectional LCHs in opposite directions;
- a network termination (NT) further comprising computer readable code providing an equivalent network functionality of a 3GPP HNB;
- an Inter Working Function (IWF) layer further comprising computer readable code providing an equivalent IWF functionality of a 3GPP HNB;
- at least one Universal Integrated Circuit Card (UICC) for subscriber authentication, wherein said UICC includes at least one International Mobile Subscriber Identity (IMSI); and
- a network interface adapter for interfacing the NT and the AP, wherein said network interface adapter together with said AT, said IWF and said NT provide a 3GPP HNB functionality.

10. The system of claim 9, wherein said AT includes:
- an Access Termination Transport Layer (A-TrL) providing transport links for the LCHs between the AT and the TE;
- an Access Termination Link Control (A-LC) layer for providing a 3GPP HNB Radio Link Control (RLC) functionality, wherein said A-LC includes a subset of said RLC;
- an Access Termination Resource Control (A-RC) layer for providing a 3GPP HNB Radio Resource Control (RRC) functionality, wherein said A-RC includes a subset of said RRC; and
- an Access Termination Packet Data Convergence Protocol (A-PDCP) layer for providing a 3GPP HNB PDCP functionality.

11. The system of claim 9, wherein said unidirectional LCH includes:
- a TE unidirectional transport comprising a first input/output side and a second link side;
- an AT unidirectional transport comprising a first output/input side and a second link side, wherein said second link side is directly connected to the second link side of the TE unidirectional transport thus making a single hop connection between the TE and the AT; and
- an input and output unidirectional Service Access Points (SAPs), wherein said unidirectional SAPs terminate said input/output side of the TE unidirectional transport and terminate said output/input side of the AT unidirectional transport.

12. The system of claim 9, wherein said unidirectional LCH includes:
- a TE unidirectional transport comprising a first input/output side and a second link side;
- an AT unidirectional transport comprising a first output/input side and a second link side, wherein said second link side connected to the second link side of the TE unidirectional transport via a common SAP thus making a two hop connection between the TE and the AT; and
- input and output unidirectional SAPs, wherein said unidirectional SAPs terminate said input/output side of the TE unidirectional transport and terminate said output/input side of the AT unidirectional transport.

13. The system of claim 9, wherein said bidirectional LCH includes:
- a TE bidirectional transport comprising a first input/output side and a second link side;
- an AT bidirectional transport comprising a first output/input side and a second link side, wherein said second link side is directly connected to the second link side of the TE bidirectional transport thus making a single hop connection between the TE and the AT; and
- input/output bidirectional SAPs, wherein said bidirectional SAPs terminate said input/output side of the TE bidirectional transport and terminate said output/input side of the AT bidirectional transport.

14. The system of claim 9, wherein said bidirectional LCH includes:
- a TE bidirectional transport comprising a first input/output side and a second link side;
- an AT bidirectional transport comprising a first output or input side and a second link side, wherein said second link side is connected to the second link side of the TE bidirectional transport via a common SAP thus making a two hop connection between the TE and the AT; and
- an input/output bidirectional SAPs, wherein said bidirectional SAPs terminate said input/output side of the TE bidirectional transport and terminate said output or input side of the AT bidirectional transport.

15. The system of claim 1, wherein said CA includes:
- a Terminal Equipment Protocol Stacks (TE) entity, wherein said TE includes a Transport Layer (TrL) entity, and wherein said TE includes computer readable code providing an equivalent radio functionality of a 3GPP User Equipment (UE), without using a physical radio entity;
- an Access Termination Protocol Stacks (AT) entity, wherein said AT includes the TrL entity, and wherein said AT includes computer readable code providing an equivalent radio functionality of a 3GPP HNB, without using a physical radio entity, the TrL entity provides a Ui Interface between the TE and the AT entities, wherein said Ui is a Non-Wireless Interface having computer readable code providing an equivalent Uu Air Interface functionality between a 3GPP UE radio and a 3GPP HNB radio;
- a Network Termination Protocol Stacks (NT) entity, wherein said NT includes computer readable code providing an equivalent network functionality of a 3GPP HNB; and
- an Inter-Working Function (IWF) layer, wherein said IWF layer provides relay and translation functionalities between the AT and the NT.

16. The system of claim 1, wherein said CN is a 3GPP CN, wherein said BS is a 3GPP BS, wherein said SC-BS is a 3GPP SC-BS, wherein said GW is a 3GPP GW, and wherein said interconnection is a 3GPP interface.

17. A communication system, comprising:
- a mobile device including an operation mode controller coupled to a cellular module with embedded Home Node-B (HNB) and to a client over (W)LAN protocol module, wherein the (W)LAN is either Local Area Network (LAN) or Wireless Local Area Network (WLAN);

an access network (AN) coupled to the cellular module and the (W)LAN protocol module, the AN including a (W)LAN access point, a cellular base station (BS), a cellular gateway (GW), and a network controller (NC);

a core network (CN) coupled to the AN with a backhaul link between the HNB and the CN; and a terminal equipment (TE) including:

a Terminal Equipment Transport Layer (T-TrL) providing transport links for Logical Channels (LCHs) between the TE and access termination (AT);

a Terminal Equipment Link Control (T-LC) layer for providing a 3rd Generation Partnership Project (3GPP) user equipment (UE) Radio Link Control (RLC) functionality, wherein said T-LC includes a subset of said RLC;

a Terminal Equipment Resource Control (T-RC) layer for providing a 3GPP UE Radio Resource Control (RRC) functionality, wherein said T-RC includes a subset of said RRC;

a Terminal Equipment Packet Data Convergence Protocol (T-PDCP) layer for providing a 3GPP UE PDCP functionality; and a Terminal Equipment Upper Application Layers (T-UPLR) for providing a 3GPP UE Non Access Stratum (NAS), Packet Switched (PS) and Circuit Switched (CS) functionalities.

18. The system of claim 17, wherein the CN comprises entities supporting voice, data, authentication and management.

19. A communication method, comprising:

embedding a Home Node B (HNB) into a communication device (CD) as a mobile or location independent portable entity with interprocess communication (IPC);

controlling network access for a device using cellular protocol and a client-over-(W)LAN-protocol;

communicating cellular protocol data with an access network (AN) having a cellular base station (BS), and a network controller (NC);

communicating cellular protocol data or over (W)LAN protocol data with an access network (AN) having a (W)LAN access point, and a cellular gateway (GW); and communicating AN data with a core network (CN) with a backhaul link between the HNB and the CN; and a terminal equipment (TE) including:

a Terminal Equipment Transport Layer (T-TrL) providing transport links for Logical Channels (LCHs) between the TE and access termination (AT);

a Terminal Equipment Link Control (T-LC) layer for providing a 3rd Generation Partnership Project (3GPP) user equipment (UE) Radio Link Control (RLC) functionality, wherein said T-LC includes a subset of said RLC;

a Terminal Equipment Resource Control (T-RC) layer for providing a 3GPP UE Radio Resource Control (RRC) functionality, wherein said T-RC includes a subset of said RRC;

a Terminal Equipment Packet Data Convergence Protocol (T-PDCP) layer for providing a 3GPP UE PDCP functionality; and a Terminal Equipment Upper Application Layers (T-UPLR) for providing a 3GPP UE Non Access Stratum (NAS), Packet Switched (PS) and Circuit Switched (CS) functionalities.

* * * * *